(12) United States Patent
Haynes et al.

(10) Patent No.: US 11,970,858 B2
(45) Date of Patent: Apr. 30, 2024

(54) SUBSTRATE HAVING DECORATED SURFACE AND METHOD OF PRODUCTION

(71) Applicant: Zinniatek Limited, Auckland (NZ)

(72) Inventors: Andrew Leo Haynes, Auckland (NZ); John Wason McKee, Auckland (NZ)

(73) Assignee: ZINNIATEK LIMITED, Auckland (NZ)

( * ) Notice: Subject to any disclaimer, the term of this patent is extended or adjusted under 35 U.S.C. 154(b) by 74 days.

(21) Appl. No.: 16/486,334

(22) PCT Filed: Feb. 19, 2018

(86) PCT No.: PCT/IB2018/051012
§ 371 (c)(1),
(2) Date: Aug. 15, 2019

(87) PCT Pub. No.: WO2018/154427
PCT Pub. Date: Aug. 30, 2018

(65) Prior Publication Data
US 2020/0011060 A1    Jan. 9, 2020

Related U.S. Application Data

(60) Provisional application No. 62/534,976, filed on Jul. 20, 2017, provisional application No. 62/461,407, filed on Feb. 21, 2017.

(51) Int. Cl.
B44C 5/04       (2006.01)
C04B 33/14      (2006.01)
(Continued)

(52) U.S. Cl.
CPC .............. E04D 1/20 (2013.01); B44C 5/04 (2013.01); C04B 33/14 (2013.01); D06N 5/003 (2013.01); E04D 1/22 (2013.01); E04D 2001/305 (2013.01)

(58) Field of Classification Search
CPC ....... E04D 1/20; E04D 1/22; E04D 2001/305; E04D 7/00; E04D 1/265; E04D 2001/005;
(Continued)

(56) References Cited

U.S. PATENT DOCUMENTS 167,833 A     9/1875  Garland
510,027 A    12/1893  Johnson
(Continued)

FOREIGN PATENT DOCUMENTS

CA    2849258 A1    3/2013
CA    2794345 A1    5/2013
(Continued)

OTHER PUBLICATIONS

Translation of CH 550 656 A, Derwent Abstract, Schreiber (Year: 1974).*
(Continued)

Primary Examiner — Nathan L Van Sell
(74) Attorney, Agent, or Firm — Foley & Lardner LLP

(57) ABSTRACT

The present invention generally relates to substrates having a decorated surface and a method of producing a substrate having a decorated surface. In particular embodiments, the present invention relates to a roofing, cladding, and/or siding product or a coating or layer of a coating for a roofing, cladding, and/or siding product having a decorated surface and a methods of producing the same. The present invention also relates to roofing, cladding, and/or siding products and assemblies of such products, for installation onto a building surface and systems and methods of manufacture of roofing, cladding, and/or siding products.

31 Claims, 16 Drawing Sheets

(51) Int. Cl.
 *D06N 5/00* (2006.01)
 *E04D 1/20* (2006.01)
 *E04D 1/22* (2006.01)
 *E04D 1/30* (2006.01)

(58) Field of Classification Search
 CPC .. B44C 5/04; B44C 1/00; C04B 33/14; D06N 5/003; B05D 7/02; B05D 3/0218; B05D 2401/00
 See application file for complete search history.

(56) References Cited

U.S. PATENT DOCUMENTS

| | | | |
|---|---|---|---|
| 715,037 | A | 12/1902 | Drechsler |
| 734,976 | A | 7/1903 | Simmerman |
| 1,004,338 | A | 9/1911 | Austin |
| 1,266,137 | A | 5/1918 | Melde |
| 1,634,126 | A | 6/1927 | Tyra |
| 1,678,333 | A | 7/1928 | Figge |
| 1,741,515 | A | 12/1929 | Halprin |
| 1,941,216 | A | 12/1933 | McKeown |
| 2,149,818 | A | 3/1939 | North |
| 2,152,080 | A | 3/1939 | Munsey |
| 2,260,446 | A | 11/1941 | Ormsby |
| 2,362,236 | A | 11/1944 | Bassler |
| 2,568,603 | A | 9/1951 | Anthony |
| 2,624,298 | A | 1/1953 | Farren |
| 2,680,565 | A | 6/1954 | Lof |
| 2,756,699 | A | 7/1956 | Lockwood |
| 2,766,861 | A | 10/1956 | Abramson |
| 3,058,265 | A | 10/1962 | Lapsensohn |
| 3,223,018 | A | 12/1965 | Tucker |
| 3,332,830 | A | 7/1967 | Tomlinson |
| 3,357,064 | A | 12/1967 | Munse |
| 3,383,442 | A * | 5/1968 | Mountain ............... B05D 5/06 222/533 |
| 3,661,410 | A | 5/1972 | Larson et al. |
| 3,957,109 | A | 5/1976 | Worthington |
| 4,108,155 | A | 8/1978 | Koizumi et al. |
| 4,128,124 | A | 12/1978 | Worthington |
| 4,141,182 | A | 2/1979 | McMullen |
| 4,173,243 | A | 11/1979 | Wilde et al. |
| 4,173,253 | A | 11/1979 | Wiegand |
| 4,201,196 | A | 5/1980 | Zani |
| 4,281,639 | A | 8/1981 | Kuronen |
| 4,288,959 | A | 9/1981 | Murdock |
| 4,319,437 | A | 3/1982 | Murphy |
| 4,404,960 | A | 9/1983 | Laing |
| 4,411,117 | A | 10/1983 | Bolha |
| 4,426,823 | A | 1/1984 | Kobe |
| 4,712,351 | A | 12/1987 | Kasprzak |
| 4,956,140 | A | 9/1990 | Rolles et al. |
| 5,053,180 | A | 10/1991 | Wang et al. |
| 5,070,671 | A | 12/1991 | Fifield et al. |
| 5,076,037 | A | 12/1991 | Crick et al. |
| 5,094,058 | A | 3/1992 | Slocum |
| 5,100,274 | A | 3/1992 | Hasan et al. |
| 5,104,770 | A | 4/1992 | Usifer et al. |
| 5,151,324 | A | 9/1992 | Hanatani et al. |
| 5,295,339 | A | 3/1994 | Manner |
| 5,347,785 | A | 9/1994 | Terrenzio et al. |
| 5,437,735 | A | 8/1995 | Younan et al. |
| 5,475,963 | A | 12/1995 | Chelednik |
| 5,487,247 | A | 1/1996 | Pigg |
| 5,537,792 | A | 7/1996 | Moliere |
| 5,615,523 | A | 4/1997 | Wells et al. |
| 5,615,527 | A | 4/1997 | Attley |
| 5,630,305 | A | 5/1997 | Hlasnicek |
| 5,651,226 | A | 7/1997 | Archibald |
| 5,690,876 | A | 11/1997 | Gallo, Jr. |
| 5,711,126 | A | 1/1998 | Wells |
| 5,752,355 | A | 5/1998 | Sahramaa |
| 5,813,183 | A | 9/1998 | Attley |
| 5,866,639 | A * | 2/1999 | Dorchester ........... B29C 48/175 523/171 |
| 6,021,611 | A | 2/2000 | Wells et al. |
| 6,061,978 | A | 5/2000 | Dinwoodie et al. |
| 6,145,264 | A | 11/2000 | Dallaire |
| 6,164,021 | A | 12/2000 | Huber et al. |
| 6,164,034 | A | 12/2000 | Roetheli et al. |
| 6,178,703 | B1 | 1/2001 | Noone et al. |
| 6,201,179 | B1 | 3/2001 | Dalacu |
| 6,220,956 | B1 | 4/2001 | Kilian et al. |
| 6,248,271 | B1 | 6/2001 | Graham et al. |
| 6,856,496 | B1 | 2/2005 | Mucci et al. |
| 6,908,295 | B2 | 6/2005 | Thielman et al. |
| 6,941,706 | B2 | 9/2005 | Austin et al. |
| 7,520,098 | B1 | 4/2009 | Martinique et al. |
| 7,735,287 | B2 | 6/2010 | Gaudreau |
| 8,020,353 | B2 | 9/2011 | Gaudreau |
| 8,100,341 | B1 | 1/2012 | Roderick et al. |
| 8,104,231 | B1 | 1/2012 | Graboski |
| 8,215,070 | B2 | 7/2012 | Railkar et al. |
| 8,245,475 | B1 | 8/2012 | Thomson et al. |
| 8,307,599 | B2 | 11/2012 | Jenkins et al. |
| 8,333,356 | B2 | 12/2012 | Ernst et al. |
| 8,402,707 | B2 | 3/2013 | Mitchell et al. |
| 8,468,754 | B2 | 6/2013 | Railkar et al. |
| 8,567,601 | B2 | 10/2013 | Turek et al. |
| 8,713,860 | B2 | 5/2014 | Railkar et al. |
| 8,713,882 | B2 | 5/2014 | Kalkanoglu et al. |
| 8,763,339 | B2 | 7/2014 | Bryson et al. |
| 8,782,967 | B2 | 7/2014 | Daniels |
| 9,182,136 | B2 | 11/2015 | Oaten et al. |
| 9,322,173 | B2 | 4/2016 | Pisani |
| 9,416,540 | B2 | 8/2016 | Allen et al. |
| 9,518,391 | B2 | 12/2016 | Haynes et al. |
| 9,574,783 | B2 | 2/2017 | Hollick |
| 11,011,912 | B2 | 5/2021 | Haynes et al. |
| 2001/0022055 | A1 | 9/2001 | Zhang |
| 2002/0037630 | A1 | 3/2002 | Agarwal et al. |
| 2002/0038530 | A1 | 4/2002 | Clark |
| 2002/0117166 | A1 | 8/2002 | Okumura |
| 2003/0154667 | A1 | 8/2003 | Dinwoodie |
| 2004/0009338 | A1 | 1/2004 | Jo et al. |
| 2004/0020528 | A1 | 2/2004 | Patwardhan |
| 2004/0074156 | A1 | 4/2004 | Haynes |
| 2005/0026297 | A1 | 2/2005 | Daniely et al. |
| 2005/0072091 | A1 | 4/2005 | Morris |
| 2005/0072092 | A1 | 4/2005 | Williams |
| 2005/0178429 | A1 | 8/2005 | McCaskill et al. |
| 2005/0210806 | A1 | 9/2005 | Guerra |
| 2005/0239394 | A1 | 10/2005 | O'Hagin et al. |
| 2005/0262797 | A1 | 12/2005 | Davis |
| 2006/0026908 | A1 | 2/2006 | Gregori et al. |
| 2006/0070316 | A1 | 4/2006 | Lewis et al. |
| 2006/0080942 | A1 | 4/2006 | O'Neill |
| 2006/0122332 | A1 | 6/2006 | Yang et al. |
| 2007/0039274 | A1 | 2/2007 | Harrington et al. |
| 2007/0078191 | A1 | 4/2007 | Guhde et al. |
| 2007/0119109 | A1 | 5/2007 | Kuelker |
| 2007/0144096 | A1 | 6/2007 | O'Neal |
| 2007/0193620 | A1 | 8/2007 | Hines et al. |
| 2007/0266562 | A1 | 11/2007 | Friedman et al. |
| 2008/0000174 | A1 | 1/2008 | Flaherty et al. |
| 2008/0000512 | A1 | 1/2008 | Flaherty et al. |
| 2008/0121270 | A1 | 5/2008 | Mayer et al. |
| 2008/0184645 | A1 | 8/2008 | Trabue et al. |
| 2008/0185748 | A1 | 8/2008 | Kalkanoglu |
| 2008/0193740 | A1 * | 8/2008 | Nesbitt ............... B29C 48/11 428/318.4 |
| 2008/0271773 | A1 | 11/2008 | Jacobs et al. |
| 2008/0302030 | A1 | 12/2008 | Stancel et al. |
| 2008/0302031 | A1 | 12/2008 | Bressler et al. |
| 2009/0000222 | A1 | 1/2009 | Kalkanoglu et al. |
| 2009/0215304 | A1 | 8/2009 | Faust et al. |
| 2010/0037548 | A1 | 2/2010 | Kalkanoglu et al. |
| 2010/0083602 | A1 | 4/2010 | Pollack |
| 2010/0141042 | A1 | 6/2010 | Kesler et al. |
| 2010/0170169 | A1 | 7/2010 | Railkar et al. |
| 2010/0236162 | A1 | 9/2010 | Tweedie |
| 2010/0237709 | A1 | 9/2010 | Hall et al. |
| 2010/0313501 | A1 | 12/2010 | Gangemi |
| 2011/0000535 | A1 | 1/2011 | Davidson |

(56) References Cited

U.S. PATENT DOCUMENTS

| | | |
|---|---|---|
| 2011/0012430 A1 | 1/2011 | Cheng et al. |
| 2011/0017282 A1 | 1/2011 | Tas et al. |
| 2011/0037322 A1 | 2/2011 | Kanno |
| 2011/0041428 A1 | 2/2011 | Posnansky |
| 2011/0041518 A1 | 2/2011 | Peterson et al. |
| 2011/0047894 A1 | 3/2011 | Shadwell et al. |
| 2011/0081553 A1 | 4/2011 | Mehlmann et al. |
| 2011/0124280 A1 | 5/2011 | Railkar et al. |
| 2011/0214372 A1 | 9/2011 | Mullet et al. |
| 2011/0223385 A1 | 9/2011 | Shiao et al. |
| 2011/0277408 A1 | 11/2011 | Turek et al. |
| 2012/0019074 A1 | 1/2012 | Frolov et al. |
| 2012/0024283 A1 | 2/2012 | Skillman |
| 2012/0073216 A1 | 3/2012 | Daniels |
| 2012/0098350 A1 | 4/2012 | Campanella et al. |
| 2012/0117908 A1 | 5/2012 | Turek et al. |
| 2012/0149291 A1 | 6/2012 | Roderick et al. |
| 2012/0164385 A1* | 6/2012 | Heulings ............ C08K 5/092 428/144 |
| 2012/0190288 A1 | 7/2012 | Willen |
| 2013/0095293 A1 | 4/2013 | Boss et al. |
| 2013/0167463 A1 | 7/2013 | Duve |
| 2013/0193769 A1 | 8/2013 | Mehta et al. |
| 2013/0202852 A1* | 8/2013 | Shiao ................ E04D 1/28 428/145 |
| 2013/0217318 A1 | 8/2013 | Edwards et al. |
| 2013/0233385 A1 | 9/2013 | Reese et al. |
| 2013/0255755 A1 | 10/2013 | Chich |
| 2013/0263534 A1 | 10/2013 | Railkar et al. |
| 2014/0041321 A1 | 2/2014 | Poivet |
| 2014/0090696 A1 | 4/2014 | Rodrigues et al. |
| 2014/0090697 A1 | 4/2014 | Rodrigues et al. |
| 2014/0190921 A1 | 7/2014 | Thomson et al. |
| 2014/0259998 A1 | 9/2014 | Railkar et al. |
| 2014/0259999 A1 | 9/2014 | Rodrigues et al. |
| 2014/0260001 A1 | 9/2014 | Kiik et al. |
| 2014/0265609 A1 | 9/2014 | Rodrigues et al. |
| 2014/0287166 A1 | 9/2014 | Kalkanoglu et al. |
| 2015/0047285 A1 | 2/2015 | Dejarnette et al. |
| 2015/0125634 A1 | 5/2015 | Jefferson |
| 2015/0143760 A1 | 5/2015 | Daniels |
| 2015/0240495 A1 | 8/2015 | Vermilion et al. |
| 2017/0059184 A1 | 3/2017 | Haynes et al. |
| 2017/0355392 A1 | 12/2017 | Nagatani et al. |
| 2017/0362830 A1 | 12/2017 | Buckingham et al. |
| 2018/0123503 A1 | 5/2018 | Haynes et al. |
| 2018/0159462 A1 | 6/2018 | Vignal et al. |

FOREIGN PATENT DOCUMENTS

| | | |
|---|---|---|
| CN | 1261417 A | 7/2000 |
| DE | 46673 C | 8/1888 |
| DE | 20 02 738 A1 | 7/1971 |
| DE | 2002738 A1 | 7/1971 |
| DE | 30 14 445 A1 | 10/1981 |
| DE | 42 16 171 A1 | 1/1993 |
| DE | 20 2005 002 105 | 6/2005 |
| DE | 10 2010 009 595 | 9/2011 |
| DE | 10 2010 019 815 A1 | 11/2011 |
| EP | 0 436 572 B1 | 11/1995 |
| EP | 2 009 704 | 12/2008 |
| EP | 2 075 389 A2 | 7/2009 |
| EP | 2 256 894 | 12/2010 |
| GB | 2 141 157 | 12/1984 |
| GB | 2 199 860 | 7/1988 |
| GB | 2 344 836 | 8/2002 |
| JP | S54-121515 | 9/1979 |
| JP | 58-152545 U | 10/1983 |
| JP | S6193750 | 5/1986 |
| JP | S61-169562 A | 7/1986 |
| JP | S63-065240 | 3/1988 |
| JP | S63-165633 | 7/1988 |
| JP | S63-210346 A | 9/1988 |
| JP | 03-086928 U1 | 9/1991 |
| JP | H534623 A | 2/1993 |
| JP | H625539 A | 2/1994 |
| JP | H0625539 A | 2/1994 |
| JP | 06-032527 U | 4/1994 |
| JP | H06-108549 | 4/1994 |
| JP | 06-212742 A | 8/1994 |
| JP | H06-212742 | 8/1994 |
| JP | 06-071655 U | 10/1994 |
| JP | H7217011 | 8/1995 |
| JP | H7218002 | 8/1995 |
| JP | 08-068566 A | 3/1996 |
| JP | 09-032141 A | 2/1997 |
| JP | H960981 | 3/1997 |
| JP | H972618 | 3/1997 |
| JP | 09-256553 A | 9/1997 |
| JP | H09-275644 A | 10/1997 |
| JP | 09-310453 | 12/1997 |
| JP | H09-310453 A | 12/1997 |
| JP | 10-227103 A | 8/1998 |
| JP | 10-325214 A | 12/1998 |
| JP | 11-036540 A | 2/1999 |
| JP | H11-136540 | 2/1999 |
| JP | 11-006231 A | 3/1999 |
| JP | 11-062317 A | 3/1999 |
| JP | H11-504403 | 4/1999 |
| JP | 2000-510210 | 8/2000 |
| JP | 2001-295422 A | 10/2001 |
| JP | 2002-235955 | 8/2002 |
| JP | 2002-294937 A | 10/2002 |
| JP | 2003-041715 A | 2/2003 |
| JP | 2003-049509 | 2/2003 |
| JP | 2005-191578 A | 7/2005 |
| JP | 2005-226925 A | 8/2005 |
| JP | 2005-290933 A | 10/2005 |
| JP | 2006-022481 A | 1/2006 |
| JP | 2008-034557 A | 2/2008 |
| JP | 2008-180414 A | 8/2008 |
| JP | 2009-503309 A | 1/2009 |
| JP | 2009-127921 | 6/2009 |
| JP | 2011-041464 A | 2/2011 |
| JP | 2011041464 A | 2/2011 |
| JP | 2011-179257 A | 9/2011 |
| JP | 5118102 | 1/2013 |
| JP | 5118102 B2 | 1/2013 |
| JP | 2015-502726 | 1/2015 |
| JP | 2015-505920 A | 2/2015 |
| JP | 2016-514221 A | 5/2016 |
| JP | 60-060652 B2 | 1/2017 |
| JP | 2018-011504 | 1/2018 |
| KR | 20110128094 | 11/2011 |
| WO | WO-98/57009 | 12/1998 |
| WO | WO-00/23673 A1 | 4/2000 |
| WO | WO-02/093655 | 11/2002 |
| WO | WO-2006/063333 A2 | 6/2006 |
| WO | WO-2006/081630 A1 | 8/2006 |
| WO | WO-2007/058548 | 5/2007 |
| WO | WO-2008/070907 A1 | 6/2008 |
| WO | WO-2008/137966 | 11/2008 |
| WO | WO-2010/036980 A1 | 4/2010 |
| WO | WO-2010/150316 | 12/2010 |
| WO | WO-2011/027627 A1 | 3/2011 |
| WO | WO-2011/087424 A1 | 7/2011 |
| WO | WO 2011/087424 A1 | 7/2011 |
| WO | WO-2011/099109 A1 | 8/2011 |
| WO | WO-2011/116257 A1 | 9/2011 |
| WO | WO-2012/021145 | 2/2012 |
| WO | WO-2013/043633 A2 | 3/2013 |
| WO | WO-2013/067484 A1 | 5/2013 |
| WO | WO-2013/081477 A1 | 6/2013 |
| WO | WO-2013/112248 | 8/2013 |
| WO | WO 2013/192180 A2 | 12/2013 |
| WO | WO-2013/192180 A2 | 12/2013 |
| WO | WO-2014/109700 A1 | 7/2014 |

(56) References Cited

FOREIGN PATENT DOCUMENTS

WO  WO-2015/132756 A1  9/2015
WO  WO-2016/088025      6/2016

OTHER PUBLICATIONS

Written Opinion regarding International Application No. PCT/IB2018/051012, dated May 11, 2018, 8 pps.
Carley, Whittington's Dictionary of Plastics, Third Edition.
DOWLEX (TM) 2631.10UE Polyethylene Resin.
High Density Polyethylene Resin, InnoPlus by PTT Global Chemical, HD6200B / HD6600B.
Plastics—Determination of dynamic mechanical properties, International Standard, ISO 6721-11.
Plastics—Determination of temperature of deflection under load—International Standard, ISO 75-1.
Plastics—Determination of the melt mass-flow rate (MFR) and melt volumeflow rate (MVR) of thermoplastics, International Standard, ISO 1133-1.
Plastics—Differential scanning calorimetry (DSC), International Standard, ISO 11357-2.
Richard G. Jones, et al, Compendium of Polymer Terminology and Nomenclature IUPAC Recommendations 2008.
Standard Practice for Glass Transition Temperatures of Hydrocarbon Resins by Differential Scanning Calorimetry, Designation: D6604-00 (Reapproved 2017).
Standard Specification for Asphalt Shingles Made from Glass Felt and Surfaced with Mineral Granules, Designation: D3462/D3462M-16.
Standard Test Method for Assignment of the Glass Transition Temperature by Dynamic Mechanical Analysis, Designation: E1640-18.
Standard Test Method for Assignment of the Glass Transition Temperatures by Differential Scanning Calorimetry, Designation: E1356-08 (Reapproved 2014).
Standard Test Method for Deflection Temperature of Plastics Under Flexural Load in the Edgewise Position, Designation: D648-18.
Standard Test Method for Linear Thermal Expansion of Solid Materials by Thermomechanical Analysis, Designation: E831-19.
Standard Test Method for Melt Flow Rates of Thermoplastics by Extrusion Plastometer, Designation: D1238-13.
Standard Test Method for Rubber Property-Durometer Hardness, Designation: D2240.
Standard Test Method for Tensile Properties of Plastics, Designation: D638-14.
Standard Test Method for Vicat Softening Temperature of Plastics, Designation: D1525.
Standard Test Methods for Flexural Properties of Unreinforced and Reinforced Plastics and Electrical Insulating Materials, Designation: D790-17.
U.S. Appl. No. 15/651,300, filed Jul. 17, 2017, Zinniatek Limited.
ASTM D3462, Standard Specification for Asphalt Shingles Made from Glass Felt and Surfaced with Mineral Granules, downloaded Aug. 26, 2018, 4 pps.
Deck-ArmorTM Roof Protection (GAF Corp., Wayne, New Jersey), Updated Jul. 2018, 5 pps.
Examination Report for European Patent App. No. 15866038.1 dated Apr. 18, 2019, 6 pages.
Extended European Search Report for European Patent App. No. 18757976.8, dated Feb. 1, 2021.
Extended European Search Report for European Patent Application No. 12852960.9, dated May 27, 2015, 6 pages.
Extended European Search Report, EP Application No. 15864647.1, dated Jul. 20, 2018, 9 pps.
First Examination Report regarding New Zealand App. No. 738483, dated Jan. 26, 2018, 8 pps.
Further Examination Report regarding New Zealand App. No. 738483, dated Apr. 23, 2018, 3 pps.
Further Examination Report regarding New Zealand App. No. 738483, dated May 23, 2018, 3 pps.
International Search Report for International Application No. PCT/NZ2012/000221, dated Apr. 3, 2013, 7 pages.
International Search Report regarding PCT/NZ2012/000222, dated Apr. 2, 2013, 7 pages.
Supplementary European Search Report for European Patent Application No. 1285444, dated Oct. 16, 2016, 10 pages.
Examination Report regarding Appl. No. JP2019-565999, dated Nov. 2, 2021, 15 pps.
Examination Report on JP 2019-518487 with Summary Translation in English, dated Sep. 9, 2021, 10 pps.

* cited by examiner

SUBSTRATE HAVING DECORATED SURFACE AND METHOD OF PRODUCTION

CROSS-REFERENCE TO RELATED APPLICATIONS

This Application claims the benefit of priority to international patent application number PCT/M2018/051012, having a filing date of Feb. 19, 2018, which claims the benefit of U.S. Provisional Application No. 62/461,407, having a filing date of Feb. 21, 2017, and U.S. Provisional Application No. 62/534,976, having a filing date of Jul. 20, 2017, the complete disclosures of which are hereby incorporated by reference for all purposes.

FIELD OF THE INVENTION

The present invention generally relates to substrates having a decorated surface and a method of producing a substrate having a decorated surface. In particular embodiments, the present invention relates to a roofing, cladding, and/or siding product or a coating or layer of a coating for a roofing, cladding, and/or siding product having a decorated surface and a methods of producing the same. The present invention also relates to roofing, cladding, and/or siding products and assemblies of such products, for installation onto a building surface and systems and methods of manufacture of roofing, cladding, and/or siding products.

BACKGROUND TO THE INVENTION

There are a variety of known roofing, cladding and/or siding products, each of which have particular appearance and performance characteristics for installing onto building surfaces according to a user's preference. Well-known products include asphalt shingles, slate, tiles, concrete tiles, etc. Such products may be manufactured from natural materials such as stone, clay, timber, etc. or from synthetic materials, such as polymers and composites thereof.

The use of synthetic materials for manufacturing such products can provide a number of advantages over the use of natural materials, for example improved performance and/or processing characteristics and/or cost benefits. Where synthetic materials are used, it is often desirable from an aesthetic perspective for such products to mimic the appearance of or resemble a natural material. However, this can be difficult to achieve while preserving other important characteristics of the product, for example durability.

In the manufacture of asphalt shingles, for example, a mat of fiberglass or cellulose fibers is coated with hot asphalt and granules of a ceramic material of the desired colour (for example, stones coated with ceramic of consistent colour) applied to the asphalt coating to provide a surface having the desired appearance and to protect the asphalt from UV degradation. Some of the granules of the ceramic material do not strongly adhere to the surface of the asphalt and are easily removed, for example by rubbing during transit or installation or by walking on following installation especially when hot, potentially adversely affecting the appearance of the product.

There is an ongoing need to provide substrates having a decorated surface and methods of producing substrates having a decorated surface, such as roofing, cladding and/or siding products or coatings or layers of coatings for roofing, cladding, and/or siding products which provide the same or similar appearance as those products which have been used traditionally, yet which also provide for performance characteristics. In particular, to provide for such alternatives which are capable of being industrially produced in suitable quantities, and/or from alternative materials.

It is an object of the present invention to go some way to meeting this need and/or to at least provide the public with a useful choice.

It is an alternative or additional object of the present invention to provide an alternative or a substitute roofing, cladding and/or siding module.

It is an alternative or additional object of the present invention to provide an alternative method of manufacturing roofing, cladding, and/or siding products in a more productive and/or efficient and/or cost-effective manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

In a first aspect, the present invention broadly consists in a method of producing a substrate having a decorated surface, the method comprising:
  providing one or more pluralities of coloured particles having an initial colour and an exposed surface comprising one or more polymer;
  providing a substrate having an exposed surface to be decorated comprising one or more polymers;
  bringing into contact said one or more pluralities of coloured particles and said exposed surface to be decorated; and
  exposing said coloured particles and/or said exposed surface to be decorated to a temperature and pressure sufficient to cause said coloured particles to fuse into or fuse to or coalesce with said exposed surface to be decorated, said temperature and pressure being controlled over a period of time to thereby produce a substrate having a decorated surface.

In a second aspect, the present invention broadly consists in a substrate having a decorated surface produced by a method according to the present invention.

In a third aspect, the present invention broadly consists in a substrate having a decorated surface comprising one or more polymers and a plurality of coloured particles having an initial colour and comprising one or more polymers fused into or to or coalesced with said surface.

In a fourth aspect, the present invention broadly consists in a substrate having a decorated surface comprising a continuous or unified polymeric matrix comprising one or more polymers, said surface comprising a plurality of visually differentiable coloured regions, which coloured regions may be the same or different in colour and/or size and/shape, across the width and/or length of the surface.

The following embodiments and preferences may relate alone or in any combination of any two or more to any of the above aspects and to any of the aspects below.

In some embodiments the substrate is polymeric or comprises a polymeric coating or layer of a coating defining the exposed surface to be decorated.

In some embodiments the substrate comprises a roofing, cladding, or siding product or a coating or a layer of a coating for a roofing, cladding, or siding product, preferably a polymeric roofing, cladding, or siding product, or a polymeric coating or layer of a coating for a roofing, cladding, or siding product, preferably a polymeric roofing, cladding, or siding product.

In some embodiments the one or more pluralities of coloured particles are selected such that the coloured particles and/or the one or more polymers of the exposed surface of the particles have an MFI and/or such that the particles have an average particle size effective at the temperature and pressure to which the coloured particles and/or surface to be decorated are exposed to provide a desired visual appearance in and/or on the decorated surface.

In some embodiments the coloured particles and/or the one or more polymers of the exposed surface of the coloured particles are miscible or compatible, preferably miscible, with the exposed surface to be decorated and/or the one or more polymers of the exposed surface to be decorated at a temperature greater than the glass transition temperature (Tg) of the coloured particles and/or the one or more polymers of the exposed surface of the particles and/or a temperature greater than the Tg of the exposed surface to be decorated and/or the one or more polymers of the exposed surface to be decorated.

In some embodiments the temperature to which the coloured particles and/or surface to be decorated are exposed is greater than the Tg of the coloured particles and/or the one or more polymers of the exposed surface of the particles and/or greater than the Tg of the exposed surface to be decorated and/or the one or more polymers of the exposed surface to be decorated at said pressure to which the coloured particles and/or surface to be decorated are exposed.

In some embodiments, the temperature to which the coloured particles and/or surface to be decorated are exposed is at least about 1° C. greater than the Tg of the coloured particles and/or the one or more polymers of the exposed surface of the coloured particles and/or at least about 1° C. greater than the Tg of the exposed surface to be decorated and/or the one or more polymers of the exposed surface to be decorated. In some embodiments the temperature greater than the Tg of the coloured particles and/or the one or more polymers of the exposed surface of the coloured particles and/or greater than the Tg of the exposed surface to be decorated and/or the one or more polymers of the exposed surface to be decorated is at least about 5° C. greater than the Tg, for example at least about 10, 15, 20, 25, 30, 35, 40, 45, 50, 55, 60, 65, 70, 75, 80, 85, 90, 95, or 100° C. greater than the Tg, preferably at least 50° C. greater than the Tg (and useful ranges may be selected from any two of these values).

In some embodiments the method comprises providing two or more pluralities of coloured particles and bringing into contact the exposed surface to be decorated and the two or more pluralities of coloured particles, wherein the coloured particles of each plurality of coloured particles are of a different type.

In some embodiments the coloured particles of each plurality of coloured particles differ in composition or a physical property or characteristic.

In some embodiments the coloured particles of each plurality of coloured particles differ in one or more of the following: initial colour; the composition of the one or more polymers of the exposed surface of the particles; the glass transition temperature (Tg) of the particles and/or the one or more polymers of the exposed surface of the particles; the heat deflection temperature (HDT) of the particles and/or the one or more polymers of the exposed surface of the particles; the melt flow index (MFI) of the particles and/or the one or more polymers of the exposed surface of the particles; average particle size; shape; ability to reflect light; stability to degradation, for example by light, heat, or microbes; and ability to provide grip or abrasion.

In some embodiments the coloured particles of each plurality of coloured particles differ in one or more of the following: softness (for example, Vicat softening point); hardess, (for example, Shore A hardness and/or Shore D hardness); and/or modulus of elasticity.

In some embodiments the coloured particles of one or more pluralities and/or exposed surface to be decorated are at the temperature to which the particles and/or exposed surface to be decorated are to be exposed when bringing the particles and exposed surface to be decorated into contact; and/or the coloured particles of one or more pluralities and/or surface to be decorated are heated to the temperature to which the particles and/or surface to be decorated are to be exposed after bringing the coloured particles and exposed surface to be decorated into contact.

In some embodiments bringing the one or more pluralities of coloured particles and exposed surface to be decorated into contact comprises: (a) applying one or more of the pluralities of coloured particles to the exposed surface to be decorated; or (b) applying one or more of the pluralities of coloured particles to a surface, and applying the exposed surface to be decorated to the coloured particles.

In some embodiments the method comprises applying pressure to the coloured particles and exposed surface to be decorated after bringing the coloured particles and the exposed surface to be decorated into contact.

In some embodiments the coloured particles of one or more pluralities of coloured particles have an average particle size of from about 0.05 to about 5 mm, for example 0.05 to 5, 0.05 to 4.5, 0.05 to 4, 0.05 to 3.5, 0.05 to 3, 0.05 to 2.5, 0.05 to 2, 0.05 to 1.9, 0.05 to 1.8, 0.05 to 1.7, 0.05 to 1.6, 0.05 to 1.5, 0.1 to 5, 0.1 to 4, 0.1 to 3, 0.1 to 2, 0.1 to 1.9, 0.1 to 1.8, 0.1 to 1.7, 0.1 to 1.6, 0.1 to 1.5, 0.2 to 5, 0.2 to 4, 0.2 to 3, 0.2 to 2, 0.2 to 1.9, 0.2 to 1.8, 0.2 to 1.7, 0.2 to 1.6, 0.2 to 1.5, 0.3 to 5, 0.3 to 4, 0.3 to 3, 0.3 to 2, 0.3 to 1.9, 0.3 to 1.8, 0.3 to 1.7, 0.3 to 1.6, or 0.3 to 1.5 mm, preferably from about 0.3 to 1.5 mm or from 0.1 to about 0.5 mm.

In some embodiments the coloured particles pluralities are of a predetermined shape (for example, substantially spherical, cylindrical, tubular, or cone-shaped); of random shape; or a mixture thereof.

In some embodiments, the coloured particles comprise from about 1 to about 100% w/w of the one or more polymers of the exposed surface of the coloured particles based on the weight of the particles, for example from 2 to 100, 3 to 100, 4 to 100, 5 to 100, 10 to 100, 20 to 100, 30 to 100, 40 to 100, 50 to 100, 60 to 100, 70 to 100, 80 to 100, 1 to 99, 2 to 99, 3 to 99, 4 to 99, 5 to 99, 10 to 99, 20 to 99, 30 to 99, 40 to 99, 50 to 99, 60 to 99, 70 to 99, 80 to 99, 2 to 98, 3 to 98, 4 to 98, 5 to 98, or 10 to 98%. In some embodiments the coloured particles comprise from about 10 to about 98% w/w of the one or more polymers of the exposed surface of the coloured particles based on the weight of the particles, for example from 20 to 98, 30 to 98, 40 to 98, 50 to 98, 60 to 98, 70 to 98, or 80 to 98%, preferably from about 80 to 98%. In certain embodiments the coloured particles comprise from about 10 to about 90% w/w of the one or more polymers of the exposed surface of the coloured particles based on the weight of the particles, for example 10 to 80, 10 to 70, 10 to 60, 10 to 50, 20 to 98, 20 to 90, 20 to 80, 20 to 70, 20 to 60, 20 to 50, preferably 20 to 50%.

In some embodiments, the exposed surface to be decorated comprises from about 1 to about 100% w/w of the one or more polymers of the exposed surface to be decorated based on the weight of the material from which the exposed surface to be decorated is formed, for example from 2 to 100, 3 to 100, 4 to 100, 5 to 100, 10 to 100, 20 to 100, 30 to 100, 40 to 100, 50 to 100, 60 to 100, 70 to 100, 80 to 100, 1 to 99, 2 to 99, 3 to 99, 4 to 99, 5 to 99, 10 to 99, 20 to 99, 30 to 99, 40 to 99, 50 to 99, 60 to 99, 70 to 99, 80 to 99, 2 to 98, 3 to 98, 4 to 98, 5 to 98, or 10 to 98%. In some embodiments the exposed surface to be decorated comprises from about 10 to about 98% w/w of the one or more polymers of the exposed surface to be decorated based on the weight of the material from which the exposed surface to be decorated is formed, for example 10 to 90, 10 to 80, 10 to 70, 10 to 60, 10 to 50, 20 to 98, 20 to 90, 20 to 80, 20 to 70, 20 to 60, 20 to 50, preferably 20 to 50%.

In some embodiments the substrate is a polymeric substrate or a substrate comprising a polymeric coating or layer of a coating that provides the exposed surface to be decorated, wherein the polymeric substrate or polymer coating or layer comprises from about 1 to about 100% w/w of the one or more polymers based on the weight of the polymeric substrate or polymeric coating or layer, for example 2 to 100, 3 to 100, 4 to 100, 5 to 100, 10 to 100, 20 to 100, 30 to 100, 40 to 100, 50 to 100, 60 to 100, 70 to 100, 80 to 100, 1 to 99, 2 to 99, 3 to 99, 4 to 99, 5 to 99, 10 to 99, 20 to 99, 30 to 99, 40 to 99, 50 to 99, 60 to 99, 70 to 99, 80 to 99, 2 to 98, 3 to 98, 4 to 98, 5 to 98, or 10 to 98%. In some embodiments the substrate is a polymeric substrate or a substrate comprising a polymeric coating or layer of a coating that provides the exposed surface to be decorated, wherein the polymeric substrate or polymer coating or layer comprises from about 10 to about 98% w/w of the one or more polymers based on the weight of the polymeric substrate or polymeric coating or layer, for example 10 to 90, 10 to 80, 10 to 70, 10 to 60, 10 to 50, 20 to 98, 20 to 90, 20 to 80, 20 to 70, 20 to 60, 20 to 50, preferably 20 to 50%.

In some embodiments the one or more polymers of the exposed surface of the coloured particles and/or the one or more polymers of the exposed surface to be decorated are selected from thermoplastic polymers.

In some embodiments the one or more polymers of the exposed surface of the coloured particles and/or the one or more polymers of the exposed surface to be decorated are selected from polystyrene (GPPS), polyethylene terephthalate (PET), polyester methacrylate (PEM), high impact polystyrene (HIPS), acrylonitrile butadiene styrene (ABS), polyvinyl chloride (PVC), polyurethanes (PU), polyethylene (PE) including homopolymer, copolymer, block copolymer and terpolymer forms, polylactic acid (PLA), nylon (PA), acrylics (PMMA), high density polyethylene (HDPE), low density polyethylene (LDPE), linear low density polyethylene (LLDPE), medium density polyethylene (MDPE), cross linked polyethylene (PEX), thermoplastic elastomer (TPE), thermoplastic polyolefin (TPO), thermoplastic rubber (TPR), polypropylene (PP), including homopolymer and copolymer forms, polybutylene terephthalate (PBT), styrene-acrylonitrile resin (SAN), ethylene tetrafluoroethylene (ETFE), vinyl, methacrylate copolymers, foamed polymer, polycarbonates, and combinations thereof.

In some embodiments the one or more polymers of the exposed surface of the coloured particles are selected from a polyethylene, for example linear low density polyethylene (LLDPE), low density polyethylene (LDPE), high density polyethylene (HDPE), or a thermoplastic olefin (TPO), for example a polyethylene based TPO, or a blend of any two or more thereof.

In some embodiments the one or more polymers of the exposed surface of the coloured particles are selected from HDPE, a blend of HDPE and LDPE, or a blend of HDPE and LLDPE.

In some embodiments the coloured particles and/or the one or more polymers of the exposed surface of the coloured particles have a heat deflection temperature (HDT) of at least about 20° C., for example at least about 25, 30, 35, 40, 45, 50, 55, 60, 65, 75, 80, 85, 90, 95, 100, 110, 120, 130, 140, 150, 175, or 200° C. (and useful ranges may be selected from any two of these values, for example from 60 to 100° C.). In some embodiments the coloured particles and/or the one or more polymers of the exposed surface of the coloured particles have a heat deflection temperature (HDT) of at least about 40° C., for example at least about 45, 50, 55, 60, 65, 75, 80, 85, 90, 95, 100, 110, 120, 130, 140, 150, 175, or 200° C. (and useful ranges may be selected from any two of these values, for example from 60 to 100° C.). In some embodiments, such an HDT is provided by a blend of two or more polymers.

In some embodiments the coloured particles and/or the one or more polymers of the exposed surface of the coloured particles and/or the exposed surface to be decorated and/or the one or more polymers of the exposed surface to be decorated have a glass transition temperature (Tg) of about 200° C. or less, for example about 150, 125, 100, 75, 50, or 25° C. or less, or 0° C. or less.

In some embodiments the coloured particles and/or one or more polymers on the exposed surface of the coloured particles have a melt flow index (MFI) from about 0 to about 50 (including fractional melts from 0 to 1), for example from 0 to 45, 0 to 40, 0 to 35, 0 to 30, 0 to 20, 0 to 15, 0 to 10, 0 to 5, 0 to 4, 0 to 3, 0 to 2, 0 to 1, 0 to 0.5.

In some embodiments the one or more polymers of the exposed surface to be decorated are selected from a polyethylene, a polypropylene, a thermoplastic olefin (TPO), or a combination of any two or more thereof.

In some embodiments the one or more polymers of the exposed surface to be decorated are selected from a polyethylene, a thermoplastic olefin (TPO), or a combination of any two or more thereof.

In some embodiments the exposed surface to be decorated and/or the one or more polymers of the exposed surface to be decorated has a heat deflection temperature (HDT) of at least about 20° C., for example at least about 30, 40, 50, 60, 70, 80, or 90° C. In some embodiments, the HDT is from about 20 to about 150° C., for example from about 30 to 150, 40 to 150, 50 to 150, 60 to 150, 70 to 150, 20 to 120, 30 to 120, 40 to 120, 50 to 120, 60 to 120, 70 to 120, 20 to 90, 30 to 90, 40 to 90, 50 to 90, 60 to 90, or 70 to 90° C.

In some embodiments the exposed surface to be decorated and/or the one or more polymers of the exposed surface to be decorated has a heat deflection temperature (HDT) of at least about 70° C., for example at least about 75, 80, 85, or 90° C.

In some embodiments the exposed surface to be decorated and/or the one or more polymers of the exposed surface to be decorated has a heat deflection temperature (HDT) of at least about 90° C.

In some embodiments the decorated surface has a heat deflection temperature (HDT) of at least about 20° C., for example at least about 30, 40, 50, 60, 70, 80, or 90° C. In some embodiments, the HDT is from about 20 to about 150° C., for example from about 30 to 150, 40 to 150, 50 to 150, 60 to 150, 70 to 150, 20 to 120, 30 to 120, 40 to 120, 50 to 120, 60 to 120, 70 to 120, 20 to 90, 30 to 90, 40 to 90, 50 to 90, 60 to 90, or 70 to 90° C.

In some embodiments the decorated surface has a heat deflection temperature (HDT) of at least about 70° C., for example at least about 75, 80, 85, or 90° C.

In some embodiments the coloured particles and/or the one or more polymers of the exposed surface of the coloured particles and/or the exposed surface to be decorated and/or the one or more polymers of the exposed surface to be decorated, preferably the coloured particles and/or the exposed surface to be decorated, have a Vicat softening point of at least about 60° C., for example at least about 61, 62, 63, 64, 65, 66, 67, 68, 69, 70, 71, 72, 73, 74, 75, 76, 77, 78, 79, 80, 81, 82, 83, 84, or 85° C. (and useful ranges may be selected from any two of these values, for example from 70 to 80° C.). The Vicat softening point is provided by a blend of two or more polymers.

In some embodiments the decorated surface has a Vicat softening point of at least about 60° C., for example at least about 61, 62, 63, 64, 65, 66, 67, 68, 69, 70, 71, 72, 73, 74, 75, 76, 77, 78, 79, 80, 81, 82, 83, 84, or 85° C. (and useful ranges may be selected from any two of these values, for example from 70 to 80° C.). The Vicat softening point is provided by a blend of two or more polymers.

In some embodiments:
(a) the coloured particles and/or the one or more polymers of the exposed surface of the coloured particles have an MFI from about 0 to about 10, for example 0 to 9, 0 to 8, 0 to 7, 0 to 6, 0 to 5, 0 to 4, 0 to 3, 0 to 2, or 0 to 1; and/or
(b) the coloured particles and/or the one or more polymers of the exposed surface of the coloured particles have a Tg of about 90° C. or less; and/or
(c) the coloured particles and/or the one or more polymers of the exposed surface of the coloured particles have a HDT of about 90° C. or more; and/or
(d) the coloured particles have an average particles size from about 0.3 to 2 mm, for example 0.5 to 1.5 or 0.5 to 1 mm.

In some embodiments:
(a) the coloured particles and/or the one or more polymers of the exposed surface of the coloured particles have an MFI from about 0 to about 10, for example 0 to 9, 0 to 8, 0 to 7, 0 to 6, 0 to 5, 0 to 4, 0 to 3, 0 to 2, or 0 to 1; and/or
(b) the coloured particles and/or the one or more polymers of the exposed surface of the coloured particles have a Tg of 90° C. or less; and/or
(c) the coloured particles and/or the one or more polymers of the exposed surface of the coloured particles have a HDT of 90° C. or more; and/or
(d) the coloured particles have an average particles size from about 0.3 to 1.5 mm, for example 0.5 to 1 mm.

In some embodiments the decorated surface resembles stone chips or asphalt shingle.

In some embodiments:
(a) the coloured particles and/or one or more polymers of the exposed surface of the coloured particles have an MFI from about 20 or more, for example 20, 25, 30, 35, 40, 50, or 60 or more; and/or
(b) the coloured particles and/or the one or more polymers of the exposed surface of the coloured particles have a Tg of from about −120 to about −70° C.; and/or
(c) the coloured particles and/or the one or more polymers of the exposed surface of the coloured particles have a HDT of about 45° C. or more; and/or
(d) the coloured particles have an average particles size from about 0.1 to 2 mm, for example 0.1 to 1, 0.1 to 0.5, or 0.25 to 0.5 mm.

In some embodiments:
(a) the coloured particles and/or one or more polymers of the exposed surface of the coloured particles have an MFI from about 20 or more, for example 20, 25, 30, 35, 40, 50, or 60 or more; and/or
(b) the coloured particles and/or the one or more polymers of the exposed surface of the coloured particles have a Tg of from about −120 to about −70° C.; and/or
(c) the coloured particles and/or the one or more polymers of the exposed surface of the coloured particles have a HDT of 45° C. or more; and/or
(d) the coloured particles have an average particles size from about 0.1 to 1 mm, for example 0.1 to 0.5 or 0.25 to 0.5 mm.

In some embodiments the decorated surface resembles slate, wooden shingle or shake, or ceramic or clay (roofing) tile.

In some embodiments the amount of coloured particles brought into contact with the exposed surface to be decorated varies across the width and/or length of the exposed surface to be decorated.

In some embodiments the coloured particles brought into contact with the exposed surface to be decorated are distributed across the width and/or length of the exposed surface randomly or in an ordered arrangement.

In some embodiments the method comprises selectively decorating one or more predetermined areas of the exposed surface to be decorated.

In some embodiments:
(a) the coloured particles are selectively brought into contact with one or more predetermined areas of the exposed surface to be decorated; or
(b) at least a portion of the coloured particles brought into contact with the exposed surface to be decorated are selectively removed from one or more predetermined areas of the surface prior to fusion or coalescence of the particles, for example by brushing, blowing, vacuum, or adhesion to another surface, and optionally recycled.

In some embodiments the amount of coloured particles brought into contact with the exposed surface to be decorated in an amount from 1 g to 2,000 g/m$^2$.

In some embodiments from about 1 to about 100% of the surface area of the exposed surface to be decorated is brought into contact with coloured particles, for example from 30 to 100, 40 to 100, 50 to 100, 60 to 100, 70 to 100, 80 to 100, 90 to 100, 95 to 100, 30 to 90, 40 to 90, 50 to 90, 60 to 90, 70 to 90, 80 to 90, 30 to 80, 40 to 80, 50 to 80, 60 to 80, or 70 to 80%.

In some embodiments from about 1 to 100% of the surface area of the decorated surface is coloured by colour provided by the coloured particles after causing the coloured particles to fuse into or to or coalesce with the exposed surface to be decorated, for example from 5 to 100, 10 to 100, 15 to 100, 20 to 100, 25 to 100, 30 to 100, 40 to 100, 50 to 100, 5 to 90, 10 to 90, 15 to 90, 20 to 90, 25 to 90, 30 to 90, 40 to 90, 50 to 90, 5 to 80, 10 to 80, 15 to 80, 20 to 80, 25 to 80, 30 to 80, 40 to 80, 50 to 80%.

In some embodiments the decorated surface varies in colour (including variation in hue, saturation, or brightness or a variation in reflectance) across the width and/or length of the surface.

In some embodiments the decorated surface comprises a plurality of visually differentiable coloured regions, which coloured regions may be the same or different in colour and/or size and/or shape, across the width and/or length of the surface.

In some embodiments the colour across the width and/or length of the decorated surface extends from the surface into a portion of the depth of the substrate (but not the whole of the depth of the substrate).

In some embodiments the surface to be decorated is colourless or uniformly or non-uniformly coloured in any colour (including blend or combinations of different colours).

In some embodiments the surface to be decorated has even or uneven topography.

In some embodiments the exposed surface to be decorated comprises three dimensional surface features, including surface relief, surface texturing, or surface deformations, that contribute to the appearance of the decorated surface.

In some embodiments one or more pluralities of coloured particles and/or the surface to be decorated comprises one or more components susceptible to UV, thermal, and/or other environmental degradation.

In some embodiments the method comprises subjecting the decorated surface to one or more additional processing steps, for example stretching or otherwise or physically deforming the surface of the substrate.

In some embodiments the decorated surface has increased surface hardness, scuff resistance, and/or slip resistance compared to the exposed surface to be decorated.

In some embodiments one or more pluralities of coloured particles and/or the exposed surface to be decorated comprise one or more of the following: light stabilisers, for example one or more UV protectants; thermal stabilisers; biocides; friction enhancers; surface leaching agents or inhibitors.

In some embodiments the particles comprise one or more coloured polymers; the particles comprise a polymeric matrix comprising the one or more polymers within which one or more colourants (and optionally one or more other components) are dispersed; or the particles comprises one or more coatings, the outermost coating defining the exposed surface of the particles comprising the one or more polymers within which one or more colourants (and optionally one or more other components of the particles are encapsulated.

In some embodiments, the temperature to which the coloured particles and/or surface to be decorated are exposed to cause said coloured particles to fuse into or to or coalesce with said exposed surface is at least 60° C., for example at least 65, 70, 75, 80, 85, 90, 95, 100, 110, 120, 130, 140, 150, 160, 170, 180, 190, or 200° C. or more. In some embodiments, the temperature to which the coloured particles and/or surface to be decorated are exposed to cause said coloured particles to fuse into or to or coalesce with said exposed surface is at least 100° C., for example at least 110, 120, 130, 140, 150, 160, 170, 180, 190, or 200° C. or more.

In some embodiments, the pressure to which the coloured particles and/or surface to be decorated are exposed to cause said coloured particles to fuse into or to or coalesce with said exposed surface is at least about 2 bar, for example at least 3 or at least 4 bar, for example from 2 to 10, 3 to 10, or 4 to 10 bar.

In some embodiments, the one or more polymers of the exposed surface of the coloured particles and/or the one or more polymers of the exposed surface to be decorated comprises a polycarbonate.

In some embodiments the one or more polymers of the exposed surface to be decorated and/or one or more polymers of the exposed surface of the coloured particles has a modulus of elasticity of at least about 0.9 MPa, for example at least about 1 MPa.

In some embodiments the modulus of elasticity is from about 0.9 MPa to about 16.2 MPa, for example from about 0.9 to 16, 0.9 to 15, 0.9 to 12, 0.9 to 10, 0.9 to 8, 0.9 to 6, 0.9 to 5, 0.9 to 4, 1 to 15, 1 to 12, 1 to 10, 1 to 8, 1 to 6, 1 to 5, or 1 to 4 MPa.

In some embodiments the one or more polymers of the exposed surface to be decorated comprises one or more elastomers.

In some embodiments the one or more polymers of the exposed surface of the coloured particles comprises one or more elastomers.

In some embodiments the one or more elastomers are selected from thermoplastic elastomers.

In some embodiments the exposed surface to be decorated based on the weight of the material from which the exposed surface to be decorated is formed and/or the coloured particles based on the weight of the particles comprises from about 10 to about 100% w/w one or more elastomers, for example from about 10 to 98, 10 to 95, 10 to 90, 10 to 80, 10 to 70, 10 to 60, 20 to 98, 20 to 95, 20 to 90, 20 to 80, 20 to 70, 20 to 60, 30 to 98, 30 to 95, 30 to 90, 30 to 80, 30 to 70, 30 to 60, 40 to 98, 40 to 95, 40 to 90, 40 to 80, 40 to 70, 40 to 605 w/w, preferably from about 20 to about 60%, or from about 40 to about 60% w/w.

In some embodiments the substrate comprises a layer of a roofing, cladding, or siding module defining the exposed surface to be decorated, optionally wherein the layer is formed of an extruded material comprising filler and/or reinforcement, for example at least 1, 5, 10, 15, 20, 25, 30, 35, 40, 45, 50, 55, 60, 65, 70, 75, 80, 85, 90, or 90% w/w filler and/or reinforcement (and useful ranges may be selected from any two of these values), and one or more polymers.

In some embodiments the substrate further comprises one or more additional layers from which the module is formed.

In some embodiments the method is for producing a roofing, cladding, or siding module having a decorated surface, wherein the module comprises:
an underlapping region extending from a head edge of the module and an exposed region extending from a foot edge of the module, the length of the foot edge defining the length of the module,
wherein the underlapping region is adapted to be substantially covered by the exposed region of an adjacent or overlapping module when installed on a building surface,
wherein the module is formed of at least one layer of extruded material, wherein the layer so formed comprises:
filler and/or reinforcement,
one or more polymer(s).

In some embodiments the method is for producing a roofing, cladding, or siding module having a decorated surface, wherein the module is formed of at least one layer formed of an extruded material comprising at least 40% w/w filler and/or reinforcement and one or more polymers.

In some embodiments the method is for producing a roofing, cladding, or siding module having a decorated surface, wherein the module comprises:
an underlapping region extending from a head edge of the module and an exposed region extending from a foot edge of the module, the length of the foot edge defining the length of the module, wherein the underlapping region is adapted to be substantially covered by the exposed region of an adjacent or overlapping module when installed on a building surface, wherein the module is formed of at least one layer of extruded material, wherein the layer so formed comprises:

at least 40% w/w filler and/or reinforcement, one or more polymer(s).

In some embodiments the one or more polymers of the extruded material comprises one or more elastomers, for example one or more thermoplastic elastomers.

In some embodiments one or more layers of the module, such as the layer defining the surface to be decorated, and/or the decorated surface has a Shore A hardness at least 60, for example at least about 65, 70, 75, 80, 85, or 90 (and useful ranges may be selected from any two of these values, for example, from about 60 to 90, 70 to 90, or 80 to 90); and a Shore D hardness of less than about 60, for example less than about 55, 50, 45, 40, 35, or 30 (and useful ranges may be selected from any two of these values, for example, from about 60 to 30, 50 to 30, or 40 to 30), any useful ranges may be selected from any Shore A and Shore D values (for example, a Shore A hardness of at least about 60 and a Shore D hardness less than about 60, or a Shore A hardness of at least 70 and a Shore D hardness less than 50). Both Shore A hardness and Shore D hardness may be determined by procedures in accordance with ASTM D2240-00.

In some embodiments the layer comprises at least 60% w/w filler and/or reinforcement.

In some embodiments the layer comprises about 60% to about 95% w/w filler and/or reinforcement.

In some embodiments the layer comprises at least about 5% w/w reinforcement.

In some embodiments the layer comprises about 5% to about 30%, for example 5% to 20%, w/w reinforcement.

In some embodiments the reinforcement comprises or consists or consists essentially of fibres, for example one or more non-conductive natural or synthetic fibres, such as glass fibres, carbon fibres, polymer fibres, and the like.

In some embodiments the fibres are aligned along the length of the module.

In some embodiments the reinforcement comprises or consists or consists essentially of glass fibres.

In some embodiments the glass fibres, prior to processing (e.g., prior to the extrusion process) are between about 0.5 to 15 mm, 0.5 to 10 mm, or 0.5 and 5 mm in length (or may be about 1-15 mm, 1-10 mm, 1-5 mm, or about 2-5 mm, or about 3-5 mm in length) and about 0.015 to about 0.018 mm in diameter.

In some embodiments the layer comprises at least about 5% w/w glass fibres, preferably at least about 10% w/w, for example at least about 15% w/w.

In some embodiments the layer comprises from about 5% to 20%, for example from about 10% to 20%, w/w glass fibres.

In some embodiments the layer formed from the extruded material comprises glass fibres having an average length of at least about 100 microns, for example at least about 150, 200, 250, 300, 350, 400, 450, 500, 550, 600, 650, 700, 750, 800, 850, 900, 950, or 1,000 microns.

In some embodiments the layer so formed of a said extruded material is provided as a base or bottom layer of the module, and the module further comprises one or more additional upper layers provided as further layers upon said base or bottom layer.

In some embodiments at least a portion of the module comprises a top layer (or an upper layer or a plurality of upper layers forming a said top layer), a base or bottom layer (or a lower layer or a plurality of lower layers forming a said base or bottom layer), and an intermediate layer (or a plurality of layers forming a said intermediate layer) between the top and base or bottom layers.

In some embodiments at least one layer or each or all of the layers comprises one or more amorphous polymer, or one or more polymer having a degree of crystallinity that is low, for example a degree of crystallinity of less than about 70, 65, 60, 55, 50, 45, 40, 35, 30, 25, 20, 15, or 10%.

In some embodiments at least one layer or each or all of the layers comprises one or more amorphous polymer, or one or more polymer having a degree of crystallinity that for the given polymer is low.

In some embodiments the module and/or one or more layers and/or each or all of the layers of the module has anisotropic thermal expansion, the coefficient of thermal expansion with respect to the length of a module or layer being lower than the coefficient of thermal expansion with respect to the width of the module or layer and/or the coefficient of thermal expansion with respect to the depth of the module or layer.

In some embodiments at least one layer or each or all of the layers has a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).

In some embodiments the absolute difference between the coefficient of thermal expansion of the layer of the module having the highest coefficient of thermal expansion and the layer of the module having the lowest coefficient of thermal expansion is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).

In some embodiments the coefficient of thermal expansion of the module is less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).

In some embodiments the absolute difference between the coefficient of thermal expansion of the decorated surface and the coefficient of thermal expansion of the exposed surface to be decorated is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).

In some embodiments the absolute difference between the coefficient of thermal expansion of the one or more pluralities of coloured particles and coefficient of thermal expansion of the exposed surface to be decorated, such as a layer of a module, is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).

In some embodiments the coloured particles comprise filler and/or reinforcement, for example at least about 1, 2, 3, 4, 5, 10, 15, 20, 25, 30, 35, 40, 45, 50, 55, 60, 65, 70, 75, or 80% w/w filler and/or reinforcement based on the weight of the particles (any useful ranges may be selected between any two of these values).

In some embodiments the coloured particles comprise at least 20, 25, 30, 35, 40, 45, 50, 55, 60, 65, 70, 75, or 80% w/w filler and/or reinforcement based on the weight of the particles (any useful ranges may be selected between any two of these values).

In some embodiments the coloured particles comprise at least 10, 15, 20, 25, 30, 35, 40, 45, 50, 55, 60, 65, 70, 75, or 80% w/w filler based on the total weight of the particles, and useful ranges may be selected from any two of these values (for example, from about 10% to about 80% w/w filler, for example from about 10 to 60, 10 to 40, 15 to 80, 15 to 60, 15 to 40, 20 to 80, 20 to 60, 20 to 40, 40 to 80, or 40 to 60%).

In some embodiments the filler comprises one or more of the following: talc, calcium carbonate, mica, silica (including glass), kaolin, calcium sulphate, magnesium hydroxide, stabilizers, dolomite.

In some embodiments the reinforcement comprises one or more of the following: glass fibres, glass beads, glass flakes, flax, cellulose, wood fibres, wood flour, cotton, sawdust, inorganic fibres, polymer fibres, polymer scrim, polymer knit, polymer weave, aramids, ceramics, carbon fibres.

In some embodiments the filler and/or reinforcement is pre-coloured.

In some embodiments the coloured particles comprises pre-coloured filler and/or reinforcement, preferably pre-coloured filler.

In some embodiments one or more or each or all of the layers of the module comprise pre-coloured filler and/or reinforcement, preferably pre-coloured filler.

In some embodiments the substrate is a polymeric coating or layer of a coating for a roofing, cladding, or siding product or module, and the method comprises joining the polymeric coating or layer with or to one or more other layers of the roofing, cladding, or siding product or module to provide the roofing, cladding, or siding product or module.

In a fifth aspect, the present invention broadly consists in a roofing, cladding, or siding module, comprising:
 an underlapping region extending from a head edge of the module and an exposed region extending from a foot edge of the module, the length of the foot edge defining the length of the module,
 wherein the underlapping region is adapted to be substantially covered by the exposed region of an adjacent or overlapping module when installed on a building surface,
 wherein the module is formed of at least one layer of extruded material, wherein the layer so formed comprises:
  a) at least 40% w/w filler and/or reinforcement,
  b) one or more polymer(s).

In one embodiment, the module comprises a plurality of formed surfaces molded along the length of the module.

In another embodiment, the layer so formed comprises at least 60% w/w filler and/or reinforcement.

In another embodiment, the layer comprises about 60% to about 95% w/w filler and/or reinforcement.

In another embodiment, the layer comprises at least about 5% w/w reinforcement.

In another embodiment, the layer comprises about 5% to about 30% w/w reinforcement.

In another embodiment, the layer comprises at least about 80% filler and at least about 10% reinforcement.

In one embodiment, the layer comprises one or more of the following polymers:
 a) polystyrene (GPPS),
 b) polyethylene terephthalate (PET),
 c) polyester methacrylate (PEM),
 d) high impact polystyrene (HIPS),
 e) acrylonitrile butadiene styrene (ABS),
 f) polyvinyl chloride (PVC),
 g) polyurethanes (PU),
 h) polyethylene (PE), including homopolymer, copolymer, block copolymer and terpolymer forms,
 i) polylactic acid (PLA),
 j) nylon (PA),
 k) acrylics (PMMA),
 l) high density polyethylene (HDPE),
 m) low density polyethylene (LDPE),
 n) linear low density polyethylene (LLDPE),
 o) medium density polyethylene (MDPE),
 p) cross linked polyethylene (PEX),
 q) thermoplastic elastomer (TPE),
 r) thermoplastic polyolefin (TPO),
 s) thermoplastic rubber (TPR),
 t) polypropylene (PP), including homopolymer and copolymer forms,
 u) polybutylene terephthalate (PBT),
 v) styrene-acrylonitrile resin (SAN),
 w) ethylene tetrafluoroethylene (ETFE),
 x) vinyl,
 y) methacrylate copolymers
 z) foamed polymer.

In another embodiment, the filler comprises one or more of the following:
 a) talc,
 b) calcium carbonate,
 c) mica,
 d) silica,
 e) kaolin,
 f) calcium sulphate,
 g) magnesium hydroxide
 h) stabilizers
 i) dolomite.

In another embodiment, the reinforcement comprises one or more non-conductive natural or synthetic fibres.

In another embodiment, the reinforcement comprises one or more of the following:
 a) glass fibres,
 b) glass beads,
 c) glass flakes,
 d) flax,
 e) cellulose,
 f) wood fibres,
 g) wood flour,
 h) cotton, i) sawdust,
j) inorganic fibres,
k) polymer fibres,
l) polymer scrim,
m) polymer knit,
n) polymer weave,
o) aramids,
p) ceramics.

In another embodiment, the layer further comprises one or more of the following:
a) colorants (including but not limited to carbon black, titanium dioxide)
b) flame retardants (including but not limited to magnesium hydroxide, aluminum trihydrate)
e) stabilizers (including but not limited to UV light stabilizers such as hindered amine light stabilizers (HALS), and thermal stabilizers such as phenolics),
f) foaming agents (including but not limited to exothermic, endothermic or gas foaming agents),
g) lubricants
h) biocides (including but not limited to particles of silver, including nano-sized silver particles).

In another embodiment, as a percentage of the total weight of the layer so formed, the filler and/or reinforcement is about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95% or may be numerical values between each of these.

In another embodiment, the layer comprises at least about 65% w/w filler and/or reinforcement, or at least about 70%, or at least about 75%, or at least about 80%, or at least about 85%, or at least about 90% w/w filler and/or reinforcement.

In another embodiment, the layer comprises about 5% to about 25% w/w reinforcement, or about 5% to about 20%, or about 2% to about 15%, or about 2% to about 12%, or about 2% to about 10%, 2% to about 8%, or about 2% to about 5%.

In another embodiment, as a percentage of the total weight of the layer so formed, the reinforcement is about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% or may be numerical values between each of these.

In another embodiment, the layer comprises at least about 10%, or at least about 15% or at least about 20%, or at least about 25% w/w reinforcement.

In another embodiment, the layer comprises up to about 30%, or up to about 25%, or up to about 20%, or up to about 15%, or up to about 10% w/w reinforcement.

In another embodiment, the layer comprises at least about 55% filler and at least about 5% reinforcement, or at least about 60% filler and at least about 5% reinforcement, or at least about 65% filler and at least about 5% reinforcement, or at least about 70% filler and at least about 5% reinforcement, or at least about 75% filler and at least about 5% reinforcement, or at least about 80% filler and at least about 5% reinforcement, or at least about 85% filler and at least about 5% reinforcement, or at least about 90% filler and at least about 5% reinforcement, or may be numerical values between each of these.

In another embodiment, the layer comprises at least about 55% filler and at least about 10% reinforcement, or at least about 60% filler and at least about 10% reinforcement, or at least about 65% filler and at least about 10% reinforcement, or at least about 70% filler and at least about 10% reinforcement, or at least about 75% filler and at least about 10% reinforcement, or at least about 80% filler and at least about 10% reinforcement, or at least about 85% filler and at least about 10% reinforcement, or may be numerical values between each of these.

In another embodiment, the layer comprises at least about 55% filler and at least about 15% reinforcement, or at least about 65% filler and at least about 15% reinforcement, or at least about 70% filler and at least about 15% reinforcement, or at least about 75% filler and at least about 15% reinforcement, or at least about 80% filler and at least about 15% reinforcement, or may be numerical values between each of these.

In another embodiment, the layer comprises at least about 61% filler and at least about 20% reinforcement, or at least about 65% filler and at least about 20% reinforcement, or at least about 70% filler and at least about 20% reinforcement, or at least about 75% filler and at least about 20% reinforcement, or may be numerical values between each of these.

In another embodiment, the layer comprises at least about 61% filler and at least about 25% reinforcement, or at least about 65% filler and at least about 25% reinforcement, or at least about 70% filler and at least about 25% reinforcement, or may be numerical values between each of these.

In another embodiment, the filler comprises calcium carbonate.

In another embodiment, the reinforcement comprises or consists of glass fibres and/or other fibres, including but not limited to carbon fibres, natural fibres such as flax, cellulose, wood fibres, wood flour, cotton, sawdust, and inorganic or polymer fibres, scrim, knits, weave, non-woven, aramids, ceramics, and the like.

In another embodiment, the reinforcement comprises or consists of glass fibres.

In another embodiment, at least a portion of a top surface of the exposed region comprise(s) three dimensional surface features, whether as surface relief or surface texturing.

In another embodiment, said portion comprises surface features resembling one of:
a) asphalt shingle,
b) slate,
c) shingles,
d) shakes,
e) concrete tiles,
f) stone chips,
g) weatherboard,
h) thatch,
i) stone,
j) woodgrain,
k) metal (including but not limited to copper tiles or roofing shingles).

In another embodiment, the surface features are, at least in part, due to coloring, patterning, surface cracking or polymer fracturing or other two-dimensional or three-dimensional ornamentation of said portion.

In another embodiment, the surface features further comprise three-dimensional features including one or more of:
a) surface texturing,
b) surface relief,
c) other three-dimensional pattern or ornamentation configured or arranged to simulate a natural or manufactured material.

In another embodiment, each of the formed surfaces comprises said surface features.

In another embodiment, the roofing, cladding, or siding module further comprises a plurality of formed surfaces, wherein each of the formed surfaces comprises said surface features, and wherein the formed surfaces are joined without weld lines, attachments or injection molding points.

In another embodiment, each formed surface is a molded segment along the length of the module.

In another embodiment, each formed surface comprises an underlapping region and an exposed region, wherein the underlapping region is adapted to be substantially covered by the exposed region of an adjacent or overlapping module when installed on a building surface.

In another embodiment, each formed surface resembles an individual tile or shingle or slate or shake within the module.

In another embodiment, each formed surface resembles a set of tiles or shingles or slates or shakes within the module.

In another embodiment, the module is subsequently sectioned (or divided or partitioned) to provide a plurality of smaller module sections for installation onto a building surface.

In another embodiment, each smaller module section resembles an individual tile or shingle or slate or shake.

In another embodiment, each smaller module section resembles a set, or one or more of, said tiles or shingles or slates or shakes within the section.

In another embodiment, said underlapping region is formed of at least one of said layers so formed of a said extruded material.

In another embodiment, the module comprises a single layer so formed of a said extruded material.

In another embodiment, said layer so formed of a said extruded material is provided as a base or bottom layer of the module, and the module further comprises one or more additional upper layers provided as further layers upon said base or bottom layer.

In another embodiment, said one or more upper layer(s) is formed of an extruded material, said one or more upper layer(s) comprising a different weight percentage of filler and/or reinforcement relative to the base or bottom layer.

In another embodiment, the module comprises of at least three (for example, at least four, five, six, or seven) layers, at least one of said layers formed of said extruded material, alternatively two or more of said layers so formed are of a said extruded material, alternatively three or more of said layers so formed are of a said extruded material, alternatively all of the layers of said module are so formed of a said extruded material, whether the layers of the same or different make-up of filler and/or reinforcement, and said one or more polymers.

In another embodiment, the module comprises a base layer, an intermediate layer and a top layer, the intermediate layer and the top layer being upper layers to a base or bottom layer of the module.

In another embodiment, layers are co-extruded to form the or at least a part of said module.

In another embodiment, layers are joined together in a continuous forming process to form the or at least a part of said module.

In another embodiment, the substantially an entire module is formed by arrangement together of said layer(s) of extruded material.

In another embodiment, the module is at least about 0.5 m long.

In another embodiment, the module is at least about 36 inches long.

In another embodiment, the module is at least about 1 m long, or at least about 1.5 m long, or at least about 2 m long, or at least about 2.5 m long, or at least about 3 m long.

In another embodiment, the module is about 0.3 mm or about 12 inches wide.

In another embodiment, the module is about 0.5 m wide, or is about 0.8 m wide, or is about 1 m wide.

In another embodiment, at least one layer, such as a base or bottom layer of said module, has a low coefficient of thermal expansion. In another embodiment, at least one layer, such as a base or bottom layer of said module, has a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).

In another embodiment, the coefficient of thermal expansion of the module is low, for example less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).

In another embodiment, at least a portion of the module comprises a top layer (or an upper layer or a plurality of upper layers forming a said top layer), a base or bottom layer (or a lower layer or a plurality of lower layers forming a said base or bottom layer), and an intermediate layer (or a plurality of layers forming a said intermediate layer) between the top and base or bottom layers.

In another embodiment, one or more property/properties of one or more of said top layer, intermediate layer and base or bottom layer varies along the length and/or width of the layer.

In another embodiment, one or more property/properties of said top layer is/are different from corresponding one or more property/properties of said intermediate layer and/or base or bottom layer(s).

In another embodiment, one or more property/properties said intermediate layer is/are different from corresponding one or more property/properties of said top layer and/or base or bottom layer(s).

In another embodiment, one or more property/properties said base or bottom layer is/are different from corresponding one or more property/properties of said top layer and/or intermediate layer(s).

In another embodiment, said property/properties comprise(s) one or more of:
a) thickness,
b) surface area
c) tensile strength
d) shear strength
e) resilience
f) elasticity
g) flexibility
h) toughness
i) fire resistance
j) water resistance
k) continuity or uniformity
l) impact resistance
m) resistance to pull through
n) fixing capability
o) chemical resistance p) puncture resistance
q) content of filler and/or reinforcement
r) concentration of filler and/or reinforcement,
s) color
t) microbial resistance
u) temperature resistance
v) light/heat absorption/reflectivity,
w) thermal transfer,
x) shape memory,
y) thermal expansion,
z) grip,
aa) abrasion or scuff resistance,
bb) slip resistance,
cc) adhesion/gluing/bonding capability,
dd) sealing ability.

In some embodiments, slip resistance is provided for by the inclusion of one or more soft polymers, for example polymers having a Shore A hardness at least 60, for example at least about 65, 70, 75, 80, 85, or 90 (and useful ranges may be selected from any two of these values, for example, from about 60 to 90, 70 to 90, or 80 to 90); and a Shore D hardness of less than about 60, for example less than about 55, 50, 45, 40, 35, or 30 (and useful ranges may be selected from any two of these values, for example, from about 60 to 30, 50 to 30, or 40 to 30), any useful ranges may be selected from any Shore A and Shore D values (for example, a Shore A hardness of at least about 60 and a Shore D hardness less than about 60, or a Shore A hardness of at least 70 and a Shore D hardness less than 50). Both Shore A hardness and Shore D hardness may be determined by procedures in accordance with ASTM D2240-00.

In another embodiment, a layer extends across at least a part of the width and/or at least a part of the length of the module to provide for a variation to one or more properties to the module so formed by the at least one layer, the properties selected from one or more of those properties listed above.

In another embodiment, the intermediate layer is a reinforcing layer.

In another embodiment, the intermediate layer is one or more of:
a) a film,
b) a sheet,
c) a mesh,
d) a scrim,
e) a weave,
f) a fibre,
g) a fabric,
h) a wire,
i) a string,
j) a web,
k) plasma coating,
l) adhesive.

In another embodiment, the intermediate reinforcing layer provides for one or more of:
a) resistance against shrinkage,
b) resistance against warping,
c) resistance against tearing,
d) increased toughness,
e) prevention against unwanted deflections of the module,
f) weather resistance,
g) resistance against delamination of the layers,
h) reduced flammability,
i) water resistance,
j) impact resistance,
k) resistance to pull through,
l) fixing capability,
m) chemical resistance,
n) puncture resistance,
o) sealing
p) shape memory,
q) adhesive/gluing/bonding capability,
r) thermal expansion (or contraction),
s) surface texture, and
t) binding of other materials.

In another embodiment, the intermediate layer is chemically and/or mechanically bonded, welded, fused, co-extruded and/or connected to the top layer and/or the base or bottom layer.

In another embodiment, the intermediate layer comprises one or more surface treatment(s).

In another embodiment, the intermediate layer is both chemically and mechanically bonded, welded, fused, co-extruded and/or connected to the top layer and/or the base or bottom layer.

In another embodiment, the intermediate layer comprises one or more of the following three-dimensional surface features to increase or improve the mechanical bond or connection with the top and/or base or bottom layers:
a) surface texturing,
b) surface roughness,
c) projections,
d) corrugations,
e) reinforcements,
f) chemical coating(s),
g) protrusions,
h) apertures,
i) perforations,
j) 3D replication of natural surface, or
k) water repelling features.

In another embodiment, the intermediate layer, when being joined to the top and base or bottom layers, is in a molten or semi-molten or cold but pliable state.

In another embodiment, the module is shaped and/or contoured during the joining or lamination process, while the intermediate layer is in a molten or semi-molten or cold but pliable state or a formable or moldable condition.

In another embodiment, the top and base or bottom layers substantially thermally insulate the intermediate layer, so that the intermediate layer remains, or maintains the condition of being, molten or semi-molten or pliable during the forming process.

In another embodiment, the module is shaped and/or contoured via a casting, thermoforming, pressing or other forming process, whether continuous or discontinuous.

In another embodiment, the property/properties of the intermediate layer is/are varied by deforming the layer when in said molten or semi-molten or cold but pliable state or formable or moldable condition.

In another embodiment, all three layers are in a molten or semi-molten or cold but pliable state or formable or moldable condition when joined together.

In another embodiment, the material for each of the layers is chosen to have a melt flow index and/or heat capacity sufficiently high such that the layers remain molten or semi-molten or pliable while the module is formed.

In another embodiment, the layers are processed at a sufficiently high temperature such that the layers remain molten or semi-molten or pliable while the module is formed.

In another embodiment, the intermediate layer provides a substantially water or liquid resistant barrier, or a water or liquid impermeable barrier between the top and base or bottom layers.

In another embodiment, the top layer and/or base or bottom layer is porous.

In another embodiment, the top layer and/or base or bottom layer is porous due to fracturing of said layer to provide surface ornamentation.

In another embodiment, at least the top layer comprises sections of non-homogenous and/or non-compatible materials, and wherein the intermediate layer provides a binder layer for binding said non-homogenous and/or non-compatible sections to the intermediate layer.

In another embodiment, the top layer comprises a plurality of discontinuous sections formed of different materials, the materials being non-homogenous or non-compatible with each other, and wherein the discontinuous sections are bound to each other via the intermediate layer.

In another embodiment, at least the top layer has a relatively high UV resistance.

In another embodiment, the module is configured to withstand cyclical variations in temperature of about −40 to about 100 degrees Celsius.

In another embodiment, the layers are joined together to form the module in a batch or continuous forming process.

In another embodiment, the layers are formed and joined together in a batch or continuous forming process.

In another embodiment, the layers are extruded in series from two or more (or preferably three) serially arranged extruders.

In another embodiment, one or more of the top, intermediate and base or bottom layers is/are molded by thermoforming, pressing or other method of forming.

In another embodiment, said one or more property/properties of the intermediate layer is/are optimized preferentially along the direction of the length of the module.

In another embodiment, said one or more property/properties of the intermediate layer is/are optimized preferentially along the direction of the width of the module.

In another embodiment, said portion of the module, comprising the top layer, intermediate layer and base or bottom layer, corresponds to the exposed region.

In another embodiment, said portion of the module, comprising the top layer, intermediate layer and base bottom layer, corresponds to the underlapping region.

In another embodiment, the intermediate layer extends from at or adjacent the foot edge, to at or adjacent the underlapping region of the module.

In another embodiment, the roofing, cladding, or siding module further comprises a fastening region adapted to receive one or more fasteners for fixing the module to the or a building surface, preferably the fastening region including a visual guide or boundary markers to allow visual identification of said fastening region.

In another embodiment, the fastening region is substantially adjacent the exposed region and within the underlapping region.

In another embodiment, said portion of the module, comprising the top layer, intermediate layer and base or bottom layer, corresponds to the fastening region.

In another embodiment, said portion of the module, comprising the top layer, intermediate layer and base or bottom layer, corresponds to the exposed region and the fastening region.

In another embodiment, the intermediate layer extends from at or adjacent the foot edge, to within or beyond the fastening region of the module.

In another embodiment, said one or more property/properties of the intermediate layer is/are optimized preferentially within the fastening region.

In another embodiment, the intermediate layer is thicker or comprises thickened regions or other 3-dimensional qualities within the fastening region of the module, preferably the thicker or thickened or other 3-dimensional qualities of the intermediate layer provide for a fastening region capable of retaining a fastener penetrating or pulling through the fastening region or resisting tear of the module by shear force applied to the module or each of the said layers by the fastener.

In another embodiment, the pull through force is at least about 90 N, preferably at least about 100 N.

In another embodiment, said one or more property/properties of the intermediate layer is/are optimized preferentially within the exposed region and fastening region.

In another embodiment, the roofing, cladding, or siding module comprises more than one intermediate layer.

In another embodiment, the roofing, cladding, or siding module comprises discrete intermediate layers in different regions of the module.

In another embodiment, the roofing, cladding, or siding module comprises different intermediate layers in different regions of the module.

In another embodiment, the roofing, cladding, or siding module comprises multiple intermediate layers in one or more regions of the module.

In another embodiment, the top layer is about 0.1 mm to about 50 mm thick.

In another embodiment, the top layer is about 0.1 mm to about 10 mm thick.

Preferably, the top layer is about 0.05, 0.1, 0.2, 0.3, 0.4, 0.5, 0.6, 0.7, 0.8, 0.9 mm thick, or may be numerical values between each of these.

In another embodiment, the intermediate layer is about 0.01 mm to about 10 mm thick.

Preferably, the intermediate layer is about 0.05, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, or 9.5 mm thick, or may be numerical values between each of these.

In another embodiment, the bottom layer is about 0.1 mm to about 50 mm thick.

In another embodiment, the bottom layer is about 0.1 mm to about 10 mm thick.

Preferably, the bottom layer is about 0.5, 1, 2, 3, 4, 5, 6, 7, 8, 9 mm thick, or may be numerical values between each of these.

In another embodiment, each or all of the layers comprise(s) one or more crystalline polymer(s).

In another embodiment, each or all of the layers comprise(s) one or more amorphous polymer(s).

In another embodiment, the top and bottom layers are made of, or comprise, one or more polymer(s) having a higher degree of crystallinity compared to one or more polymer(s) of the intermediate layer.

In another embodiment, the top and bottom layers are made of, or comprise, one or more polymer(s) having a lower degree of crystallinity compared to one or more polymer(s) of the intermediate layer.

In another embodiment, the top and/or bottom layer is made of, or comprises, thermoplastic polyolefin (TPO).

In another embodiment, the intermediate layer is made of, or comprises, homopolymer or copolymer polypropylene (PP).

In another embodiment, the bottom layer and/or intermediate layer is/are foamed.

In some embodiments, the module comprises a layer that provides for chemical resistance and/or a barrier that prevents and/or reduces migration of solvents and/or other chemicals through the layer to adjacent layer(s) of the module, for example from the underside of the module and/or from one more layers disposed beneath the chemical resistance and/or barrier layer to layer(s) disposed above, such as a top layer of the module.

In some embodiments, the chemical resistance and/or barrier layer is an intermediate layer of the module.

In other embodiments, the chemical resistance and/or barrier layer is a base or bottom layer of the module.

In some embodiments, the chemical resistance and/or barrier layer extends across at least a portion, preferably substantially the whole, of the length and width of the exposed region of the module.

In some embodiments the chemical resistance and/or barrier layer additionally extends across a portion, but preferably not the whole, of the length and width of the underlapping region of the module.

In some embodiments the chemical resistance and/or barrier layer does not extend across the underlapping region of the module.

In some embodiments, the chemical resistance and/or barrier layer may be formed on or joined or laminated to one or more other layer(s) of the module before the module is formed or may be formed on or joined or laminated to a layer of the module after the module has been formed.

In some embodiments the chemical resistance layer or barrier layer is formed by a method comprising applying a curable material to a layer of the module, for example before the layer is joined or laminated to one or more other layers of the module or as a post-treatment of a layer of the module after the module has been formed, and curing the curable material, for example using UV radiation, heat, etc.

In some embodiments, the curing is UV curing.

In some embodiments, the curable material is applied to the layer before the layer is joined or laminated to one or more other layers of the module.

In some embodiments, the curable material is applied as a post-treatment of a layer of the module after the module has been formed.

In some embodiments, for example when the chemical resistance and/or barrier layer is an intermediate layer of the module, the chemical resistance and/or barrier layer is formed by a method comprising extrusion or co-extrusion with one or more other layers of the module.

In some embodiments, the chemical resistance layer and/or barrier layer may be subjected to a treatment, for example a plasma or corona treatment or other treatment, that improves adhesion of the layer, for example to an adhesive layer, such as one or more continuous or discontinuous strip of adhesive (optionally which may be exposed upon removal of a release sheet), which may subsequently be applied, joined or laminated thereto.

In some embodiments one or more additional layers may be joined or laminated to the chemical resistance and/or barrier layer, for example an adhesive layer, such as one or more continuous or discontinuous strip of adhesive (optionally which may be exposed upon removal of a release sheet).

In another embodiment, the module is post-treated after being formed.

In another embodiment, the post-treatment may comprise one or more of:
a) shaping,
b) folding,
c) coloring,
d) corrugating,
e) adding surface treatment(s),
f) perforating,
g) laminating,
h) coating,
i) heating,
j) cooling,
k) printing (for example stamping, marking, embossing, coloring, etc.),
l) fusing (for example, to another module, layer, adhesive, or other element, etc),
m) abrasing or smoothing (for example, sand or bead blasting),
n) curing (for example, radiation, including UV, curing),
o) treatment (for example, to improve adhesion of other materials, for example plasma or corona treatment), or
p) cutting.

In some embodiments the post-treatment may comprise coating or laminating the underside or bottom of the module with a chemical resistance layer or barrier layer.

In some embodiments the coating or laminating with a chemical resistance and/or barrier layer comprises applying a curable material to the underside or bottom of the module and curing, for example UV curing.

In some embodiments, the post-treatment further comprises subjecting the chemical resistance and/or barrier layer to a treatment, for example a plasma or corona treatment or other treatment, that improves adhesion of the layer, for example to an adhesive layer, such as one or more continuous or discontinuous strip of adhesive (optionally which may be exposed upon removal of a release sheet), which may subsequently be applied, joined or laminated thereto.

In some embodiments, the post-treatment further comprises joining or laminating an adhesive layer, such as one or more continuous or discontinuous strip of adhesive (optionally which may be exposed upon removal of a release sheet), to the treated chemical resistance and/or barrier layer.

In another embodiment, the module, once formed, is shaped and/or cut and/or folded into:
a) a ridge tile,
b) a hip tile,
c) a barge tile,
d) an apex tile,
e) a flashing,
f) other shape such as a corrugated tile.

In another embodiment, the under surface (e.g. a surface of the module to be placed substantially adjacent to or facing of the building surface upon which the module is to be fastened) of the module is substantially flat.

In another embodiment, the under surface of at least the exposed region of the module comprises a plurality of projections.

In another embodiment, the projections provide surfaces for adhering the exposed region of the module to the top surface of the underlapping region of an adjacent or overlapping module when installed.

In another embodiment, the projections provide reinforcement for the module.

In another embodiment, the projections are pre-formed or post-formed from the same material as the under surface of the module.

In another embodiment, the projections are formed from a different material compared to the under surface of the module and incorporated into the module before, during or after forming the module.

In another embodiment, the projections comprise surface features on a bottom surface.

In another embodiment, the surface features are one or more of:
a) corrugations,
b) serrations,
c) projections,
d) ribs,
e) nodes,
f) surface roughness,
g) 3D replications of natural surface, and
h) water repelling features.

In another embodiment, the projections comprise one or more continuous or discontinuous longitudinal ribs extending along the length of the module.

In another embodiment, the projections comprise one or more continuous or discontinuous transverse ribs extending substantially perpendicular to the length of the module.

In another embodiment, the roofing, cladding, or siding module comprises a plurality of longitudinal ribs spaced between 1 and 1000 mm apart from each other.

In another embodiment, the roofing, cladding, or siding module comprises a plurality of longitudinal ribs spaced about 1 mm to about 50 mm apart from each other and extending substantially parallel to each other.

In another embodiment, the height of the, or each, longitudinal rib is about 1 mm to about 100 mm.

In another embodiment, the height of the, or each, longitudinal rib is about 1 mm to about 10 mm.

In another embodiment, the width of the, or each, longitudinal rib is about 1 to about 1000 mm.

In another embodiment, the width of the, or each, longitudinal rib is about 1 mm to about 10 mm.

In another embodiment, the transverse ribs extend from at, or adjacent, the foot edge to, at, or adjacent, the underlapping region.

In another embodiment, the transverse ribs are spaced about 1 mm to about 100 mm apart from each other.

In another embodiment, the transverse ribs are spaced about 1 mm to about 10 mm apart from each other and extend substantially parallel to each other.

In another embodiment, the height of the transverse ribs tapers from at or adjacent the foot edge to, at, or adjacent, the underlapping region.

In another embodiment, the width of each transverse rib is about 1 mm to about 1000 mm.

In another embodiment, the width of each transverse rib is about 1 mm to about 10 mm.

In another embodiment, the projections comprise a plurality of longitudinal ribs and a plurality of transverse ribs extending substantially perpendicular to the ribs.

In another embodiment, the roofing, cladding, or siding module further comprises one or more continuous or discontinuous strips of adhesive on the top surface of the underlapping region of the module (optionally which may be exposed upon removal of a release sheet), configured to contact projections on the under surface of the exposed region of an adjacent or overlapping module when installed.

In another embodiment, the roofing, cladding, or siding module further comprises one or more continuous or discontinuous strips of adhesive on a bottom surface of the projections (optionally which may be exposed upon removal of a release sheet), configured to contact a top surface of an adjacent or underlapping module when installed.

In another embodiment, the module is formed with a convex precamber perpendicular to the length of the module, such that the exposed region is curved downwardly of the underlapping region.

In another embodiment, the convex precamber applies a preload to said exposed region of the module.

In another embodiment, the module is manufactured via a continuous forming process,
wherein each of the formed surfaces comprises three dimensional surface features,
wherein the formed surfaces are molded, discretely or otherwise, along the length of the module,
wherein the process comprises providing to a continuous forming machine a feed material able to assume and retain a form after being molded between a first forming surface and a second forming surface,
wherein at least the first forming surface comprises a plurality of die faces provided in sequence and configured to mold the three dimensional surface features,
wherein each of said formed surfaces is molded by a die face, and
wherein the number of die faces is offset from the number of formed surfaces in said module.

In another embodiment, there is a greater number of die faces compared to the number of formed surfaces in said module.

In another embodiment, there are fewer die faces compared to the number of formed surfaces in said module.

In another embodiment, there is one excess die face provided along said first forming surface compared to the number of formed surfaces in said module.

In another embodiment, said one excess die face molds the first formed surface of a next module in the continuous forming process.

In another embodiment, each formed surface has three dimensional surface features which are different from the surface features of adjacent formed surfaces.

In another embodiment, each of the formed surfaces within the module has three dimensional surface features which are different from the surface features of any other formed surface within the module.

In another embodiment, the offset number of die faces provides for the module to be formed with a series of formed surfaces which are arranged in a non-identical manner to the series of formed surfaces on at least a previously formed module and/or on a module to be subsequently formed in the continuous forming process.

In another embodiment, the offset number of die faces provides for each module to be formed with a series of formed surfaces which are arranged in a non-identical manner to the series of formed surfaces on a plurality of previously formed modules and on a plurality of modules to be subsequently formed.

In another embodiment, the module comprises seven formed surfaces, and said first forming surface comprises eight die faces.

In another embodiment, each die face may be rotated in place to provide for a different orientation of three dimensional surface features on the formed surface to be molded.

In another embodiment, each die face may be swapped with another die face along said first forming surface.

In another embodiment, at least the or a portion of the top surface of the exposed region is colored or treated in a manner so as to yield a visually observable color, by applying colored particles onto at least a portion of the top surface of the top layer before joining the layers together.

In another embodiment, at least the or a portion of the top surface of the exposed region is colored by applying colored particles onto at least a portion of the top surface of the top layer while the layers are being joined together.

In another embodiment, at least the or a portion of the top surface of the exposed region is colored by applying colored particles onto at least a portion of the top surface of the top layer after the layers have been joined together.

In another embodiment, the colored particles once applied to at least a portion of the top surface may form at least a further additional layer of material upon the module. In some examples, the colored particles comprises a polymer (or a polymer comprises a colored material) which is then applied to a surface of a layer so formed as a part of the module, and forms an additional layer of the module. For example, the colored particles may comprise of a material which may melt when put into contact with the top surface (or may be melted by application of heat or by a thermal transfer process), and the colored particles becomes an additional layer of the module. The colored particles may become fused or melted into the top surface of the layer to which the colored particles are applied, thereby forming a part of the layer to which it was applied.

In another embodiment, the module is formed by molding, and at least a portion of a top surface of the module is a colored and/or decorated and/or textured by applying a colored particles onto at least a portion of the top surface of a precursor of the module, wherein the colored particles are applied before and/or during and/or after the molding process.

In another embodiment, the precursor is molded between a first forming surface and a second forming surface to form the module, and the colored particles are applied to at least a portion of the first forming surface, wherein the colored particles are transferred to said portion of the precursor during the molding step.

In another embodiment, the first forming surface comprises at least one die face configured to mold surface features onto at least a portion of a top surface of the module, wherein the colored particles are applied to at least a portion of said die face prior to the molding step.

In another embodiment, the colored particles are applied directly or indirectly to the precursor and/or the forming surface by one or more of:
   a) stamping,
   b) injecting,
   c) embossing,
   d) spraying,
   e) rolling,
   f) feeding,
   g) brushing,
   h) melting,
   i) immersing,
   j) dipping,
   k) sprinkling,
   l) depositing,
   m) by drawing or suctioning the colored particles onto the precursor and/or forming surface using a vacuum system.

In another embodiment, at least a portion of the module comprises a plurality of layers, and the colored particles are applied to at least a portion of the top surface of the top-most layer prior to or during a step of joining of the layers to form the module.

In another embodiment, at least the top-most layer is extruded, and the colored particles are applied to said portion of the upper surface of the layer as the layer emerges from the extrusion die or an extruder.

In another embodiment, the colored particles are in the form of a powder and/or in a fluid capable of being dispersed upon at least the or a portion of the top surface of the exposed region, whether the application is direct or indirect to the surface or whether a die face is used to convey the colored particles to the surface.

In another embodiment, the colored particles comprises charged particles configured to be attracted to said portion of the top surface of said precursor and/or said first forming surface and/or said second forming surface.

In another embodiment, the colored particles comprises charged particles configured to be ejected from a source of such charged particles onto the top surface of the precursor and/or said first forming surface and/or said second forming surface.

In another embodiment, the colored particles comprises an adhesive for attaching to said portion of the top surface of said precursor and/or said first forming surface and/or said second forming surface.

In another embodiment, the colored particles are applied through a stencil and/or mask, to selectively color one or more portions of said top surface of the precursor and/or said first forming surface and/or said second forming surface.

In another embodiment, the colored particles are applied to the module in multiple application steps, being one or more of:
   a) applying different colored particles to said portion of the precursor,
   b) applying colored particles to a different portion of said precursor
   c) applying colored particles through a different stencil or mask.

In another embodiment, the colored particles have a plurality different melt flow indices.

In another embodiment, the module has at least one surface colored and/or decorated and/or textured by the colored particles to resemble one of:
   a) asphalt shingles,
   b) slate,
   c) shingles,
   d) shakes,
   e) concrete tiles,
   f) stone chips,
   g) weatherboard,
   h) thatch,
   i) stone,
   j) woodgrain,
   k) metal.

In another embodiment, at least a portion of a top surface of the module is a colored and/or decorated and/or textured by applying colored particles onto at least a portion of the top surface of the module after the module has been formed by a molding/joining/laminating process.

In another embodiment, the module may comprise further features as described in any one of the following aspects or embodiments.

In a sixth aspect, the present invention broadly consists in a roofing, cladding, or siding module, comprising:
   an underlapping region extending from a head edge of the module and an exposed region extending from a foot edge of the module, the length of the foot edge defining the length of the module,
   wherein the underlapping region is adapted to be substantially covered by the exposed region of an adjacent or overlapping module when installed on a building surface, and
   wherein at least a portion of the module comprises a top layer (or an upper layer or a plurality of upper layers forming a said top layer), a bottom layer (or a lower layer or a plurality of lower layers forming a said bottom layer), and an intermediate layer (or a plurality of layers forming a said intermediate layer) between the top and bottom layers, and wherein one or more property/properties of the intermediate layer varies along the length and/or width of the layer.

In one embodiment, said property/properties comprise(s) one or more of:
a) thickness,
b) surface area
c) tensile strength
d) shear strength
e) resilience
f) elasticity
g) flexibility
h) toughness
i) fire resistance
j) water resistance
k) continuity or uniformity
l) impact resistance
m) resistance to pull through
n) fixing capability
o) chemical resistance
p) puncture resistance
q) content of filler and/or reinforcement
r) concentration of filler and/or reinforcement
s) color
t) microbial resistance
u) temperature resistance
v) light/heat absorption/reflectivity,
w) thermal transfer,
x) shape memory,
y) thermal expansion,
z) grip,
aa) abrasion or scuff resistance,
bb) slip resistance,
cc) adhesion/gluing/bonding capability,
dd) sealing ability.

In another embodiment, the intermediate layer is a reinforcing layer.

In another embodiment, the intermediate layer is one or more of:
m) a film,
n) a sheet,
o) a mesh,
p) a scrim,
q) a weave,
r) a fibre,
s) a fabric,
t) a wire,
u) a string,
v) a web,
w) a plasma coating,
x) an adhesive In another embodiment, the intermediate reinforcing layer provides for one or more of:
a) resistance against shrinkage,
b) resistance against warping,
c) resistance against tearing,
d) increased toughness,
e) prevention against unwanted deflections of the module,
f) weather resistance,
g) resistance against delamination of the layers,
h) reduced flammability,
i) water resistance,
j) impact resistance,
k) resistance to pull through,
l) fixing capability,
m) chemical resistance,
n) puncture resistance,
o) sealing
p) shape memory
q) adhesive/gluing/bonding capability,
r) thermal expansion (or contraction),
s) surface texture, and
t) binding of other materials.

In another embodiment, the intermediate layer is chemically and/or mechanically bonded, welded, fused, co-extruded and/or connected to the top layer and/or the bottom layer.

In another embodiment, the intermediate layer comprises one or more surface treatment(s), optionally to increase one or more physical properties of the layer (e.g., adhesive capability).

In another embodiment, the intermediate layer is both chemically and mechanically bonded, welded, fused, co-extruded and/or connected to the top layer and/or the bottom layer.

In another embodiment, the intermediate layer comprises one or more of the following three-dimensional surface features to increase the mechanical bond or connection with the top and/or bottom layers:
a) surface texturing,
b) surface roughness,
c) projections,
d) corrugations,
e) reinforcements,
f) chemical coating(s),
g) protrusions,
h) apertures,
i) perforations,
j) 3D replications of natural surface, or
k) water repelling features.

In another embodiment, the intermediate layer, when being joined to the top and bottom layers, is in a molten or semi-molten or cold but pliable state.

In another embodiment, the module is shaped and/or contoured during the joining or lamination process, while the intermediate layer is in a molten or semi-molten or cold but pliable state or a formable or moldable condition.

In another embodiment, the module is shaped and/or contoured via a casting, thermoforming, pressing or other forming process, whether continuous or discontinuous.

In another embodiment, the property/properties of the intermediate layer is/are varied by deforming the layer when in said molten or semi-molten or cold but pliable state or formable or moldable condition.

In another embodiment, all three layers are in a molten or semi-molten or cold but pliable state or formable or moldable condition when joined together.

In another embodiment, the material for each of the layers is chosen to have a melt flow index and/or heat capacity sufficiently high such that the layers remain molten or semi-molten or pliable while the module is formed.

In another embodiment, the layers are processed at a sufficiently high temperature such that the layers remain molten or semi-molten or pliable while the module is formed.

In another embodiment, the layers are joined together to form the module in a batch or continuous forming process.

In another embodiment, the layers are formed and joined together in a batch or continuous forming process.

In another embodiment, one or more of the top, intermediate and bottom layers is/are extruded.

In another embodiment, the layers are co-extruded.

In another embodiment, the layers are extruded in series from two or more (or preferably three) serially arranged extruders.

In another embodiment, one or more of the top, intermediate and bottom layers is/are molded by thermoforming, pressing or other method of forming.

In another embodiment, said one or more property/properties of the intermediate layer is/are optimized preferentially along the direction of the length of the module.

In another embodiment, said one or more property/properties of the intermediate layer is/are optimized preferentially along the direction of the width of the module.

In another embodiment, said portion of the module, comprising the top layer, intermediate layer and bottom layer, corresponds to the exposed region.

In another embodiment, said portion of the module, comprising the top layer, intermediate layer and bottom layer, corresponds to the underlapping region.

In another embodiment, the intermediate layer extends from at or adjacent the foot edge, to at or adjacent the underlapping region of the module.

In another embodiment, the roofing, cladding, or siding module further comprises a fastening region adapted to receive one or more fasteners for fixing the module to the building surface, preferably the fastening region including a visual guide or boundary markers to allow visual identification of said fastening region.

In another embodiment, the fastening region is substantially adjacent the exposed region and within the underlapping region.

In another embodiment, said portion of the module, comprising the top layer, intermediate layer and bottom layer, corresponds to the fastening region.

In another embodiment, said portion of the module, comprising the top layer, intermediate layer and bottom layer, corresponds to the exposed region and the fastening region.

In another embodiment, the intermediate layer extends from at or adjacent the foot edge, to within or beyond the fastening region of the module.

In another embodiment, said one or more property/properties of the intermediate layer is/are optimized preferentially within the fastening region.

In another embodiment, the intermediate layer is thicker or comprises thickened regions or other 3-dimensional qualities within the fastening region of the module, preferably the thicker or thickened or other 3-dimensional qualities of the intermediate layer provide for a fastening region capable of retaining a fastener penetrating or pulling through the fastening region or resisting tear of the module by shear force applied to the module or each of the said layers by the fastener.

In another embodiment, the pull through force is at least about 90 N, preferably at least about 100 N.

In another embodiment, said one or more property/properties of the intermediate layer is/are optimized preferentially within the exposed region and fastening region.

In another embodiment, the roofing, cladding, or siding module comprises more than one intermediate layer.

In another embodiment, the roofing, cladding, or siding module comprises discrete intermediate layers in different regions of the module.

In another embodiment, the roofing, cladding, or siding module comprises different intermediate layers in different regions of the module.

In another embodiment, the roofing, cladding, or siding module comprises multiple intermediate layers in one or more regions of the module.

In another embodiment, the top layer is about 0.1 to about 50 mm thick. In another embodiment, the top layer is about 0.1 to about 10 mm thick. Preferably, the top layer is about 0.05, 0.1, 0.2, 0.3, 0.4, 0.5, 0.6, 0.7, 0.8, 0.9 mm thick, or may be numerical values between each of these.

In another embodiment, the intermediate layer is about 0.01 to about 10 mm thick. Preferably, the intermediate layer is about 0.05, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, or 9.5 mm thick, or may be numerical values between each of these.

In another embodiment, the bottom layer is about 0.1 to about 50 mm thick In another embodiment, the bottom layer is about 0.1 to about 10 mm thick. Preferably, the bottom layer is about 0.5, 1, 2, 3, 4, 5, 6, 7, 8, 9 mm thick, or may be numerical values between each of these.

In another embodiment, each or all of the layers comprise(s) one or more crystalline polymer(s).

In another embodiment, each or all of the layers comprise(s) one or more amorphous polymer(s).

In another embodiment, the top and bottom layers are made of, or comprise, one or more polymer(s) having a higher degree of crystallinity compared to one or more polymer(s) of the intermediate layer.

In another embodiment, the top and bottom layers are made of, or comprise, one or more polymer(s) having a lower degree of crystallinity compared to one or more polymer(s) of the intermediate layer.

In another embodiment, one or more of the top layer, intermediate layer and bottom layer is/are made of, or comprise, one or more of the following:
 a) polystyrene (GPPS),
 b) polyethylene terephthalate (PET),
 c) polyester methacrylate (PEM),
 d) high impact polystyrene (HIPS),
 e) acrylonitrile butadiene styrene (ABS),
 f) polyvinyl chloride (PVC),
 g) polyurethanes (PU),
 h) polyethylene (PE) including homopolymer, copolymer, block copolymer and terpolymer forms,
 i) polylactic acid (PLA),
 j) nylon (PA),
 k) acrylics (PMMA),
 l) high density polyethylene (HDPE),
 m) low density polyethylene (LDPE),
 n) linear low density polyethylene (LLDPE),
 o) medium density polyethylene (MDPE),
 p) cross linked polyethylene (PEX),
 q) thermoplastic elastomer (TPE),
 r) thermoplastic polyolefin (TPO),
 s) thermoplastic rubber (TPR),
 t) polypropylene (PP), including homopolymer and copolymer forms,
 u) polybutylene terephthalate (PBT),
 v) styrene-acrylonitrile resin (SAN),
 w) ethylene tetrafluoroethylene (ETFE),
 x) vinyl,
 y) methacrylate copolymers
 z) foamed polymer.

In another embodiment, the top and/or bottom layer is made of, or comprises, thermoplastic polyolefin (TPO).

In another embodiment, the intermediate layer is made of, or comprises, homopolymer or copolymer polypropylene (PP).

In another embodiment, the bottom layer and/or intermediate layer is/are foamed.

In another embodiment, the top layer is foamed.

In another embodiment, one or more of the top, intermediate and bottom layers comprise(s) three dimensional surface features, whether as surface relief or surface texturing.

In another embodiment, at least the exposed region of the top layer comprises surface features resembling one of:
  a) asphalt shingle,
  b) slate,
  c) shingles,
  d) shakes,
  e) concrete tiles,
  f) stone chips,
  g) weatherboard,
  h) thatch,
  i) stone,
  j) woodgrain,
  k) metal.

In another embodiment, the surface features are, at least in part, due to coloring, patterning, surface cracking or polymer fracturing or other two-dimensional or three-dimensional ornamentation of said region.

In another embodiment, the surface features further comprise three-dimensional features including one or more of:
  a) surface texturing,
  b) surface relief,
  c) other three-dimensional pattern or ornamentation configured or arranged to simulate a natural or manufactured material.

In another embodiment, the roofing, cladding, or siding module further comprises a plurality of formed surfaces, wherein each of the formed surfaces comprises said surface features, and wherein the formed surfaces are joined without weld lines, attachments or injection molding points.

In another embodiment, each formed surface is a molded segment along the length of the module.

In another embodiment, each formed surface comprises an underlapping region and an exposed region, wherein the underlapping region is adapted to be substantially covered by the exposed region of an adjacent or overlapping module when installed on a building surface.

In another embodiment, each formed surface resembles an individual tile or shingle or slate or shake within the module.

In another embodiment, each formed surface resembles a set of tiles or shingles or slates or shakes within the module.

In another embodiment, the module is subsequently sectioned (or divided or partitioned) to provide a plurality of smaller module sections for installation onto a building surface.

In another embodiment, each smaller module section resembles an individual tile or shingle or slate or shake.

In another embodiment, each smaller module section resembles a set of tiles or shingles or slates or shakes within the section.

In some embodiments, the module comprises a layer that provides for chemical resistance and/or a barrier that prevents and/or reduces migration of solvents and/or other chemicals through the layer to adjacent layer(s) of the module, for example from the underside of the module and/or from one more layers disposed beneath the chemical resistance and/or barrier layer to layer(s) disposed above, such as a top layer of the module.

In some embodiments, the chemical resistance and/or barrier layer is an intermediate layer of the module.

In other embodiments, the chemical resistance and/or barrier layer is a base or bottom layer of the module.

In some embodiments, the chemical resistance and/or barrier layer extends across at least a portion, preferably the substantially the whole, of the length and width of the exposed region of the module.

In some embodiments the chemical resistance and/or barrier layer additionally extends across a portion, but preferably not the whole, of the length and width of the underlapping region of the module.

In some embodiments the chemical resistance and/or barrier layer does not extend across the underlapping region of the module.

In some embodiments, the chemical resistance and/or barrier layer may be formed on or joined or laminated to one or more other layer(s) of the module before the module is formed or may be formed on or joined or laminated to a layer of the module after the module has been formed.

In some embodiments the chemical resistance layer or barrier layer is formed by a method comprising applying a curable material to a layer of the module, for example before the layer is joined or laminated to one or more other layers of the module or as a post-treatment of a layer of the module after the module has been formed, and curing the curable material, for example using UV radiation, heat, etc.

In some embodiments, the curing is UV curing.

In some embodiments, the curable material is applied to the layer before the layer is joined or laminated to one or more other layers of the module.

In some embodiments, the curable material is applied as a post-treatment of a layer of the module after the module has been formed.

In some embodiments, for example when the chemical resistance and/or barrier layer is an intermediate layer of the module, the chemical resistance and/or barrier layer is formed by a method comprising extrusion or co-extrusion with one or more other layers of the module.

In some embodiments, the chemical resistance layer and/or barrier layer may be subjected to a treatment, for example a plasma or corona treatment or other treatment, that improves adhesion of the layer, for example to an adhesive layer, such as one or more continuous or discontinuous strip of adhesive (optionally which may be exposed upon removal of a release sheet), which may subsequently be applied, joined or laminated thereto.

In some embodiments one or more additional layers may be joined or laminated to the chemical resistance and/or barrier layer, for example an adhesive layer, such as one or more continuous or discontinuous strip of adhesive (optionally which may be exposed upon removal of a release sheet).

In another embodiment, the module is post-treated after being formed.

In another embodiment, the post-treatment may comprise one or more of:
  a) shaping,
  b) folding,
  c) coloring,
  d) corrugating,
  e) adding surface treatment(s),
  f) perforating,
  g) laminating,
  h) coating,
  i) heating,
  j) cooling,
  k) printing (for example stamping, marking, embossing, coloring, etc.), l) fusing (for example, to another module, layer, adhesive, or other element, etc), m) abrasing or smoothing (for example, sand or bead blasting), n) curing (for example, radiation, including UV, curing), o) treatment (for example, to improve adhesion of other materials, for example plasma or corona treatment), or p) cutting.

In some embodiments the post-treatment may comprise coating or laminating the underside or bottom of the module with a chemical resistance layer or barrier layer.

In some embodiments the coating or laminating with a chemical resistance and/or barrier layer comprises applying a curable material to the underside or bottom of the module and curing, for example UV curing.

In some embodiments, the post-treatment further comprises subjecting the chemical resistance and/or barrier layer to a treatment, for example a plasma or corona treatment or other treatment, that improves adhesion of the layer, for example to an adhesive layer, such as one or more continuous or discontinuous strip of adhesive (optionally which may be exposed upon removal of a release sheet), which may subsequently be applied, joined or laminated thereto.

In some embodiments, the post-treatment further comprises joining or laminating an adhesive layer, such as one or more continuous or discontinuous strip of adhesive (optionally which may be exposed upon removal of a release sheet), to the treated chemical resistance and/or barrier layer.

In another embodiment, the module, once formed, is shaped and/or cut and/or folded into:
a) a ridge tile,
b) a hip tile,
c) a barge tile,
d) an apex tile,
e) a flashing,
f) other shape such as a corrugated tile.

In another embodiment, the under surface of the module is substantially flat.

In another embodiment, the under surface of at least the exposed region of the module comprises a plurality of projections.

In another embodiment, the projections provide surfaces for adhering the exposed region of the module to the top surface of the underlapping region of an adjacent or overlapping module when installed.

In another embodiment, the projections provide reinforcement for the module.

In another embodiment, the projections comprise one or more continuous or discontinuous longitudinal ribs extending along the length of the module.

In another embodiment, the projections comprise one or more continuous or discontinuous transverse ribs extending substantially perpendicular to the length of the module.

In another embodiment, the projections are pre-formed or post-formed from the same material as the under surface of the module.

In another embodiment, the projections are formed from a different material compared to the under surface of the module and incorporated into the module before, during or after forming the module.

In another embodiment, the projections comprise surface features on a bottom surface.

In another embodiment, the surface features are one or more of:
a) corrugations,
b) serrations,
c) projections,
d) ribs,
e) nodes,
f) surface roughness,
g) 3D replications of natural surface, and
h) water repelling features.

In another embodiment, the intermediate layer provides a substantially water or liquid resistant barrier, or a water or liquid impermeable barrier between the top and bottom layers.

In another embodiment, at least the top layer comprises sections of non-homogenous and/or non-compatible materials, and wherein the intermediate layer provides a binder layer for binding said non-homogenous and/or non-compatible sections to the intermediate layer.

In another embodiment, the top layer comprises a plurality of discontinuous sections formed of different materials, the materials being non-homogenous or non-compatible with each other, and wherein the discontinuous sections are bound to each other via the intermediate layer.

In another embodiment, one or more of the layers further comprises one or more additives, such as, but not limited to, one or more of the following:
a) fillers (including but not limited to talc, calcium carbonate, mica, silica, kaolin, calcium sulphate, magnesium hydroxide, stabilizers, dolomite)
b) colorants (including but not limited to carbon black, titanium dioxide)
c) reinforcements (including but not limited to glass fibres, glass beads, glass flakes, natural fibres such as flax, cellulose, wood fibres, wood flour, cotton, sawdust, and inorganic or polymer fibres, scrim, knits, weave, non-woven, aramids, ceramics)
d) flame retardants (including but not limited to magnesium hydroxide, aluminum trihydrate)
e) stabilizers (including but not limited to UV light stabilizers such as hindered amine light stabilizers (HALS), and thermal stabilizers such as phenolics),
f) foaming agents (including but not limited to exothermic, endothermic or gas foaming agents),
g) lubricants,
h) biocides (including but not limited to particles of silver, including nano-sized silver particles).

In another embodiment, at least the top layer has a high UV resistance.

In another embodiment, the module is configured to withstand cyclical variations in temperature between −40 and 100 degrees Celsius.

In another embodiment, at least the or a portion of the top surface of the exposed region is colored or treated in a manner so as to yield a visually observable color, by applying colored particles onto at least a portion of the top surface of the top layer before joining the layers together.

In another embodiment, at least the or a portion of the top surface of the exposed region is colored by applying colored particles onto at least a portion of the top surface of the top layer while the layers are being joined together.

In another embodiment, at least the or a portion of the top surface of the exposed region is colored by applying colored particles onto at least a portion of the top surface of the top layer after the layers have been joined together.

In another embodiment, the module may comprise a layer of extruded material as described in the fifth aspect or associated embodiments.

In a seventh aspect, the present invention broadly consists in a roofing, cladding, or siding module, comprising:

an underlapping region extending from a head edge of the module and an exposed region extending from a foot edge of the module, wherein the underlapping region is adapted to be substantially covered by the exposed region of an adjacent or overlapping module when installed on a building surface, wherein at least a portion of the module comprises a top layer, a bottom layer, and an intermediate layer between the top and bottom layers, and wherein the intermediate layer provides a substantially water or liquid resistant barrier, or a water or liquid impermeable barrier between the top and bottom layers.

In one embodiment, the top layer and/or bottom layer is porous.

In another embodiment, the top layer and/or bottom layer is porous due to fracturing of said layer to provide surface ornamentation.

In another embodiment, the intermediate layer extends from at or adjacent the foot edge, to at or adjacent the underlapping region of the module.

In another embodiment, the roofing, cladding, or siding module further comprises a fastening region adapted to receive one or more fasteners for fixing the module to the building surface.

In another embodiment, the fastening region is adjacent the exposed region and within the underlapping region.

In another embodiment, the intermediate layer extends from at or adjacent the foot edge, to beyond the fastening region of the module.

In another embodiment, the intermediate layer extends through and along at least the exposed region of the module.

In another embodiment, the module may comprise further features as described in any one of the preceding or following aspects or embodiments.

In another embodiment, the module may comprise a layer of extruded material as described in the fifth aspect or associated embodiments.

In a eighth aspect, the present invention broadly consists in a method of manufacture of a roofing, cladding or siding module comprising a plurality of formed surfaces molded, discretely or otherwise, along the length of the module, wherein each of the formed surfaces comprises three dimensional surface features, the method comprising providing to a continuous forming machine a feed material able to assume and retain a form after being molded between a first forming surface and a second forming surface, wherein at least the first forming surface comprises a plurality of die faces provided in sequence and configured to mold the three dimensional surface features, each of said formed surfaces to be molded by a die face, and wherein the number of die faces is either:
offset from the number of formed surfaces in each module to be formed, or
matches the number of formed surfaces in each module to be formed (for example where the formed surfaces are to be of repeating or matching surfaces).

In one embodiment, there is a greater number of die faces compared to the number of formed surfaces in each module to be formed.

In another embodiment, there are fewer die faces compared to the number of formed surfaces in each module to be formed.

In another embodiment, there is one excess die face provided along said first forming surface compared to the number of formed surfaces in each module to be formed.

In another embodiment, said one excess die face molds the first formed surface of the next module in a continuous forming process.

In another embodiment, each formed surface has three dimensional surface features which are different from the surface features of adjacent formed surfaces.

In another embodiment, each of the formed surfaces within the module has three dimensional surface features which are different from the surface features of any other formed surface within the module.

In another embodiment, the offset number of die faces provides for each module to be formed with a series of formed surfaces which are arranged in a non-identical manner to the series of formed surfaces on at least the previously formed module and/or on the next or a module to be subsequently formed.

In another embodiment, the offset number of die faces provides for each module to be formed with a series of formed surfaces which are arranged in a non-identical manner to the series of formed surfaces on a plurality of previously formed modules and on a plurality of modules to be subsequently formed.

In another embodiment, there are eight die faces along said first forming surface, to mold seven formed surfaces in each module.

In another embodiment, each die face may be rotated in place to provide for a different orientation of three dimensional surface features on the formed surface to be molded.

In another embodiment, each die face may be swapped with another die face along said first forming surface.

In another embodiment, each formed surface resembles an individual tile or shingle or slate or shake within the module.

In another embodiment, the method further comprises a step of sectioning the module once formed, to provide a plurality of smaller module sections for installation onto a building surface.

In another embodiment, the method further comprises post-treating the module once formed.

In another embodiment, the post-treatment may comprise one or more of:
a) shaping,
b) folding,
c) coloring,
d) corrugating,
e) adding surface treatment(s),
f) perforating,
g) laminating,
h) coating,
i) heating,
j) cooling,
k) printing (for example stamping, marking, embossing, coloring, etc.),
l) fusing (for example, to another module, layer, adhesive, or other element, etc),
m) abrasing or smoothing (for example, sand or bead blasting),
n) curing (for example, radiation, including UV, curing),
o) treatment (for example, to improve adhesion of other materials, for example plasma or corona treatment), or
p) cutting.

In another embodiment, the method further comprises shaping and/or cutting and/or folding the module, once formed, into:

a) a ridge tile,
b) a hip tile,
c) a barge tile,
d) an apex tile,
e) a flashing,
f) other shape such as a corrugated tile.

In another embodiment, the module may comprise further features as described in any one of the preceding or following aspects or embodiments.

In another embodiment, the module may comprise a layer of extruded material as described in the fifth aspect or associated embodiments.

In a ninth aspect, the present invention broadly consists in a roofing, cladding, or siding module, wherein at least a portion of the module comprises a top layer, a bottom layer and an intermediate layer between the top and bottom layers,
  wherein the top and bottom layers are made of, or comprise, one or more polymer(s),
  wherein the intermediate layer is made of, or comprise, one or more polymer(s),
  wherein said one or more polymer(s) of the top and bottom layers has/have a lower degree of crystallinity compared to said one or more polymer(s) of the intermediate layer, and
  wherein each layer is in a molten or semi-molten or pliable state when joined to the adjacent layer to form the module.

In one embodiment, the top and bottom layers are made of, or comprise, one or more amorphous or semi-crystalline polymer(s),
  wherein the intermediate layer is made of, or comprise, one or more crystalline or semi-crystalline polymer(s).

In another embodiment, the temperature of the forming process is monitored to control the rheology of each layer such that the layers remain molten or semi-molten or pliable while the module is formed.

In another embodiment, the top and bottom layers substantially thermally insulate the intermediate layer, so that the intermediate layer remains, or maintains the condition of being, molten or semi-molten or pliable during the forming process.

In another embodiment, the intermediate layer is a reinforcing film or sheet.

In another embodiment, one or more of the top, intermediate and bottom layers is/are extruded.

In another embodiment, the layers are co-extruded.

In another embodiment, the layers are extruded in series from an array of serially arranged extruders.

In another embodiment, one or more of the top, intermediate and bottom layers is/are molded by thermoforming, pressing or other method of forming.

In another embodiment, the layers are formed and/or joined together in a continuous forming process.

In another embodiment, the top and/or bottom layers comprise(s) thermoplastic polyolefin
  (TPO).

In another embodiment, the intermediate layer comprises polypropylene (PP).

In another embodiment, the module may comprise further features as described in any one of the preceding or following aspects or embodiments.

In another embodiment, the module may comprise a layer of extruded material as described in the fifth aspect or associated embodiments.

In a tenth aspect, the present invention broadly consists in a roofing, cladding, or siding module, comprising:
  an underlapping region extending from a head edge of the module and an exposed region extending from a foot edge of the module, the length of the foot edge defining the length of the module,
  wherein the exposed region is adapted to substantially cover an underlapping region of an adjacent or overlapping module when installed on a building surface, and
  wherein the under surface of the exposed region comprises a plurality of projections, the projections providing surfaces upon which the exposed region of the module may be adhered to the top surface of the underlapping region of an adjacent or overlapping module when installed.

In one embodiment, said module comprises a plurality of formed surfaces molded along the depth of the module, and wherein said module is formed via a continuous forming process such that said formed surfaces are connected to each other without weld lines or attachment points.

In another embodiment, said module comprises one or more layers formed of an extruded material.

In another embodiment, the projections comprise one or more longitudinal ribs extending along the length of the module.

In another embodiment, the roofing, cladding, or siding module comprises a plurality of longitudinal ribs spaced between 1 and 1000 mm apart from each other.

In another embodiment, the roofing, cladding, or siding module comprises a plurality of longitudinal ribs spaced between 1 and 50 mm apart from each other and extending substantially parallel to each other.

In another embodiment, the height of the, or each, longitudinal rib is between 1 and 100 mm.

In another embodiment, the height of the, or each, longitudinal rib is between 1 and 10 mm.

In another embodiment, the width of the, or each, longitudinal rib is between 1 and 1000 mm.

In another embodiment, the width of the, or each, longitudinal rib is between 1 and 10 mm.

In another embodiment, the projections further comprise a plurality of transverse ribs extending substantially perpendicular to the or each longitudinal rib.

In another embodiment, the transverse ribs extend from at, or adjacent, the foot edge to, at, or adjacent, the underlapping region.

In another embodiment, the transverse ribs are spaced between 1 and 100 mm apart from each other.

In another embodiment, the transverse ribs are spaced between 1 and 10 mm apart from each other and extend substantially parallel to each other.

In another embodiment, the height of the transverse ribs tapers from at or adjacent the foot edge to, at, or adjacent, the underlapping region.

In another embodiment, the width of each transverse rib is between 1 and 1000 mm.

In another embodiment, the width of each transverse rib is between 1 and 10 mm.

In another embodiment, the ribs may be continuous or discontinuous or discrete sections or portions of projections, each of the projected portions providing one or more surfaces upon which the exposed region of the module may be adhered to the top surface of the underlapping region of an adjacent or overlapping module when installed.

In another embodiment, the projections are molded into said under surface of the exposed region of the module.

In another embodiment, the projections are pre-formed or post-formed from the same material as the under surface of the module.

In another embodiment, the projections are formed from a different material compared to the under surface of the module and incorporated into the module before, during or after forming the module.

In another embodiment, the projections comprise surface features on a bottom surface.

In another embodiment, the surface features are one or more of:
- a) corrugations,
- b) serrations,
- c) projections,
- d) ribs,
- e) nodes,
- f) surface roughness,
- g) 3D replications of natural surface, and
- h) water repelling features.

In another embodiment, the projections further reinforce the exposed region of the module.

In another embodiment, the roofing, cladding, or siding module further comprises one or more continuous or discontinuous strips of adhesive on the top surface of the underlapping region of the module (optionally which may be exposed upon removal of a release sheet), configured to contact projections on the under surface of the exposed region of an adjacent or overlapping module when installed.

In another embodiment, the roofing, cladding, or siding module further comprises one or more continuous or discontinuous strips of adhesive on a bottom surface of the projections (optionally which may be exposed upon removal of a release sheet), configured to contact a top surface of an adjacent or underlapping module when installed. In another embodiment, the module is formed with a convex precamber perpendicular to the length of the module, such that the exposed region is curved downwardly of the underlapping region.

In another embodiment, the convex precamber applies a preload to said exposed region of the module.

In another embodiment, the module may comprise further features as described in any one of the preceding or following aspects or embodiments.

In another embodiment, the module may comprise a layer of extruded material as described in the fifth aspect or associated embodiments.

In an eleventh aspect, the present invention broadly consists in a method of coloring or decorating at least a portion of a top surface of a molded roofing, cladding, or siding module, comprising applying colored particles onto at least a portion of the top surface of a precursor of the module to be molded, wherein the colored particles are applied before and/or during the molding process.

In one embodiment, the method further comprises a step of molding the precursor between a first forming surface and a second forming surface to form the module, wherein the colored particles are applied to at least a portion of the first forming surface, and wherein the colored particles are transferred to said portion of the precursor during the molding step.

In another embodiment, the first forming surface comprises at least one die face configured to mold surface features onto at least a portion of a top surface of the module, wherein the colored particles are applied to at least a portion of said die face prior to the molding step.

In another embodiment, the colored particles are applied directly or indirectly to the precursor and/or the forming surface by one or more of:
- a) stamping,
- b) injecting,
- c) embossing,
- d) spraying,
- e) rolling,
- f) feeding,
- g) brushing,
- h) melting,
- i) immersing,
- j) dipping,
- k) sprinkling,
- l) depositing,
- m) by drawing or suctioning the colored particles onto the precursor and/or forming surface using a vacuum system.

In another embodiment, at least a portion of the module comprises a plurality of layers, and wherein the colored particles are applied to at least a portion of the upper surface of the top-most layer prior to or during a step of joining of the layers to form the module. In another embodiment, at least the top-most layer is extruded, and the colored particles are applied to said portion of the upper surface of the layer as the layer emerges from the extrusion die or an extruder.

In another embodiment, the colored particles are in the form of a powder and/or in a fluid capable of being dispersed upon at least the or a portion of the top surface of the exposed region, whether the application is direct or indirect to the surface or whether a die face is used to convey the colored particles to the surface.

In another embodiment, the colored particles comprises charged particles configured to be attracted to said portion of the top surface of said precursor and/or said first forming surface and/or said second forming surface.

In another embodiment, the colored particles comprises charged particles configured to be ejected from a source of such charged particles onto the top surface of the precursor and/or said first forming surface and/or said second forming surface.

In another embodiment, the colored particles comprise an adhesive for attaching to said portion of the top surface of said precursor and/or said first forming surface and/or said second forming surface.

In another embodiment, the colored particles are applied through a stencil and/or mask, to selectively color one or more portions of said top surface of the precursor and/or said first forming surface and/or said second forming surface.

In another embodiment, the method further comprises multiple colored particles application steps, being one or more of:
- a) applying different colored particles to said portion of the precursor,
- b) applying colored particles to a different portion of said precursor
- c) applying colored particles through a different stencil or mask.

In another embodiment, the colored particles have a plurality of different melt flow indices.

In another embodiment, the output is a roofing, cladding, or siding module having at least one surface colored to resemble one of:
- a) asphalt shingles,
- b) slate,
- c) shingles,
- d) shakes, e) concrete tiles,
f) stone chips,
g) weatherboard,
h) thatch,
i) stone,
j) woodgrain,
k) metal.

In another embodiment, the module comprises an underlapping region extending from a head edge of the module and an exposed region extending from a foot edge of the module,
- wherein the underlapping region is adapted to be substantially covered by the exposed region of an adjacent or overlapping module when installed on a building surface, and
- wherein the method comprises coloring the top surface of at least the exposed region of the module.

In another embodiment, the module may comprise further features as described in any one of the preceding or following aspects or embodiments.

In another embodiment, the module may comprise a layer of extruded material as described in the fifth aspect or associated embodiments.

In a twelfth aspect, the present invention broadly consists in a method of coloring at least a portion of a top surface of a molded roofing, cladding, or siding module, comprising applying colored particles onto at least a portion of the top surface of the module after the module has been formed by a molding/joining/laminating process.

In another embodiment, the method may further comprise one or more features as described in the preceding embodiments.

In another embodiment, the module may comprise further features as described in any one of the fifth to twelfth embodiments. In another embodiment, the module may comprise a layer of extruded material as described in the fifth aspect or associated embodiments.

In a thirteenth aspect, the present invention broadly consists in a layer of extruded material, wherein the layer so formed comprises:
a) at least 40% w/w filler and/or reinforcement,
b) one or more polymer(s).

In one embodiment, the layer may be formed (optionally with additional layers) into a roofing, cladding, or siding module. In further embodiments, the layer so formed may be a layer according to any one of the above aspects.

In a fourteenth aspect, the present invention broadly consists in a roofing, cladding, or siding module, comprising:
- an underlapping region extending from a head edge of the module and an exposed region extending from a foot edge of the module, the length of the foot edge defining the length of the module,
- wherein the underlapping region is adapted to be substantially covered by the exposed region of an adjacent or overlapping module when installed on a building surface, and
- wherein at least a portion of the module comprises a top layer (or an upper layer or a plurality of upper layers forming a said top layer), a bottom layer (or a lower layer or a plurality of lower layers forming a said bottom layer), and an intermediate layer (or a plurality of layers forming a said intermediate layer) between the top and bottom layers,
- and wherein at least one or more of said top layer or said intermediate layer or said base or bottom layer comprises a foamed polymer.

In a fifteenth aspect, the present invention broadly consists in an assembly for installation on a building surface comprising a plurality of the roofing, cladding, or siding modules of any one of the preceding or following clauses.

In a sixteenth aspect, the present invention broadly consists in a building surface clad by a plurality of the roofing, cladding, or siding modules of any one of the preceding or following clauses.

In a seventeenth aspect, the present invention broadly consists in a building comprising a surface clad by a plurality of the roofing, cladding, or siding modules of any one of the preceding or following clauses.

In another aspect, the present invention broadly consists in a roofing, cladding, or siding module, preferably a polymeric roofing, cladding, or siding module, having a decorated surface produced by a method of the present invention described herein.

In another aspect, the present invention broadly consists in a roofing, cladding, or siding module, preferably a polymeric roofing, cladding, or siding module, having a decorated surface comprising one or more polymers and a plurality of coloured particles having an initial colour and comprising one or more polymers fused into or to or coalesced with said surface.

In another aspect, the present invention broadly consists in a roofing, cladding, or siding module, preferably a polymeric roofing, cladding, or siding module, having a decorated surface comprising a continuous or unified polymeric matrix comprising one or more polymers, said surface comprising a plurality of visually differentiable coloured regions, which coloured regions may be the same or different in colour and/or size and/shape, across the width and/or length of the surface.

In some embodiments coloured regions or the coloured regions are provided by fusion and/or coalescence of one or more pluralities of coloured particles having an initial colour and an exposed surface comprising one or more polymer into or to or with a surface of the substrate to be decorated comprising one or more polymers.

In some embodiments the substrate, module, coloured particles, decorated surface, and/or surface to be decorated is as defined in any of the aspects and/or embodiments herein.

In some embodiments the module comprises:
- an underlapping region extending from a head edge of the module and an exposed region extending from a foot edge of the module, the length of the foot edge defining the length of the module,
- wherein the underlapping region is adapted to be substantially covered by the exposed region of an adjacent or overlapping module when installed on a building surface,
- wherein the module is formed of at least one layer of extruded material, wherein the layer so formed comprises:
  - filler and/or reinforcement, for example at least 1, 5, 10, 15, 20, 25, 30, 35, 40, 45, 50, 55, 60, 65, 70, 75, 80, 85, 90, or 90% w/w filler and/or reinforcement (and useful ranges may be selected from any two of these values),
  - one or more polymer(s).

In some embodiments the filler and/or reinforcement is pre-coloured.

In some embodiments the coloured particles comprises pre-coloured filler and/or reinforcement, preferably pre-coloured filler.

In some embodiments one or more or each or all of the layers of the module comprise pre-coloured filler and/or reinforcement, preferably pre-coloured filler.

In some embodiments the module is a roofing, cladding, or siding product or module as described in any aspect or embodiment herein.

In some embodiments the module has a decorated surface as described in any aspect or embodiment herein.

In another aspect the present invention broadly consists in a coloured particle for decorating a substrate having an exposed surface to be decorated, the coloured particle having an initial colour and an exposed surface comprising one or more polymer, and wherein the coloured particle comprises filler and/or reinforcement, for example at least about 1, 2, 3, 4, 5, 10, 15, 20, 25, 30, 35, 40, 45, 50, 55, 60, 65, 70, 75, or 80% w/w filler and/or reinforcement based on the weight of the particle (any useful ranges may be selected between any two of these values).

In some embodiments the substrate is selected from concrete, cement, aggregate, geopolymer, metal, for example tin, aluminium, or stainless steel, timber, stone, clay, ceramic, or glass.

In some embodiments the coloured particle provides for adhesion or bonding to the exposed surface of the substrate, for example mechanical adhesion or bonding by keying or interlocking with three-dimensional features of the exposed surface.

In some embodiments the substrate is a substrate having an exposed surface to be decorated comprising one or more polymers, optionally as described in any aspect or embodiment herein.

In some embodiments the substrate comprises a roofing, cladding, or siding product or a coating or a layer of a coating for a roofing, cladding, or siding product.

In some embodiments the coloured particle has a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).

In some embodiments the absolute difference between the coefficient of thermal expansion of the coloured particle and the coefficient of thermal expansion of the surface to be decorated is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).

In some embodiments the coloured particle is for use in a method of decoration as described herein.

In some embodiments the coloured particle is as defined any aspect or embodiment herein.

In another aspect the present invention broadly consists in a plurality of coloured particles of the present invention.

In another aspect the present invention broadly consists in a method of producing a substrate having a decorated surface, the method comprising:

providing one or more pluralities of coloured particles of the present invention;

providing a substrate having an exposed surface to be decorated as described in any aspect or embodiment herein;

bringing into contact said one or more pluralities of coloured particles and said exposed surface to be decorated; and exposing said coloured particles and/or said exposed surface to be decorated to a temperature and pressure sufficient to cause said coloured particles to adhere or bond to the exposed surface to be decorated, said temperature and pressure being controlled over a period of time to thereby produce a substrate having a decorated surface.

In some embodiments the particles mechanically adhere or bond to the exposed surface of the substrate by keying or interlocking with three-dimensional features of the exposed surface.

In some embodiments the surface of the substrate provided at or heated to a temperature sufficient to allow the coloured particles being deposited to melt and/or fuse and/or coalesce with each other on the surface of the substrate.

In some embodiments the amount of particles brought into contact with the surface of the substrate the particles is sufficient to form a continuous polymeric layer or film on the surface of the substrate.

In another aspect the present invention broadly consists in a substrate having a decorated surface produced by a method of the present invention for producing a substrate having a decorated surface.

In another aspect the present invention broadly consists in a substrate having a decorated surface comprising a plurality of coloured particles of the present invention having an initial colour and comprising one or more polymers adhered or bonded to an exposed surface to be decorated of the substrate.

In some embodiments the particles mechanically adhere or bond to the exposed surface of the substrate by keying or interlocking with three-dimensional features of the exposed surface.

In some embodiments the substrate comprises coloured particles melted and/or fused and/or coalesced with each other on the surface of the substrate.

In some embodiments the substrate comprises coloured particles melted and/or fused and/or coalesced with each other on the surface of the substrate so as to form a continuous polymeric layer or film on the surface of the substrate.

In some embodiments the substrate is selected from concrete, cement, aggregate, geopolymer, metal, for example tin, aluminium, or stainless steel, timber, stone, clay, ceramic, or glass.

In some embodiments the coloured particles adhere or bond to the exposed surface of the substrate by mechanical adhesion or bonding, for example by keying or interlocking with three-dimensional features of the exposed surface.

In some embodiments the substrate comprises a roofing, cladding, or siding product or module or a coating or a layer of a coating for a roofing, cladding, or siding product or module.

In some embodiments the substrate comprises a roofing, cladding, or siding module.

In some embodiments the method is for producing a module of the present invention.

In another aspect the present invention broadly consists in a roofing, cladding, or siding module of the present invention produced by a method of the present invention for producing a substrate having a decorated surface.

The term "comprising" as used in this specification and claims means "consisting at least in part of". When interpreting each statement in this specification and claims again that includes the term "comprising", features other than that or those prefaced by the term may also be present. Related terms such as "comprise" and "comprises" are to be interpreted in the same manner.

The present technology is described herein using several definitions, as set forth throughout the specification. Unless otherwise stated, the singular forms "a," "an," and "the" include the plural reference. For example, a reference to "a device" includes a plurality of devices.

As used herein the term "and/or" means "and" or "or", or both.

As used herein "(s)" following a noun means the plural and/or singular forms of the noun.

Relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, the term "formed surface" refers to a molded segment of a polymeric material corresponding to an individual die or mold of a continuous forming machine.

As used herein, the term "building surface" refers to a wall surface or a top surface, etc. of a building, e.g. an exterior wall, a roof, a ceiling, etc., unless otherwise specified. In the context of a roof, the building surface typically comprises a waterproof roofing product attached to the roof deck adjacent an eave of the roof for preventing water damage to the roof deck and an interior of a building from wind-blown rain or water buildup on the roof. The roof deck is typically made of an underlying material, such as plywood. The waterproof membrane may be any of a number of waterproof roofing membranes or underlay known in the art such as but not limited to bituminous waterproof membranes, modified bituminous roofing membranes, self-adhering roofing membranes, or single ply waterproofing roofing membranes (e.g. EPDM waterproof roofing membranes, PVC waterproof roofing membranes, TPO waterproof roofing membranes, synthetic underlay). One exemplary membrane sheet is Deck-Armor™ Roof Protection, manufactured by GAF Corp., Wayne, New Jersey.

As used herein, the terms "profiled" and/or "contoured" mean having a region, or regions which extend above or below a notional planar surface lying along the longitudinal axis of the product. This includes profiling or contouring of only one upper or lower surface, and/or profiling or contouring of an entire thickness of material such that the upper and lower surfaces have the same relative degree of extension above or below the notional planar surface.

As used herein, the term "roofing" means the provision of a protective covering on the roof surface of a building. Without limitation, such a protective covering might take the form of shingles, tiles, panels, shakes, planks, boards, modules, moldings or sheets.

As used herein, the terms "cladding" and/or "siding" mean the provision of a protective covering on a side or other surface of a building. Without limitation, such a protective covering might take the form of shingles, tiles, panels, shakes, planks, boards, modules, moldings or sheets.

As used herein, the term "polymer" (and associated terms such as "polymeric") refers to organic polymers, preferably synthetic polymers, including homopolymers, copolymers, polymer alloys, polymer blends, and polymers with or without additives included therein.

As used herein, the term "mechanical bond" (and associated terms such as "mechanically bonded") means a bond between surfaces which have physical features to create more bonding surface area. For example, the surfaces may have surface textures or other three-dimensional features which allow keying, interlocking, increased friction fit, etc., between the surfaces bonded.

As used herein, the term "w/w" when referring to a component of a layer, refers to the weight of the constituents or components making up the total weight of a layer so formed.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF THE INVENTION

Figure 1:
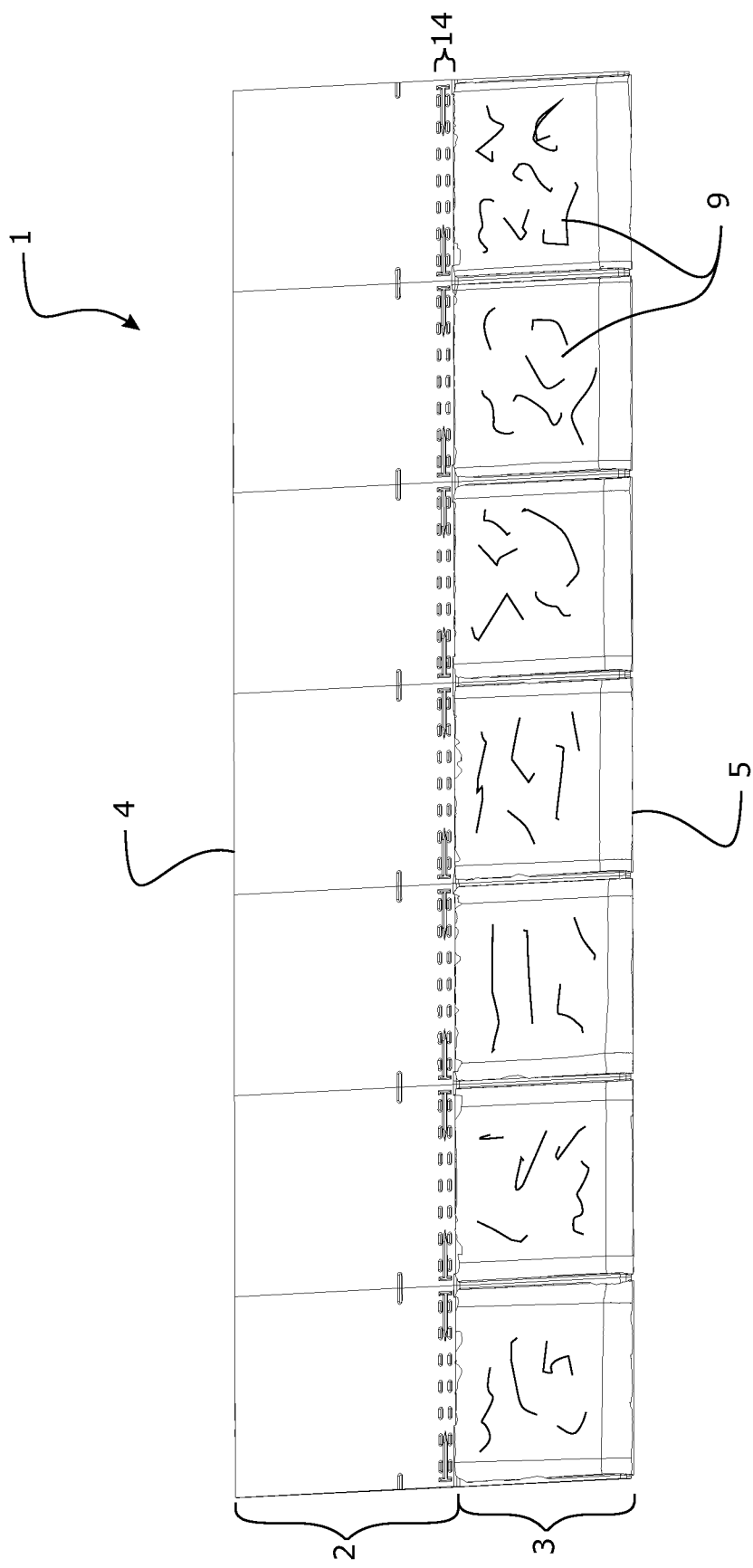
FIG. 1 is a plan view of one preferred embodiment of the roofing, cladding, or siding module of the present invention.

The present invention relates to a method of producing a substrate having a decorated surface. The method can be used to provide decorated surfaces having a wide range of different visual appearances, including the appearance of natural materials such as slate, etc. As well as visual effect, a decorated surface may provide for altered physical or structural features, such as grip, texture, etc, or other properties, such as stability to light or heat.

Coloured Particles

The method comprises providing one or more pluralities of coloured particles having an initial colour and an exposed surface comprising one or more polymer. The coloured particles may be selected to provide a desired in colour in the decorated surface, for example a colour in contrast with the colour of one or more other pluralities of coloured particles or with the colour if any of the surface to be decorated. The variation in colour or coloured regions of the decorated surface provided by the coloured particles may vary in size shape. The initial colour of the coloured particles may change during the processing conditions for producing the decorated surface or on ageing of the substrate. For example, when the substrate comprises a roofing, cladding or siding product or coating or layer of a coating therefore, the initial colour may change over time on prolonged exposure of the product to UV light and/or heat. The initial colour of the coloured particles may also change depending on the shape of the coloured particles.

The initial colour of the particles may be provided by one or more colourants. Suitable colourants will be apparent to those skilled in the art and will depend on the desired initial colour (or final colour on ageing). The colourant may be organic or inorganic, for example a metal salt, such as a metal oxide. In some embodiments, the colourant is a pigment or dye. The colourant may be one or more of commercially available pigments. Examples of colourants include but are not limited to titanium dioxide, red iron oxide, lead chromate, ultramarine blue, molybdate orange, phthalocyanine blue, quinacridone, phthalocyanine green, carbon black, red lake C, black iron oxide; azo, anthraquinone, perinone, quinoline, pyrazolone, dioxazine, isoindoline, phthalocyanine, quinacridone and coumarin derivatives; and cadmium, chromates, iron blue, and cobalt blue. Mixtures of these and other pigments may be used to provide a desired colour. The amount of the one or more colourants in the coloured particles, where applicable, will depend the colourant(s) used.

The colored particles may be of any suitable initial colour, including black or white, and may be transparent, translucent or opaque.

The exposed surface of each particle is polymeric in nature, due to the presence of the one or more polymers. In some embodiments, the particles comprise one or more coloured polymers. In other embodiments, the particles comprise a polymeric matrix comprising the one or more polymers within which one or more colourants (and optionally one or more other components) are dispersed. In other embodiments, the particles comprises one or more coatings, the outermost coating defining the exposed surface of the particles comprising the one or more polymers within which one or more colourants (and optionally one or more other components of the particles are encapsulated. In some embodiments, the coloured particles (including polymer encapsulated particles) are polymer particles.

The coloured particles are provided as discrete or separate particles or divided fragments in any suitable form, for example a powder, pellets, beads, or shredded or ground pellets or beads. The form may depend on the methods by which the coloured particles are obtained. The form of the coloured particles may also depend on the size or shape of the coloured particles desired for a particular application. Differently shaped particles of the same initial colour may, for example, differ in the degree to which they reflect or refract light leading a different visual appearance in the decorated surface.

The coloured particles may be obtained by any suitable method known in the art. For example, coloured particles comprising a polymer matrix comprising the one or more polymers and one or more colourants dispersed therein may be obtained from a suitably coloured masterbatch. The coloured masterbatch may be compounded with or into the one or more polymers and then processed into a shape, for example by grinding, crushing, shredding, palletization, stranding, forming into droplets, etc. Coloured particles comprising a coating comprising the one or more polymers that encapsulates one or more colourants may be prepared by coating or encapsulation methods well known in the art. The thickness of the coating can vary, for example from nanometers or micrometers, or millimeters.

The one or more pluralities of coloured particles may be selected such that the particles and/or the one or more polymers of the exposed surface of the particles have an MFI and/or such that the particles have an average particles size effective at the temperature and pressure to which the coloured particles and/or surface to be decorated are exposed to provide a desired visual appearance in and/or on the decorated surface. As described herein, the visual appearance of a decorated surface produced in accordance with the method of the invention can vary depending on the size of the coloured particles and/or the MFI of the coloured particles and/or one or more polymers of the exposed surface of the particles. Thus, it is possible to control the visual appearance of the decorated surface by selecting coloured particles having such characteristics effective to provide a desired appearance.

The melt flow index (MFI) of a polymer is a measure of the mass of polymer (in grams) that is extruded through a capillary die at a certain temperature and force over a ten minute period. MFI may be determined by a procedure in accordance with ASTM D1238:13 or ISO 1133.1 standards.

The MFI of the one or more polymers of the exposed surface of coloured particles may be determined by testing the MFI of the one or polymers prior to producing the coloured particles or, in some embodiments, by testing the coloured particles themselves.

In some embodiments, the exposed surface of the coloured particles comprises two or more polymers, the MFI of each of the two or more polymers is such that the coloured particles are effective to provide the desired visual appearance. In some embodiments, the MFI of each of the two or more polymers is within a predetermined MFI range, for example from 0 to 10 or from 0 to 5.

The coloured particles and/or one or more polymers of the exposed surface of the particles may have an MFI from about 0 to about 50, including fractional melts from 0 to 1. As described herein, the use of coloured particles having an exposed surface comprising one or more polymers having a low MFI, for example from about 1 to 10, in the method of the present invention can provide a visual appearance of for example discrete, well defined particles embedded in or on the decorated surface; while the use of coloured particles wherein the one or more polymers of the exposed surface have a medium to high MFI, for example from about 20 to 50, can provide a visual appearance of for example diffuse, blurred, poorly defined, or washed-out etc coloured regions in the decorated surface at the same temperature and pressure.

The coloured particles of one or more pluralities of particles may be of a predetermined average particle size, for example an average particle size from about 0.05 mm to about 5 mm. Average particle size may be measured by for example laser diffraction.

Particles of a desired average particles size may be obtained by screening and sieving a mixture comprising particles of various sizes using meshes of appropriate size with vibration. Such mixtures of particles of various sizes may be produced directly by the method employed to form the particles (from a liquid, molten, or semi molten mixture) or by post formation processing of the particles, such as reducing the size of particles of a larger size, for example by milling pellets or beads. In some embodiments, coloured particles of a desired average particle size are produced the method by which the coloured particles are formed (i.e. such that no post formation processing is required).

The one or more polymers of the exposed surface of the coloured particles and the one or more polymer of the exposed surface to be decorated may be the same or different. Typically, the coloured particles are selected such that the one or polymers of the exposed surface of the particles are capable of providing for fusion into or to or coalesce with the one or more polymers of the exposed surface to be decorated at the temperature and pressure that are controlled over a period of time in the method to produce the decorated surface.

The coloured particles and/or one or more polymers of the exposed surface of the particles may be miscible or compatible with the exposed surface to be decorated and/or one or more polymers of the exposed surface to be decorated at a temperature greater than the glass transition temperature (Tg) of the coloured particles and/or one or more polymers of the exposed surface of the particles and/or a temperature greater than the Tg of the exposed surface to be decorated and/or one or more polymers of the exposed surface to be decorated, for example a temperature at least 1° C., at least 5° C. or at least 10° C. greater than the Tg.

The glass transition temperature (or Tg) of a polymer is the temperature at which an amorphous polymer or amorphous regions of a polymer is or are transformed, in a reversible way, from a hard and relatively brittle state to a viscous or rubbery condition. The glass transition temperature may be determined by a procedure in accordance with ASTM E1356, ASTM E1640, ASTM D6604, ISO 11357.2, or ISO 6721 standards.

As used herein, the term "miscible" (and related terms such as "miscibility") with reference to a combination of polymers means capable of forming a single polymeric phase. Miscibility may exist over certain ranges of temperature, pressure, and composition. The presence of a single polymeric phase may be determined by for example light scattering, X-ray scattering, and neutron scattering.

As used herein, the term "compatible" (and related terms such as "compatibility") with reference to a combination of polymers means capable of forming an immiscible polymer blend that exhibits macroscopically uniform physical properties, for example a single Tg or optical purity.

By employing coloured particles having polymers with such miscibility or compatibility characteristics with respect to the polymers of the exposed surface in the method of the present invention, the inventors believe that a decorated surface having a continuous or unified polymeric matrix may be formed on fusion or coalescence of the coloured particles. In some embodiments, the coloured particles and/or one or more polymers of the exposed surface of the coloured particles have a Tg of about 200° C. or less, including 0° C. or less.

The coloured particles and/or the one or more polymers of the exposed surface of the coloured particles may have a heat deflection temperature (HDT) of at least about 20° C., such as at least 40° C., for example from 60 to 200, or 60 to 100° C. Such an HDT may be useful for example, in roofing, cladding or siding products. Such an HDT may be provided by a blend of two or more polymers, each polymer having a different HDT.

HDT is the temperature at which a polymer deforms by a specified amount under a specified load. HDT may be determined by a procedure in accordance with ASTM D 648:16 or ISO 75 standards.

The coloured particles may be of a predetermined shape, such as spherical, cylindrical, cone-shaped, etc., or of random shape; or a mixture thereof. Coloured particles of various shapes may be obtained by various methods known to those skilled in the art, such as shredding, grinding, densifying (increasing the bulk density of the particles by for example heating), etc.

It will be apparent that the one or more polymers of the exposed surface of the coloured particles can be selected from a wide range of suitable polymers. Examples of suitable polymers include but are not limited to polystyrene (GPPS), polyethylene terephthalate (PET), polyester methacrylate (PEM), high impact polystyrene (HIPS), acrylonitrile butadiene styrene (ABS), polyvinyl chloride (PVC), polyurethanes (PU), polyethylene (PE) including homopolymer, copolymer, block copolymer and terpolymer forms, polylactic acid (PLA), nylon (PA), acrylics (PMMA), high density polyethylene (HDPE), low density polyethylene (LDPE), linear low density polyethylene (LLDPE), medium density polyethylene (MDPE), cross linked polyethylene (PEX), thermoplastic elastomer (TPE), thermoplastic polyolefin (TPO), thermoplastic rubber (TPR), polypropylene (PP), including homopolymer and copolymer forms, polybutylene terephthalate (PBT), styrene-acrylonitrile resin (SAN), ethylene tetrafluoroethylene (ETFE), vinyl, methacrylate copolymers, foamed polymer, polycarbonates, and combinations thereof. In some embodiments, the one or more polymers are selected from thermoplastic polymers.

The coloured particles and/or one or more polymers of the exposed surface of the coloured particles are generally selected such that that they do not adversely affect the physical, structural, or aesthetic characteristics of the decorated surface, for example compared to the physical, structural, or aesthetic characteristics of the exposed surface to be decorated or coloured particles. For example, the coloured particles and/or one or more polymers may be selected such that they do not degrade or cause catalytic degradation or cause migration or hydrolysis of one or more components of the coloured particles or surface to be decorated in the decorated surface, do not substantially change the Tg of the decorated surface compared to the surface to be decorated, or do not substantially change the thermal expansion or contraction properties (e.g. the coefficient of thermal expansion) of the surface to be decorated.

Decorated surfaces having a range of different visual appearances may be produced by the method of the present invention. As described herein, the coloured particles used in the method can be selected based on characteristics, such as MFI, Tg, HDT, and/or average particles size, that under the processing conditions employed in method render the particles effective to provide a desired visual appearance.

For example, in some embodiments, a decorated surface resembling stone chips or asphalt shingle are obtained using coloured particles wherein:
  (a) the coloured particles and/or the one or more polymers of the exposed surface of the coloured particles have an MFI from about 0 to about 10, for example 0 to 9, 0 to 8, 0 to 7, 0 to 6, 0 to 5, 0 to 4, 0 to 3, 0 to 2, or 0 to 1; and/or
  (b) the coloured particles and/or the one or more polymers of the exposed surface of the coloured particles have a Tg of 90° C. or less; and/or
  (c) the coloured particles and/or the one or more polymers of the exposed surface of the coloured particles have a HDT of 90° C. or more; and/or
  (d) the coloured particles have an average particles size from about 0.3 to 1.5 mm, for example 0.5 to 1 mm.

In other embodiments, a decorated surface resembling slate, wooden shingle or shake, or ceramic or clay tile is obtained using coloured particles wherein:
  (a) the coloured particles and/or one or more polymers of the exposed surface of the coloured particles have an MFI from about 20 or more, for example 20, 25, 30, 35, 40, 50, or 60 or more; and/or
  (b) the coloured particles and/or the one or more polymers of the exposed surface of the coloured particles have a Tg of from about −120 to −70° C.; and/or
  (c) the coloured particles and/or the one or more polymers of the exposed surface of the coloured particles have a HDT of 45° C. or more; and/or
  (d) the coloured particles have an average particles size from about 0.1 to 1 mm, for example 0.1 to 0.5 or 0.25 to 0.5 mm.

The method may comprise providing multiple pluralities of coloured particles, for example providing two, three, four, or five or more pluralities of coloured particles. Each plurality of particles may be of a different type, for example to provide for increased variation in the visual appearance of the decorated surface. The different types of particles may differ from each other in composition or a physical property or characteristic, for example as set out in the embodiments described herein.

Substrate

The method further comprises providing a substrate having an exposed surface to be decorated comprising one or more polymers. As with the exposed surface of the coloured particles, the exposed surface of to be decorated is polymeric in nature due to the presence of the one or more polymers.

It will be appreciated that the method of the present invention may be used to decorate the surfaces of a wide range of substrates. Suitable substrates include but are not limited to polymeric substrates, such as polymeric films, layers, coatings, and sheets, whether continuous or discrete, polymeric articles, and substrates comprising a polymeric coating or layer of a coating that provides the exposed surface to be decorated. A substrate may be or may be for use in the manufacture of, for example, roofing, cladding, or siding products or modules, a spa, sanitary ware, countertops, bathroom and kitchen fixtures, wall decorations, faucets, frames, door handles, window frames, sinks, shower stalls, building panels, plumbing fixtures, tiles, refrigerator walls, floor coverings, decorative moldings, or any other substrate, material, or article where a decorative surface is desired.

In some embodiments, the substrate is polymeric or comprises a polymeric coating or layer of a coating defining the exposed surface to be decorated. For example, a substrate may be an extruded polymeric film or layer in a molten, unmolten, semi-molten, or cold but pliable state. In some of such embodiments, the method further comprises joining the polymeric substrate or coating or layer with or to one or more other polymer layers.

In certain embodiments, the substrate is a roofing, cladding, or siding product (including roofing, cladding, or siding modules), or a coating or layer of a coating for a roofing, cladding, or siding product, preferably a polymeric roofing, cladding, or siding product, or a polymeric coating or layer of a coating for a roofing, cladding, or siding product, preferably a polymeric roofing, cladding, or siding product. Examples of suitable roofing, cladding, or siding products and modules include but are not limited to those described in WO 2016/088026, the entirety of which is incorporated herein by reference. In certain embodiments where the substrate is a polymeric coating or layer of a coating for a roofing, cladding, or siding product, the method comprises joining the polymeric coating or layer with or to one or more other layers of the roofing, cladding, or siding product to provide the roofing, cladding, or siding product. For example, the polymeric coating or layer may be joined as a top layer with or to a base or bottom layer or an intermediate layer of the product.

In some embodiments, the substrate comprises a formed surface defining the exposed surface to be decorated. As used herein, the term "formed surface" refers to a molded segment of a polymeric material corresponding to an individual die or mold or a plurality of dies or molds of a forming machine.

In some embodiments, the exposed surface to be decorated and/or one or more polymers of the exposed surface to be decorated may have an HDT of at least about 20° C., for example at least about 70° C. The HDT may range from about 20 to about 150° C., for example from about 20 to about 120° C.

In some embodiments, the exposed surface to be decorated and/or one or more polymers of the exposed surface to be decorated, for example where the substrate is a polymeric substrate or a substrate comprising a polymeric coating defining the exposed surface to be decorated, may have an HDT of at least about 70° C., such as at least about 90° C. Such an HDT may be useful for, for example, roofing, cladding or siding products. Such HDT values may be provided by a blend of two or more polymers, each polymer having a different HDT.

In some embodiments the coloured particles and/or the one or more polymers of the exposed surface of the coloured particles and/or the exposed surface to be decorated and/or the one or more polymers of the exposed surface to be decorated, preferably the coloured particles and/or the exposed surface to be decorated, have a Vicat softening point of at least about 60° C., for example at least about 61, 62, 63, 64, 65, 66, 67, 68, 69, 70, 71, 72, 73, 74, 75, 76, 77, 78, 79, 80, 81, 82, 83, 84, or 85° C. (and useful ranges may be selected from any two of these values, for example from 70 to 80° C.). The Vicat softening point may be determined by, for example, a procedure in accordance with ASTM D1525 using a loading 1 of 10±0.2N and a rate B of 120° C.±10° C./hour standard. In some embodiments, such a Vicat softening point is provided by a blend of two or more polymers. One or more polymers of the exposed surface to be decorated and/or one or more polymers of the exposed surface of the coloured particles may have a modulus of elasticity of at least about 0.9 MPa, for example at least about 1 MPa. In some embodiments, the modulus of elasticity is from about 0.9 MPa to about 16.2 MPa, for example from about 0.9 to 16, 0.9 to 15, 0.9 to 12, 0.9 to 10, 0.9 to 8, 0.9 to 6, 0.9 to 5, 0.9 to 4, 1 to 15, 1 to 12, 1 to 10, 1 to 8, 1 to 6, 1 to 5, or 1 to 4 MPa. The modulus of elasticity may be determined by, for example, a procedure in accordance with ASTM D638 standard.

In some of such embodiments, the one or more polymers of the exposed surface to be decorated may comprise one or more elastomers. The term "elastomer" as used herein refers to a polymer exhibiting some degree of elasticity, where elasticity is the ability of a material that has been deformed by a force, such as by stretching, to return at least partially to its original dimensions once the force has been removed.

In some embodiments, the one or more elastomers are selected from thermoplastic elastomers (TPE). Examples of suitable elastomers include but are not limited to TPO elastomers, amorphous polyethylene copolymers, random polyethylene copolymers, block polyethylene copolymers, and the like.

The one or more elastomers in the exposed surface to be decorated, for example, increase the elasticity of the exposed surface, allowing the exposed surface to give during thermal expansion and contraction in one or more dimensions.

The content of the one or more elastomers in the exposed surface to be decorated based on the weight of the material from which the exposed surface to be decorated is formed and/or the content of the one or more elastomers in the coloured particles based on the weight of the particles can vary, for example from about 10 to about 100% w/w, for example from about 10 to 98, 10 to 95, 10 to 90, 10 to 80, 10 to 70, 10 to 60, 20 to 98, 20 to 95, 20 to 90, 20 to 80, 20 to 70, 20 to 60, 30 to 98, 30 to 95, 30 to 90, 30 to 80, 30 to 70, 30 to 60, 40 to 98, 40 to 95, 40 to 90, 40 to 80, 40 to 70, 40 to 605 w/w, preferably from about 20 to about 60%, or from about 40 to about 60% w/w.

As with the one or more polymers of the exposed surface of the coloured particles, the one or more polymers of the exposed surface to be decorated can be selected from a wide range of suitable polymers. The choice of polymer may be determined by the desired application for the substrate. Examples of suitable polymers include but are not limited to those listed above with respect to the one or more polymers of the exposed surface of the coloured particles. In some embodiments, the one or more polymers are selected from thermoplastic polymers. As the range of polymers suitable for a particular application may be limited, the one or more polymers of the exposed surface of the coloured particles may be selected based on the one or more polymers of the exposed surface to be decorated.

The content of the one or more polymers in the coloured particles and surface to be decorated can vary. For example, the content of the one or more polymers may range from about 1 to about 100% w/w based on the weight of the particles or the weight of the material from which the exposed surface to be decorated is formed, such as from 1 to 99 or 1 to 98%. In some embodiments, the coloured particles comprise from about 10 to about 98% w/w of the one or more polymers of the exposed surface of the coloured particles based on the weight of the particles, preferably from about 80 to 98%. In some embodiments, the exposed surface to be decorated comprises from about 10 to about 98% w/w of the one or more polymers of the exposed surface to be decorated based on the weight of the material from which the exposed surface to be decorated is formed, preferably from about 20 to 50%. In some embodiments where the substrate is a polymeric substrate or a substrate comprising a polymeric coating or layer of a coating that provides the exposed surface to be decorated, the polymeric substrate or polymer coating or layer may comprise from about 10 to about 98% w/w of the one or more polymers based on the weight of the polymeric substrate or polymeric coating or layer, preferably from about 20 to 50%.

The coloured particles and/or surface to be decorated may comprise one or more additives, for example one or more inert fillers. Suitable inert fillers, include, for example, alumina (including hydrated forms), titanium dioxide, zinc oxide, zinc sulfide, iron oxide, barium sulfate, zirconium silicate, strontium sulfate, calcium carbonate, carbon black, powdered glass, silica, clay and talc. Preferred inert fillers include titanium dioxide, iron oxide, carbon black, silica, alumina, pigments and combinations thereof.

The amount of inert filler can range, for example, from 0.1 to 15% based on the weight of the particles and/or the exposed surface to be decorated. In some embodiments, the amount of filler ranges from about from 0.1 to 90% or 0.1 to 80% w/w based on the weight of the particles and/or the exposed surface to be decorated. It will be appreciated that the inert filler may enhance the visual differentiation between colour provided by the coloured particles and the surface to be decorated in the decorated surface, for example to provide a mineral-like or granite-like appearance.

The coloured particles and/or exposed surface to be decorate may optionally comprise one or more conventional adjuvants, known to those skilled in the art, for various purposes, for example: dyes, pigments, antioxidants, ultraviolet stabilizers, dispersants, processing aids (such as spray drying aids, lubricants and mold-release agents), flame retardants, polymerization rate-moderators, and viscosity controlling materials. Further examples of such additives include adhesion promoters.

In some embodiments, the coloured particles and/or the exposed surface to be decorated comprise one or more of the following: light stabilisers, for example one or more UV protectants; thermal stabilisers; biocides; friction enhancers; and surface leaching agents or inhibitors.

Processing Steps

The one or more pluralities of particles are brought into contact with the exposed surface to be decorated one or more areas, positions, or locations of the exposed surface to be decorated. The method may comprise more than one such contacting step in which coloured particles which may be the same or of a different type are brought into contact with the exposed surface to be decorated.

Where two or more pluralities of different types of coloured particles are brought into contact with the exposed surface to be decorated, the two or more pluralities may be brought into contact with one or more areas, locations, or positions of the exposed surface to be decorated, which areas, locations or positions may be the same or different or partially overlap, simultaneously and/or sequentially in any order. For example, two or more pluralities of different coloured particles (for example, differently coloured particles) may be blended together such that the two or more pluralities may be brought into contact with the exposed surface to be decorated that the same time.

The coloured particles and surface to be decorated may be brought into contact with each other by any suitable method. In some embodiments, the one or more pluralities of coloured particles may be applied to the exposed surface to be decorated. In other embodiments, the one or more pluralities of coloured particles are applied to a surface and the exposed surface to be decorated applied to the coloured particles.

In one example, the coloured particles are fed into a hopper having an opening for feeding the particles onto a roller rotating at a predetermined rate of rotation. The roller is mounted above a conveyor moving at a pre-determined speed. The substrate to be decorated is laid upon or deposited on the conveyor such that the exposed surface to be decorated is face up. The exposed surface to be decorated is conveyed under the roller and as the roller rotates the coloured particles fed onto the roller are applied to the exposed surface to be decorated.

In another example, the colour particles are fed into a hopper for feeding the particles onto a roller mounted above a conveyor as described above and the particles are applied onto the surface of the conveyor as the roller rotates. The substrate to be decorated is then laid upon or deposited on the colour particles on the surface of the conveyor such that the exposed surface to be decorated is applied to the coloured particles.

In either example, the amount of coloured particles brought into contact with the exposed surface to be decorated and/or the area, location, or position of the exposed surface to be decorate which the coloured particles are brought into contact with can be controlled by, for example, controlling the rate of rotation of the roller and/or the speed of the conveyor or various other commonly used methods for delivering particles, for example vibration.

Thus, in another example, a vibrator is used to deliver the coloured particles at a predetermined rate to one or more predetermined areas of the exposed surface to be decorated. In some embodiments, the one or more pluralities or coloured particles are be immobilised on the surface to which they are applied prior to applying the exposed surface to be decorated to the coloured particles.

In one example, the coloured particles comprise charged particles. The particles are applied to an oppositely charged surface, such as a surface of a mold, to which the exposed surface of the substrate to be decorated is then applied.

In another example, the coloured particles are applied to a permeable surface, such as a sieve having an aperture size smaller than the average particle size of the coloured particles, to which vacuum is applied prior to applying the exposed surface to be decorate to the coloured particles.

In yet another example, the coloured particles are applied to a surface, such as mold, coated with an adhesive prior to applying the exposed surface to be decorated to the coloured particles.

The coloured particles and/or surface to be decorated are exposed to a temperature and pressure sufficient to cause the coloured particles to fuse into or fuse to or coalesce with the exposed surface to be decorated, and the temperature and pressure are controlled over a period time to produce the substrate having a decorated surface. Without wishing to be bound by theory, the inventors believe that, at least in some embodiments, fusion or coalescence of the coloured particles and exposed surface to be decorated produces a decorated surface having continuous or unified polymeric matrix. It will be appreciated that the chemical composition of the polymeric matrix of the decorated surface will vary, for example between the coloured areas or regions provided on fusion on coalescence of the coloured particles and other areas or regions of the decorated surface.

As noted above, the one or more polymers of the particles and the one or more polymers of the exposed surface to be decorated may be the same or different. It will also be appreciated that in certain embodiments the continuous or unified polymeric matrix may comprise multiple polymeric phases, for example where decoration provides a polymer matrix comprising a compatible combination of polymers.

Without wishing to be bound by theory, the inventors believe that fusion or coalescence of the coloured particles into, to, or with the surface to be decorated involves mutual interdiffusion and entanglement of polymer molecules of the one or more polymers of the exposed surface of the coloured particles and polymer molecules of the one or more polymers of the exposed surface to be decorated. Fusion or coalescence reduces the total interfacial area. As is known in the art, various factors may affect fusion or coalescence, including for example the temperature and pressure and the molecular structure or morphology of the polymers involved, such as the molecular weight (MW) and molecular weight distribution. For example, polymer molecules having narrow molecular weight distributions and short chains of linear morphologies, such as certain polyethylenes, may fuse or coalesce more readily than polymer molecules having long chains or complex morphologies.

In some embodiments, the coloured particles and/or surface to be decorated are exposed to a temperature sufficient to cause the coloured particles to fuse into or fuse to or coalesce with the exposed surface to be decorated at atmospheric pressure. In other embodiments, the coloured particles and/or surface to be decorated may be exposed to pressure greater than atmospheric pressure. In such embodiments, the temperature sufficient to cause the coloured particles to fuse into or to or coalesce with the exposed surface to be decorate may be lower than that required at atmospheric pressure.

In some embodiments, after bringing the coloured particles and exposed surface to be decorated into contact, pressure may be applied to the coloured particles and exposed surface to be decorated. Applying pressure causes a mechanical interaction between the exposed surface to be decorated and the coloured particles which can promote fusion or coalescence and, depending on the pressure applied, may also reduce the temperature sufficient to cause fusion or coalescence. Accordingly, in some embodiments, the pressure applied at least partially embeds the coloured particles in the exposed surface to be decorated and/or causes the coloured particles to fuse into or fuse to or coalesce with the exposed surface to be decorated.

Pressure may be applied by any suitable means. In one example, the substrate is conveyed on a conveyor with the exposed surface to decorated and coloured particles face up and pressure is applied to the particles and surface to be decorated using a roller mounted above the conveyor. In another example, the substrate is conveyed on a conveyor with the exposed surface and coloured particles face down in contact with surface of the conveyor and pressure is applied to using a roller to an opposing surface of the substrate. In another example, pressure is applied using a stamp (in a stamping process).

The coloured particles and/or exposed surface to be decorated may be exposed to a temperature sufficient to cause fusion or coalescence at a given pressure by providing the coloured particles and/or exposed surface to be decorated at the desired temperature when bringing the particles and exposed surface to be decorated into contact; and/or heating the coloured particles and/or surface to be decorated to the desired temperature after bringing the coloured particles and exposed surface to be decorated into contact.

Providing the coloured particles at the desired temperature may comprise heating the particles to a temperature at or above the desired temperature prior to bringing the particles and exposed surface to be decorated into contact. Providing the exposed surface to be decorated at the desired temperature may comprise heating the exposed surface to be decorated to or forming the exposed surface to be decorated at the desired temperature prior to bringing the particles and exposed surface to be decorated into contact. In embodiments where the temperature to which the coloured particles and/or the exposed surface to be decorated is heated or the exposed surface to be decorated is formed is above the desired temperature the coloured particles and/or exposed surface to be decorated may be cooled to the desired temperature prior to bringing the particles and exposed surface to be decorated into contact.

Heat may be imparted to the coloured particles and/or the exposed surface to be decorated prior to or after bringing the particles and exposed surface to be decorated into contact by an external source of heat. For example, heat may be imparted using an IR heater or an oven under or through which the particles and/or exposed surface to be decorated are conveyed.

In addition, or alternatively, heat may be imparted by transferring heat from the coloured particles to the exposed surface to be decorated or from the exposed surface to be decorated to the coloured particles, on bringing the particles and exposed surface to be decorated into contact. For example, heat may be imparted to coloured particles on bringing the particles into contact with a polymeric substrate following extrusion and/or molding which the substrate is still hot.

The temperature and pressure sufficient to cause fusion or coalescence are controlled over a period of time to produce the decorated surface. The temperature and pressure may be controlled by any suitable method, for example a sequential or series of separately temperature controlled moulds or sections or regions of a moulding or a post-moulding process can be provided. In this way, the temperature of the substrate or surface of the substrate and the plurality of coloured particles can be controlled according to predetermined or desired processing conditions. It will be appreciated that the period of time for over which the temperature and pressure are controlled can vary depending on the processing conditions, materials used, and desired appearance of the decorated surface.

It will be appreciated that the time over which the temperature and pressure are controlled can vary depending on the temperature and pressure employed. For example, where the coloured particles and/or exposed surface to decorated are exposed to a temperature and pressure significantly greater than that sufficient to cause fusion or coalescence is employed the time over which the temperature and pressure may need to be controlled may be less than that required in methods whether the temperature and pressure is not as great. The temperature to which the coloured particles and/or surface to be decorated are exposed to cause fusion or coalescence may be greater than the Tg of the coloured particles and/or one or more polymers of the exposed surface of the particles and/or greater than the Tg of the surface to be decorated and/or one or more polymers of the exposed surface to be decorated at the pressure to which the coloured particles and/or surface to be decorated are exposed. That is, the temperature to which the particles and surface to be decorated are exposed at the pressure employed may be greater than the Tg at that particular pressure. The temperature is typically at least 1° C. greater than the Tg. The temperature may be at least 5° C. greater, for example at least 10° C. greater, preferably at least 50° C. greater, than the Tg. Without wishing to be bound by theory, the inventors believe that such conditions promote fusion or coalescence of the coloured particles into, to, or with the surface to be decorated.

The temperature to which the coloured particles and/or surface to be decorated are exposed to cause fusion or coalescence (at the particular pressure employed) may vary depending on whether the one or more polymers of the particles or surface to be decorated are, for example amorphous or semi-crystalline. For amorphous polymers, the temperature may for example be at least 100° C. greater than the Tg of the polymer. For semi-cyrstalline polymers, the temperature may for example be greater than the Tg of the polymer by an amount that is at least half of the difference between Tg and Tm of the polymer.

It will be appreciated that the temperature and pressure sufficient to cause fusion or coalescence will depend on the one or more polymers of the exposed surface of the coloured particles and the one or more polymers of the exposed surface to be decorated. Suitable temperatures and pressures will be apparent to those skilled in the art in view of the present disclosure.

The temperature to which the coloured particles and/or surface to be decorated are exposed to cause said coloured particles to fuse into or to or coalesce with said exposed surface may be at least 60° C. In some embodiments, the temperature to which the coloured particles and/or surface to be decorated are exposed to cause said coloured particles to fuse into or to or coalesce with said exposed surface is at least 100° C., for example at least 110, 120, 130, 140, 150, 160, 170, 180, 190, or 200° C. or more.

In some embodiments, the pressure to which the coloured particles and/or surface to be decorated are exposed to cause said coloured particles to fuse into or to or coalesce with said exposed surface is at least about 2 bar, for example at least 3 or at least 4 bar, for example from 2 to 10, 3 to 10, or 4 to 10 bar.

The amount of coloured particles brought into contact with the exposed surface to be decorated may vary across the width and/or length on of the exposed surface to be decorated to create a desired visual appearance. The coloured particles may be randomly distributed across the width and/or length of the exposed or distributed in an ordered arrangement, such as a pattern. Randomly distributed coloured particles may be useful for providing surfaces that resembles a natural material, such as stone or wood. Coloured particles may be dispensed from multiple dispensers configured or arranged to provide a desired appearance in or on the decorated surface. For example, in some embodiments, multiple pluralities of particles of the same or different type are sequentially or successively brought into contact with the surface to be decorated at the same area, location, or position of the surface to be decorated, thus depositing multiples layers of coloured particles on the surface to be decorated.

In some embodiments, it may be desirable to selectively decorate one or more predetermined areas of the exposed surface to be decorated (as opposed to the whole of the exposed surface), for example, where an area of the exposed surface to be decorated will not be visible when the substrate is used for its intended application. Such selective decoration may reduce the amount of coloured particles used in the method, which can reduce costs.

In some embodiments, the coloured particles are selectively brought into contact with one or more predetermined areas of the exposed surface to be decorated. Such selectivity may be achieved by, for example, applying the coloured particles through a stencil and/or mask.

In other embodiments, at least a portion of the coloured particles brought into contact with the exposed surface to be decorated are selectively removed from one or more predetermined areas of the surface prior to fusion or coalescence of the particles. The coloured particles may be selectively removed by for example by brushing, blowing, vacuum, or adhesion to another surface. The removed particles may be subsequently recycled in the method, reducing costs. All or some of the coloured particles may be removed from the one or more predetermined areas, depending on for example the method of removal.

The amount of coloured particles brought into contact with the exposed surface to be decorated may range from about 1 to 2,000 g/m$^2$. It will be appreciated that the amount may depend on the density of the coloured particles.

The percentage of the surface area of the exposed surface to be decorated that is brought in to contact with the coloured particles can range anywhere from about 1 to 100%. For example, in some embodiments, at least 50% or at least 60% of the surface area of the exposed surface to be decorated is brought into contact with (for example, covered with) coloured particles.

The amount of coloured particles brought into contact with the exposed surface to be decorated may be controlled to control the degree to which the surface area of the decorated surface is coloured by colour provided by the coloured particles. The percentage of the surface area of the decorated surface that is coloured by colour provided by the coloured particles after causing the coloured particles to fuse into or to or coalesce with the exposed surface to be decorated can range anywhere from 1 to 100%, but is typically at least 5% or at least 10%.

The MFI and/or HDT of the coloured particles and/or the one or more polymers of the exposed surface of the coloured particles, and/or the average particle size of the coloured particles can affect the extent to which the particles spread, diffuse, or run, etc. on fusion or coalescence into, to, or with the exposed surface to be decorated and thus affect the visual appearance of the decorated surface. The amount of coloured particles brought into contact with the exposed surface to be decorated, the percentage of the surface area of the exposed surface to be decorated that is brought into contact the coloured particles, and the percentage of the surface area of the decorated surface that is coloured by colour provided on fusion or coalescence of the coloured particles may vary depending on such characteristics.

Decorated Surface

The decorated surface produced by the method of the present invention can vary in colour across the width and/or length of the surface. The variation in colour is not limited and may include variation in hue, saturation, or brightness, or a variation in reflectance, etc. In other embodiments, the variation in colour may additionally or alternatively include variation in transparency.

In certain embodiments, the decorated surface comprises a plurality of visually differentiable coloured regions, which coloured regions may be the same or different in colour and/or size and/or shape, across the width and/or length of the surface. The boundaries between visually differentiable coloured regions in the decorated surface may be sharply or clearly defined or may be diffuse or poorly defined and may or may not overlap. The colour of each region may be uniform or may vary.

The colour provided to the decorated surface by the coloured particles may extend into a portion of the depth of the substrate, for example when pressure is applied during the method that at least partially embeds the coloured particles in the surface. In some embodiments, the colour across the width and/or length of the decorated surface may extend from the surface into a portion of the depth of the substrate but not penetrate the whole of the depth of the substrate. In some embodiments, the colour may penetrate or extend into an upper portion of the depth of the substrate but not into a lower portion of the depth of the substrate. For example, in some embodiments where the substrate is a polymeric layer, only an upper portion of the depth of the layer is coloured by colour provided by the coloured particles.

The exposed surface to be decorated may be colourless or coloured. A coloured exposed surface to decorated may be uniformly or non-uniformly coloured in any colour (including blends or combinations of different colours) across the width and/or length of the surface. In some embodiment, the exposed surface to be decorated may provide a background colour or combination of different background colours that contribute, for example by way of colour contrast, to the visual appearance of the decorated surface.

The surface to be decorated may have an even or uneven topography. In some embodiments, the exposed surface to be decorated comprises three dimensional surface features, including surface relief, surface texturing, or surface deformations, that contribute to the appearance of the decorated surface. Such uneven topography and three dimensional surface features may provide decorated surfaces that more closely resemble natural materials such as stone or wood. Alternatively, in some embodiments, the decorated surface is subjected to one or more processing steps to introduce such three dimensional surface features to the decorated surface after production of the decorated surface. For example, the decorated surface may be subjected to thermoforming and/or compression molding.

The one or more pluralities of coloured particles and/or the surface to be decorated comprises one or more components susceptible to UV, thermal, and/or other environmental degradation. In such embodiments, the visual appearance of the decorated surface may change as the substrate ages.

The decorated surface may be subjected to one or more additional processing steps, for example stretching or otherwise or physically deforming the surface of the substrate. It will be appreciated that in some embodiments such additional processing steps may change the visual appearance of the decorated surface.

The method of the present invention may provide a decorated surface having modified properties or performance characteristics, as well as a modified appearance, compared to the surface to be decorated. For example, the decorated surface may have increased scratch or scuff resistance, UV performance, grip or slip resistance, surface hardness, etc.

In some embodiments, the decorated surface has increased surface hardness, scuff resistance, and/or slip resistance compared to the exposed surface to be decorated.

In some embodiments, the decorated surface may have a matt or glossy appearance or may comprise areas or regions of both. The coloured particles may provide the matt or glossy appearance to the decorated surface or preserve a matt or glossy appearance of a surface to be decorated.

It will be appreciated that the method of the present invention can provide decorated surfaces of a range of different visual appearances. For example, in some embodiments, colour provided to the decorated surface by the coloured particles may appear to be "smeared" into or on the exposed surface, resulting in blurred or non-differentiated mineral-like appearance.

In other embodiments, the coloured particles provide a decorated surface having the appearance of discrete particles embedded in or on the surface (a granulated look). As described herein, in some embodiments such an appearance may be obtained using coloured particles of low MFI.

In other embodiments, the colour provided by the coloured particles runs together to provide a decorated surface having a blended or washed out appearance. As described herein, in some embodiments such an appearance may be obtained using coloured particles of medium or high MFI.

The present invention also relates to a substrate having a decorated surface produced by a method according to the present invention.

The present invention also relates to a substrate having a decorated surface comprising one or more polymers and a plurality of coloured particles having an initial colour and comprising one or more polymers fused into or to or coalesced with said surface.

The present invention also relates to a substrate having a decorated surface comprising a continuous or unified polymeric matrix comprising one or more polymers, said surface comprising a plurality of visually differentiable coloured regions, which coloured regions may be the same or different in colour and/or size and/shape, across the width and/or length of the surface. As explained above, the colour of said coloured regions may extend from the surface to be decorated into a portion of the depth of the substrate but in some embodiments not the whole of the depth of the substrate.

Roofing, Cladding, or Siding Products

In certain specifically contemplated embodiments, the substrate is a roofing, cladding, or siding product (including roofing, cladding, or siding modules), for installing onto a building surface or a coating or layer of a coating for a roofing, cladding, or siding product, such as those described in WO 2016/088026, preferably a polymeric product, or a polymeric coating or polymeric layer of a coating. It will be appreciated that such polymeric products, as described herein, may be formed of or consist or consist essentially of or comprise one or more polymeric layers, for example two or more, three or more, four or more, five or more, or six or more polymeric layers.

Roofing, cladding and siding products for installation onto building surfaces need to be lightweight, easy to install, weatherproof, resistant to environmental wear, aesthetically pleasing and preferably economical and efficient to manufacture. Polymeric materials are suitable candidates for roofing, cladding and siding products due to their weight, durability and cost-effectiveness.

However, consumers typically prefer the appearance of more traditional roofing, cladding or siding products, such as asphalt shingles, shingles, slates or shakes, concrete tiles, etc. Accordingly, polymeric products need to be cosmetically treated to simulate the appearance of these more traditional products. Systems and methods for manufacturing these polymeric products need to be suitably flexible, in order to be able to simulate a variety of materials.

In particular embodiments, the roofing, cladding and/or siding module contemplated herein has improved weather resistance (e.g., water resistance, hail-proofing), durability, fire resistance, flame retardant qualities and/or aesthetic qualities. In some embodiments, the method of the present invention relates to manufacturing and decorating (or coloring) a roofing, cladding or siding module out of a polymeric material, such that the module resembles tiles, shingles, etc., made of another type of material.

Preferred embodiments of the present invention relate to improved methods and systems for manufacturing a roofing, cladding or siding module in a high speed and/or cost-effective and/or efficient process.

The module is formed of at least one layer formed of an extruded material, for example an extruded material comprising at least about 40%, for example at least 60%, w/w filler and/or reinforcement based on the total weight of the layer.

In some embodiments, the substrate comprises a layer of a roofing, cladding, or siding module defining the exposed surface to be decorated, optionally wherein the layer is formed of an extruded material comprising filler and/or reinforcement, for example at least 1, 5, 10, 15, 20, 25, 30, 35, 40, 45, 50, 55, 60, 65, 70, 75, 80, 85, 90, or 90% w/w filler and/or reinforcement (and useful ranges may be selected from any two of these values), and one or more polymers. In some embodiments, the substrate may further comprise one or more additional layers from which the module is formed. For example, the substrate may comprise two or more, or three or more layers.

Described herein are improved methods and systems for manufacturing such a roofing, cladding or siding module in a high speed and/or cost-effective and/or efficient process.

For example, described herein are continuous forming processes. Also described are modules manufactured using such processes. Larger areas and lengths of the module may be produced over a shorter duration of time compared to prior art methods such as injection, pressure, compression, or vacuum molding or thermoforming. It is envisaged that the continuous forming system of the present invention can produce approximately 1 to 60 m, such as 5 to 60 m, of product per minute. In one embodiment, the continuous forming system produces approximately 20 m of product per minute.

In one particular example, a single moulding machine (e.g. may be continuous) may be utilised having a plurality (e.g. 2 or more) output tracks or lanes of as-molded products exiting from the machine. In this manner, a plurality of as-moulded products may be simultaneously formed.

Further, the continuous forming method of the present invention produces a module that lacks weld lines, attachments or injection moulding points along the entire length of the module. Weld lines are formed during injection molding processes when two or more molten polymer flows meet. This can occur when a polymer flow splits to go around an interruption (e.g., a post that forms a hole) and then rejoins, or when polymer melt fronts meet, from multiple injection points. This can also occur when molten polymer meets a non-molten polymer (e.g. segmented injection molding). Consequently, a visible weld line is observed and the adhesion/bond in this weld line at the interface is weaker than the balance of the polymer within the product. This is particularly so where reinforcing fibers are in the melt—the fibers reinforce the balance of the polymer within the product but do not provide any reinforcement to the weld line, as the fibers do not span or extend across the weld line. The comparative weakness of the adhesion/bond in the weld line makes the weld line susceptible to fracture.

Figure 5:
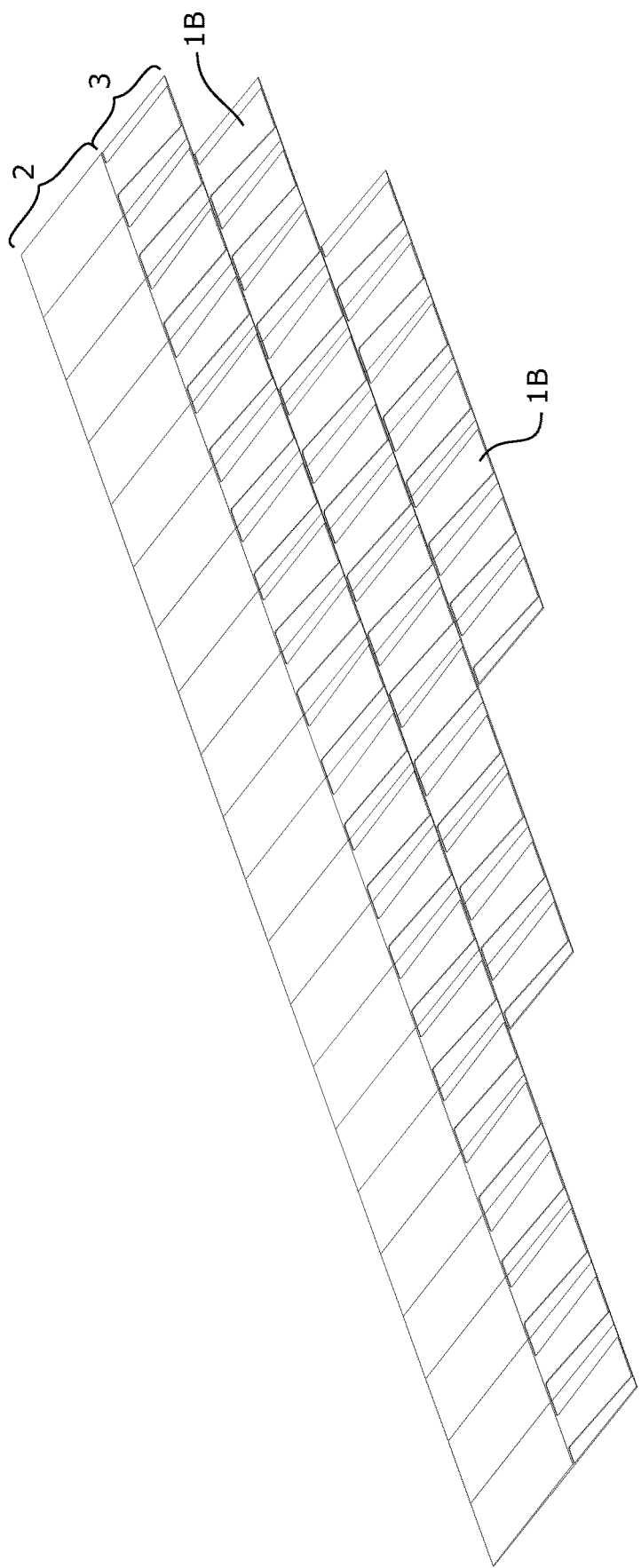
FIG. 5 is a top perspective view of an assembly comprising a plurality of roofing, cladding, or siding modules according to a second embodiment of the present invention.

Injection moulding points are the area of a product where the heated material is fed into the mold cavity. It is also difficult to make a product comprising more than one layer of material using injection moulding, and injection moulding is slow and may produce stress areas that affect the aesthetics and thermal stability of the final product, and/or color differences or variations that affect the aesthetics of the final product. In one embodiment, as shown in FIG. 1, the module 1 preferably comprises an underlapping region 2 extending from a head edge 4 of the module and an exposed region 3 extending from a foot edge 5 of the module. The underlapping region 2 is adapted to be substantially covered by the exposed region of an adjacent or overlapping module when installed on a building surface, as shown in FIG. 5. The module may take a variety of forms, for example, several variations 1, 1a, 1b, 1c, 1d, 1e are shown in FIGS. 1, 3, 5, 6, 14 and 15.

In one embodiment, the module preferably comprises an underlapping region extending from a head edge of the module and an exposed region extending from a foot edge of the module. The underlapping region is adapted to be substantially covered by the exposed region of an adjacent or overlapping module when installed on a building surface. The module may take a variety of forms. The module preferably has at least one layer which is formed of an extruded material comprising one or more polymers and at least 40% filler and/or reinforcement.

Figure 4A:
FIG. 4a is a cross-sectional view across the width of one embodiment of the roofing, cladding, or siding module.

FIG. 4a shows a cross-sectional view of one embodiment of the module 1. The module comprises a single layer along a section of the module or along the entire length of the module. In a preferred embodiment, the layer is formed of an extruded material comprising at least about 40% w/w/ filler and/or reinforcement, more preferably at least about 60% w/w filler and/or reinforcement.

In an embodiment, at least a portion of the underlapping region 2 of the module is formed of the extruded material comprising at least about 40% w/w filler and/or reinforcement, more preferably at least about 60% w/w filler and/or reinforcement.

The polymers of the extruded material may be selected from those described herein with respect to the one or more polymers of the exposed surface to be decorated. In some embodiments, the one or more polymers of the extruded material are selected from thermoplastic polymers.

The one or more polymers of the extruded material may comprise one or more elastomers. In some embodiments, the one or more elastomers are selected from thermoplastic elastomers.

The one or more elastomers increase the elasticity of the extruded material, allowing the material to give during thermal expansion and contraction. In some embodiments, the ability of the material to expand in one or two dimensions may be more constrained compared to other dimensions, leading to a greater amount of thermal expansion in dimensions where expansion is unconstrained or less constrained. For example, thermal expansion in the length of a module may be constrained, leading to increased expansion in the width and/or depth of the module. The inclusion of one or more elastomers increases ability of the extruded material to undergo thermal expansion (and contraction) in dimensions unconstrained or less constrained to thermal expansion without causing permanent damage to the structure of the material, for example stress, delamination, cyclic expansion/contraction fatigue, or otherwise compromising the structure of the material.

One or more elastomers may be present in the layer defining the surface to be decorated. The presence of the one or more elastomers may affect the hardness of the layer.

In some embodiments, one or more layers of the module, such as the layer defining the surface to be decorated, and/or the decorated surface has a Shore A hardness at least 60, for example at least about 65, 70, 75, 80, 85, or 90 (and useful ranges may be selected from any two of these values, for example, from about 60 to 90, 70 to 90, or 80 to 90); and a Shore D hardness of less than about 60, for example less than about 55, 50, 45, 40, 35, or 30 (and useful ranges may be selected from any two of these values, for example, from about 60 to 30, 50 to 30, or 40 to 30), any useful ranges may be selected from any Shore A and Shore D values (for example, a Shore A hardness of at least about 60 and a Shore D hardness less than about 60, or a Shore A hardness of at least 70 and a Shore D hardness less than 50). Both Shore A hardness and Shore D hardness may be determined by procedures in accordance with ASTM D2240-00.

The extruded material comprises one or more of the following polymers: polystyrene (GPPS), polyethylene terephthalate (PET), polyester methacrylate (PEM), high impact polystyrene (HIPS), acrylonitrile butadiene styrene (ABS), polyvinyl chloride (PVC), polyurethanes (PU), polyethylene (PE) including homopolymer, copolymer, block copolymer and terpolymer forms, polylactic acid (PLA), nylon (PA), acrylics (PMMA), high density polyethylene (HDPE), low density polyethylene (LDPE), linear low density polyethylene (LLDPE), medium density polyethylene (MDPE), cross linked polyethylene (PEX), thermoplastic elastomer (TPE), thermoplastic polyolefin (TPO), thermoplastic rubber (TPR), polypropylene (PP) including homopolymer and copolymer forms, polybutylene terephthalate (PBT), styrene-acrylonitrile resin (SAN), ethylene tetrafluoroethylene (ETFE), vinyl, methacrylate copolymers, etc. Any of these polymers may be foamed if suitable.

Examples of suitable fillers and reinforcements for the extruded material include those described herein. For example, examples of suitable fillers include any one or more of talc, calcium carbonate, mica, silica, kaolin, calcium sulphate, magnesium hydroxide, stabilizers, dolomite, etc. Examples of suitable reinforcements include any one or more of glass fibres, glass beads, glass flakes, natural fibres such as flax, cellulose, wood fibres, wood flour, cotton and sawdust, inorganic fibres, polymer fibres, polymer scrim, polymer knit, polymer weave, aramids, ceramics, etc.

Fillers are added to the extruded material to reduce the amount of the more expensive polymer component, hence reducing the material cost. However, increasing the filler content tends to negatively affect the physical properties of the extruded material. For example, prior art injection moulded products typically require relatively low filler content, otherwise the material does not flow to fill the dies and/or becomes too hard to be mouldable and/or the moulded product is unstable (e.g., may be poor melt flow or may be due to thermal expansion) or brittle. Prior art products compensate by adding a reinforcing scrim layer between layers of polymer; however, these are typically difficult and expensive to manufacture. In particular, it is challenging to obtain a consistent positioning of the scrim layer between the polymer layers, and may be difficult to form a 3-D molded product or desired shape of the scrim itself, and even more so when there is a scrim layer needing to be encapsulated between layers of polymer.

The extruded material preferably comprises at least about 40% w/w filler and/or reinforcement, and preferably at least about 60% w/w filler and/or reinforcement. In some embodiments, the percentage of filler and/or reinforcement is between about 60% and 95% by weight of the extruded material.

Provision of filler and/or reinforcement into a layer can provide for an increased weight or density or bulk (e.g. volume) of a layer so formed and thereby of a module made by at least one of such a layer.

In one embodiment, the extruded material comprises both filler and reinforcement. That is, at least 40% w/w of the extruded material comprises filler and reinforcement.

In some embodiment, the extruded material does not contain reinforcement. In some embodiments, the extruded material comprises at least about 5% w/w reinforcement (i.e., in this embodiment, the extruded material comprises at least about 55% w/w filler and at least about 5% w/w reinforcement). In some embodiments, the extruded material comprises between about 5% and 40% or 5% and 30% w/w reinforcement, for example about 5% to about 20% or about 10% or about 15% reinforcement.

In certain embodiments, the reinforcement comprises or consists or consists essentially of fibers, for example one or more non-conductive natural or synthetic fibres, such as glass fibres, carbon fibres, polymer fibres, and the like.

In preferred embodiments, the reinforcement comprises or consists or consists essentially of glass fibres. In an example, typical dimensions of the glass fibre prior to processing (e.g., prior to the extrusion process) may be between about 0.5 to 15 mm, 0.5 to 10 mm, or 0.5 and 5 mm in length (or may be about 1-15 mm, 1-10 mm, 1-5 mm, or about 2-5 mm, or about 3-5 mm in length) and about 0.015 to about 0.018 mm in diameter.

In addition to toughening the module, the reinforcement may also reduce thermal expansion of the module, hence improving stability and durability of the module when exposed to cyclical variations in heat. In an embodiment, the glass fibres align along the length of the module during the forming process. As a result, the module is particularly stable along its length (i.e., the longest dimension of the module, which typically undergoes greatest change in length due to thermal expansion).

By restricting thermal expansion along the length of module, it is possible to reduce or avoid the use of thermal expansion gaps to prevent cupping or bowing along the length of the module when installing adjacent modules.

Fibres, such as glass fibres, may be aligned along the length of the module on extrusion of the extruded layer from an extruder and that alignment may be retained during the forming process. This alignment of fibres along the length of the module constrains thermal expansion along the length of the module, reducing the amount of thermal expansion along the length of the module and increasing thermal expansion along the width and depth of the module in which thermal expansion is unconstrained or less constrained.

The term "aligned" (and related terms, such as "align") as used herein with reference to the orientation of fibres in the module means that the fibres are substantially aligned in the direction indicated. That is, the fibers extend in length in a generally common direction with substantially increased orientation, compared to randomly aligned or oriented fibres. It should be understood that fibers may still be considered to be aligned even though a portion of the fibers may not be orientated in the generally common direction. It should also be understood that portions of certain fibers may bend curl, twist and/or the like in a non-aligned manner and that such fibers may still be considered to be aligned. In certain embodiments, at least about 55, 60, 65, 70, 75, 80, 85, 90, or 95%, of the fibres may be oriented or aligned generally in a common direction and/or at least about 55, 60, 65, 70, 75, or 80% of the linear length of at least a majority, for example more than 50, 55, 60, 65, 70, 75, or 80% of the fibres are oriented and/or aligned in a common direction.

In some embodiments, the extruded material comprises fibres as a reinforcement and one or more elastomers. As described herein, the inclusion of one or more elastomers increases ability of the extruded material to thermally expand and contract, for example in dimensions unconstrained or less constrained that other dimensions of the module, without causing permanent damage to the structure of the material.

In some embodiments, the extruded material comprises at least about 5% w/w glass fibres, preferably at least about 10% w/w, for example at least about 15% w/w. In some embodiments, the extruded material comprises from about 5% to 20%, for example from about 10% to 20%, w/w glass fibres.

Fibres such as glass fibres may break up during extrusion and/or other parts of the forming process, reducing their length. Processing parameters can be varied and/or optimised to reduce and/or minimise the amount by which the average length of the fibres is reduced during extrusion and/or forming, etc. The average length of the fibres in the layer formed from the extruded material may depend on, for example, the type of fibre, geometry of the extrusion screw, die configuration, melt pipe flow characteristics, where and how the fibres are fed or otherwise introduced into the extruder, etc. In one example, reduction in the average length of the fibres is reduced and/or minimised by avoiding the use of screen packs or other structures in the melt pipes that causes or increases the amount of turbulence on fibres in the melt. In another example, reduction in the average length of the fibres is reduced and/or minimised by feeding the fibres into the extruder at a zone in which the polymer is molten (compared to feeding the fibres in to the extruder at a zone, for example the primary feed end or cooler end of the extruder distal to (i.e. opposite to) the die, where the polymer is in a solid form, for example beads, pellets, etc, which may crush the fibres as the material is pushed through the extruder).

In some embodiments, the layer formed from the extruded material comprises glass fibres having an average length of at least about 100 microns, for example at least about 150, 200, 250, 300, 350, 400, 450, 500, 550, 600, 650, 700, 750, 800, 850, 900, 950, or 1,000 microns. In some embodiments, the layer formed from the extruded material comprises glass fibres having an average length from about 100 to 2000, 200 to 2000, 300 to 2000, or 400 to 2000 microns, for example 400 to 1500, 400 to 1000, 500 to 2000, 500 to 1500, 500 to 1000, 600 to 2000, 600 to 1500, 600 to 1000 microns. Having glass fibres of such a length in the layer after forming may allow the amount of glass fibres in the layer to be reduced without increasing the amount of thermal expansion.

Table A compares the thermal expansion coefficient of three test samples: a) polymer (TPO) with no filler and no reinforcement, b) exemplary prior art product comprising a layer of reinforcing (polyester) scrim encapsulated between top and bottom TPO layers, the TPO layers comprising 40% w/w filler, and c) one embodiment of the present invention comprising polymer (TPO) with 80% w/w filler and 10% w/w reinforcement. In each case, heat was applied to the test sample to raise the temperature of the sample by about 80° C. from ambient temperature. The dimensions of each sample were measured at initial (ambient) temperature of about 14° C. and again at the final elevated temperature of about 94° C. to determine the thermal expansion.

Such embodiments of the present invention demonstrate much less thermal expansion, compared to pure polymer. Such embodiments instead undergo minimal thermal expansion that is comparable to polymer reinforced with a scrim layer, but does not suffer from the manufacturing challenges associated with the prior art product.

TABLE A

Thermal expansion coefficient of test samples with differing levels of filler.

| Polymer | % filler | % reinforcement | Thermal expansion coefficient ($10^{-6}$ m/(m K)) |
|---|---|---|---|
| TPO | 0 | 0 | 165 |
| TPO with reinforcing scrim | 40 | 0 | 10 |
| TPO | 80 | 10 | 22 |

Due to the specific content of the extruded material, the layer of the module is tough, heat-stable, dimensionally stable, and low cost (in particular due to the high filler content).

The entire length of the module is preferably manufactured in a single continuous forming process (described in more detail below). It is envisaged that module may be formed in lengths of at least about 0.25 m, for example 0.3 m or 0.5 m. Alternatively, the module may be formed in lengths of about 36 inches long. Alternatively, the module may be formed in lengths of at least about 1 m, 1.5 m, 2 m, 2.5 m, 3 m, or any numerical value in between.

In some embodiments, the surface of the module exposed when installed (the exposed region of the module) is of a length of at least about 1 m or 36 inches. In some embodiments, for example where the module resembles an asphalt tile, the ratio of the planar cross sectional area of the underlapping region to the planar cross sectional area of the exposed region is from about 2:1 to about 1:2, for example 1.5:1 to 1:1.5, 1.5:1 to 1:1, or 1.2:1 to 1:1, preferably about 1.2:1. In some embodiments, for example where the module resembles a terracotta tile, the ratio of the planar cross sectional area of the underlapping region to the planar cross sectional area of the exposed region is from about 10:90 to about 1:99, for example 5:95.

In addition to the increase in productivity and reduction in cost, moulding the entire length of the module in a continuous process eliminates any weld lines. This increases the durability and weather resistance of the modules, and improves the appearance of the final product.

In other embodiments, the extruded material may further comprise one or more of the following additives: colorants (including but not limited to carbon black, titanium dioxide), flame retardants (including but not limited to magnesium hydroxide, aluminum trihydrate), stabilizers (including but not limited to UV light stabilizers such as hindered amine light stabilizers (HALS), and thermal stabilizers such as phenolics), foaming agents (including but not limited to exothermic, endothermic or gas foaming agents), lubricants, and/or biocides (including but not limited to particles of silver, including nano-sized silver particles).

Figure 4B:
FIG. 4b is a cross-sectional view across the width of a second embodiment of the roofing, cladding, or siding module.

FIG. 4b shows a cross-sectional view of a second embodiment of the module 1. The module comprises two layers along a section of the module or along the entire length of the module. In one embodiment, the base or bottom layer 8 is formed of an extruded material comprising at least 60% filler and at least 5% reinforcement.

In other embodiments, the top layer 6 or both layers is/are formed of an extruded material comprising at least 60% filler and at least 5% reinforcement. That is, the percentages and/or material of the polymer(s) and/or filler and/or reinforcement may be the same or different in each layer. The material content of each layer is preferably selected to suit the function, appearance and/or exposure of the particular layer.

Figure 4C:
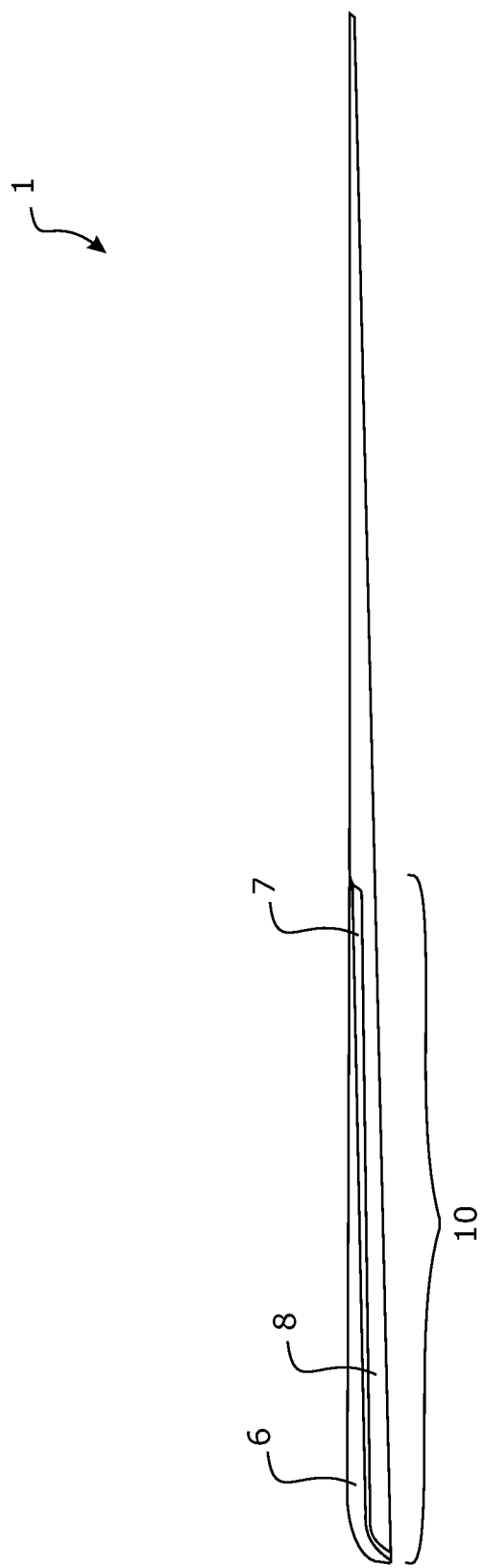
FIG. 4c is a cross-sectional view across the width of a third embodiment of the roofing, cladding, or siding module.

FIG. 4c shows a cross-sectional view of a third embodiment of the module 1. The module has at least one portion 10 which comprises at least three layers: a top layer 6, a bottom layer 8, and an intermediate layer 7 between the top and bottom layers. Alternatively, the module may be formed from more than three layers, for example if more than one layer of material forms a precursor to the top layer, intermediate layer and/or bottom layer.

In some embodiments, said layer formed of said extruded material is provided as a base or bottom layer and the module further comprises one or more additional upper layers provided as further layers upon said base or bottom layer. In some embodiments, said one or more upper layers comprise a different filler and/or reinforcement content relative the base or bottom layer. In other embodiments, said one or more upper layers comprise the same filler and/or reinforcement content relative the base or bottom layer. In some embodiments, a top layer comprises thermoplastic olefin (TPO).

Two or more layers may be extruded or coextruded to form the or at least a part of the module. The two or more layers may be joined in a continuous forming process to form the or at least a part of said module.

In some embodiments, at least a portion of the module comprises a top layer (or an upper layer or a plurality of upper layers forming a said top layer), a base or bottom layer (or a lower layer or a plurality of lower layers forming a said base or bottom layer), and an intermediate layer (or a plurality of layers forming a said intermediate layer) between the top and base or bottom layers.

In an embodiment, at least one layer is formed of an extruded material comprising at least 40% filler and/or reinforcement, preferably at least 60% filler and/or reinforcement. The module may further comprise one or more additional layers formed of material that may comprise less than 40% filler and/or reinforcement.

In an embodiment, the at least one layer formed of an extruded material comprising at least 40% filler and/or reinforcement is a base or bottom layer that substantially contributes to the structure of the module. In some embodiments, this base or bottom layer is formed of an extruded material comprising at least 60% filler and at least 5% reinforcement.

In some embodiments, the base or bottom layer comprises about 80% to 85% w/w filler and/or reinforcement, more specifically, about 70% to 75% filler and about 10% w/w reinforcement. Optionally, such a base or bottom layer may have a thickness of about 1-3 mm. The resulting layer(s) may provide resistance against significant thermal expansion of the module, which in turn may help reduce shear forces between layers and/or other structures attached to the module that may be due to thermal expansion of those other layers. In other embodiments, the structural layer(s) may be provided as one or more intermediate and/or upper layer(s).

In some embodiments, the upper or top layer(s) 6 and/or the intermediate layer(s) 7 and/or two or more layers may also be formed of an extruded material comprising at least 60% filler and/or reinforcement. In some embodiments, the extruded material comprises at least 5% reinforcement. The material of the matrix and/or filler and/or reinforcement may be the same or different in each layer.

In one example, the top layer 6 may comprise at least 65% filler, and no reinforcement. The higher polymer content may be suitable for the top layer, e.g., to facilitate binding of colored particles (as described in more detail below). Optionally, such a top layer may have a thickness of about 0.4 mm. In another example, the top layer 6 may comprise at least 65% filler and reinforcement.

In one example, the intermediate layer may comprise about 100% polymer (i.e., the intermediate layer may not comprise filler or reinforcement), which may increase one or more particular reinforcing properties of the layer, such as waterproofing. In one example, the intermediate layer may comprise a polypropylene copolymer reinforced with a copolymer polyethylene. The reinforcing polymer may comprise up to about 50% w/w of the layer, preferably between 10% and 25% w/w of the layer. Optionally, such an intermediate layer may have a thickness of about 0.5 mm.

According to the above description, a multi-layered module may be formed using at least the top layer, the intermediate layer and the base or bottom layer as described above.

Regardless of whether the module comprises one or more layers, in the preferred embodiment, one or more of the layers may comprise(s) three-dimensional features such as surface texturing, surface relief or other three-dimensional pattern or ornamentation. For example, FIG. 1 schematically shows surface texturing on the exposed regions 3 of the module 1 (i.e., the surface is not smooth), to simulate asphalt shingles.

In the preferred embodiment, at least a portion of the exposed region 3 of the module has three-dimensional surface features. Accordingly, in the multi-layered embodiments shown in FIG. 4b, at least a portion of the upper surface of the top layer, corresponding to the exposed region in the finished module, may have three-dimensional surface features.

The module may additionally or alternatively comprise two or three dimensional surface features such as coloring, patterning, surface cracking or fracturing or other two- or three-dimensional decoration or ornamentation.

These three dimensional and/or two dimensional (e.g. flat) surface features are preferably provided on at least the exposed region 3 of the module, in order to simulate another type of natural or manufactured material, including but not limited to asphalt shingles, slate, timber shingles or shakes, concrete tiles, stone chips, weatherboard, thatch, stone, woodgrain, metal (e.g., copper tiles), etc.

In one embodiment, as shown in FIG. 4, the module comprises at least three layers at the exposed and fastening regions. In this embodiment, the top layer 6 provides the cosmetic finish on the exposed region of the module, and preferably includes surface features on the top surface as described above. The intermediate layer 7 may provide reduced thermal expansion, additional reinforcement, water or weather resistance and/or a binding layer between the top and bottom layers. The bottom layer 8 forms the base structure of the module and therefore preferably extends throughout the entire width and length of the module. In one embodiment, the bottom surface of the bottom layer at the exposed region further includes projections (e.g., ribs) that provide adhesion surfaces, as described in more detail below.

The module may comprise three layers in any arrangement, and across any region of the module. Exemplary embodiments are shown in FIGS. 13a-13h.

In another embodiment shown in FIG. 4b, the module comprises at least two layers at the exposed and/or fastening region(s). The top layer 6 may provide the cosmetic finish on the exposed region of the module, and preferably includes surface features on the top surface as described above. The base or bottom layer 8 may provide the base structure for the module, and may be reinforced. In one embodiment, the bottom surface of the base layer 8 may further includes projections (e.g., ribs) that provide adhesion surfaces, as described in more detail below.

In the single-layered embodiment shown in FIG. 4a, the layer may have a cosmetic finish (e.g. surface color added) on the exposed region of the module, and preferably includes surface features on the top surface as described above. The layer may also provide structural support for the module, and may likewise be reinforced (e.g., with reinforcement additives, surface treatment, surface features such as projections, etc.).

In one embodiment, where the module has at least one portion 10 which comprises more than one layer, one or more of the layers may be extruded. If two or more layers are extruded, they may be co-extruded.

Figure 9:
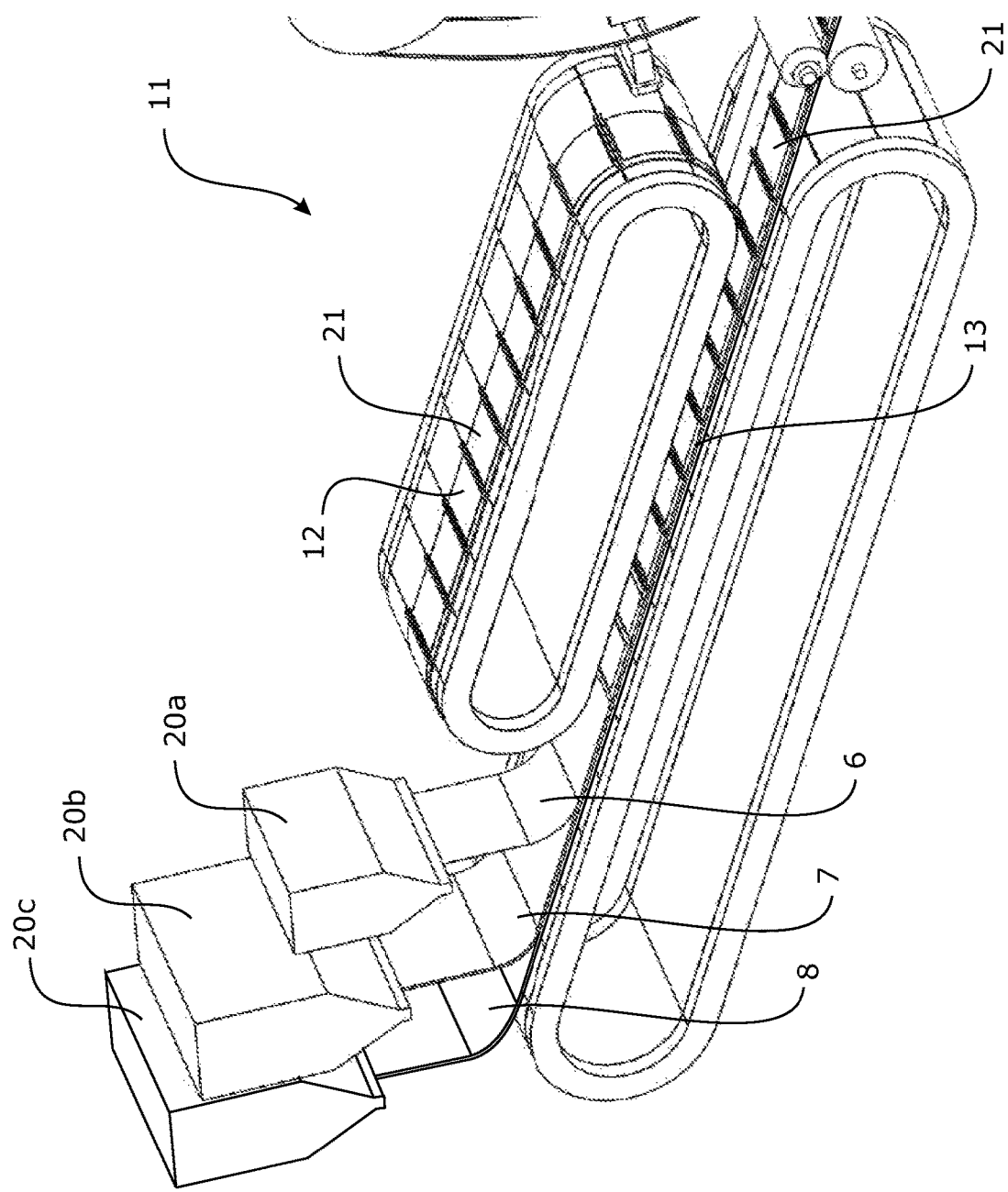
FIG. 9 shows a continuous forming system of one preferred embodiment of the present invention, which may be used to manufacture a roofing, cladding, or siding module of the present invention.

Alternatively, the layers may be extruded in series from two or more serially arranged extruders 20a, 20b, 20c, as shown in FIG. 9. Preferably, a first extruded layer is deposited onto an advancing support surface of a continuous forming machine 11, and subsequently the other extruded layer(s) is/are deposited on top of the first layer. The layers then proceed as a layered feed to be molded between the first forming surface 12 and second forming surface 13, preferably as described below.

Alternatively, one or more of the layers may be molded by thermoforming, compression moulding, pressing or other method of forming. In any case, the layers are subsequently joined together preferably by the continuous forming machine 11 as described below.

Preferably, the layers are joined or laminated together to form the module in a continuous forming process (described in more detail below). The layers and/or their content, such as the polymer(s) is/are selected to be compatible with each other, to ensure adequate joining/fusing between each layer. The preferred forming process allows for multiple layers in various configurations (e.g., varying continuity, material properties, etc) to be joined together to form the finished module. Referring to the cross-sectional view of one example of the module shown in FIG. 4c, in a preferred embodiment of the present invention, one or more properties of the intermediate layer 7 varies along the length and/or width of this layer.

In one example, as shown in FIG. 4, the thickness of the intermediate layer 7 varies along its width. Specifically, the intermediate layer is thinner near the foot edge 5 of the module, and increases in thickness towards the middle of the module. As will be discussed in more detail below, this thicker portion preferably coincides with the fastening region of the module.

In other examples, as shown in FIGS. 13b to 13d, and 13h, the reinforcing layer 7 may be formed above or below the top or bottom layer of the module respectively. The reinforcing layer may be present intermediate the head edge 4 and foot edge 5 of the module, or may extend to one or both of the edges. The intermediate layer (where present) may be between 0.01 and 10 mm thick, whether of a constant thickness throughout, or whether the thickness varies as discussed above. Preferably, the intermediate layer may be between 0.1 and 0.5 mm thick; or may be any numerical value between 0.01 and 10 mm.

The top and bottom layers may each be between 0.1 and 50 mm thick, whether the thickness is constant or varying across each layer. Preferably, the top layer is between 0.1 to about 10 mm thick. Preferably, the top layer is about 0.05, 0.1, 0.2, 0.3, 0.4, 0.5, 0.6, 0.7, 0.8, 0.9 mm thick, or may be numerical values between each of these. Preferably, the bottom layer is about 0.1 to about 10 mm thick. Preferably, is the bottom layer about 0.5, 1, 2, 3, 4, 5, 6, 7, 8, 9 mm thick, or may be numerical values between each of these.

Additionally or alternatively, the varying property of the intermediate layer could be a change in surface area of the intermediate layer, for example by corrugating (or changing the degree of corrugations on) a portion of the intermediate layer.

Other additional or alternative properties of the intermediate layer which may be varied along the length or width of the layer include tensile strength, shear strength, resilience, elasticity, flexibility, toughness, fire resistance, water resistance, continuity or uniformity, water-proofing, impact resistance, resistance to pull through, fixing capability, chemical resistance, puncture resistance, content of filler and/or reinforcement, concentration of filler and/or reinforcement, color, microbial resistance, temperature resistance, light/heat absorption/reflectivity, thermal transfer, shape memory, thermal expansion, grip, abrasion or scuff resistance, slip resistance, adhesion/gluing/bonding capability, sealing ability etc., of the layer. Regarding continuity and uniformity, there may be areas where the intermediate layer is not present in the module, such that the intermediate layer is discontinuous across the length and/or width of the module.

In other embodiments, one or more property/properties of the other layers (i.e., the top or bottom layer) may additionally or alternatively vary along the length and/or width of the layer. In another example, the surface area of the intermediate layer may be varied by changing the properties of three-dimensional surface features on the intermediate layer. The intermediate layer may have three-dimensional surface texturing, or other projections, corrugations, reinforcements, chemical coatings, protrusions, apertures, perforations, 3D replications of natural surface, water repelling features (features to assist with water repelling) or surface roughness which increase the mechanical bonding of this layer to the top and/or bottom layers.

Alternatively, any one of the layers, such as the intermediate layer, may be pre-formed (e.g., by extrusion, or other type of forming process) and subsequently introduced to the forming/lamination process to form the module. In another embodiment, the layer may be heated or reheated so that it is in a molten or pliable state when fed to the forming/laminating machine.

These variations in the property/properties of these surface features may be implemented when forming the intermediate layer. For example, the height or width of the surface features may vary along one or more directions of the layer, or in specific areas of the layer. Additionally or alternatively, the number of surface features (i.e., the concentration of surface features per unit length or width of the layer) may vary along one or more directions of the layer, or in specific areas of the layer.

Additionally or alternatively, the variation in the property/properties of the intermediate layer may be caused by deforming the intermediate layer before or during joining or laminating to the top and/or bottom layers. For example, by stretching a localized portion of the intermediate layer while it is still in a molten, semi-molten or pliable state, the concentration of surface features within this region may be reduced. Accordingly, the mechanical bond strength at this region would be weaker compared to other non-deformed regions, or preferentially reduced to provide for desired mechanical properties of the intermediate layer and its reinforcement of the associated upper and lower layers.

In the preferred embodiment, the intermediate layer is a reinforcing layer (e.g., a reinforcing film, mesh, scrim, weave, fibre, fabric, wire, string, web or sheet) between the top and bottom layers. Accordingly, the intermediate reinforcing layer preferably provides for one or more of: resistance against shrinkage, resistance against warping, resistance against tearing, increased toughness, prevention against unwanted deflections of the module, weather or water resistance, reduced flammability, impact resistance, resistance to pull through (e.g., of fasteners due to high winds), fixing capability, chemical resistance, puncture resistance, sealing (e.g., self-sealing around fasteners), shape memory and increased resistance against delamination of the layers, adhesive/gluing/bonding capability, thermal expansion (or contraction), surface texture, binding of other materials, etc.

The pull through strength of the module is preferably at least as required in the standard specification for asphalt shingles made from glass felt and surfaced with mineral granules (ASTM D3462). The standard specifies that when pulling a nail head through the shingle at 100 mm/min, the pull through force is at least 90 N. Accordingly, the nail pull through force demonstrated by the present module is at least about 90 N, more preferably at least about 100 N, and may be more than 130 N.

To increase the weather resistance of the module, the intermediate layer may provide a substantially water or liquid resistant barrier, or a water or liquid impermeable barrier between the top and bottom layers. This is particularly advantageous where the top or bottom layers are porous.

For example, the top layer of the module may be fractured or otherwise crazed to provide surface ornamentation for simulating another type of material. Accordingly, the intermediate layer preferably provides a substantially waterproof barrier below this top surface, at least at the porous region(s). The reinforcing properties of the intermediate layer may vary depending on the requirements at different sections of the module. At zones of increased exposure or under increased loading, for example, the reinforcing properties of the intermediate layer may be increased, but at other sections, may be reduced to reduce the amount of material used.

For example, the module may further comprise a fastening region 14 for receiving one or more fasteners that fix the module to the building surface when installed. As shown in FIG. 1, the fastening region may be substantially adjacent the exposed region 3 and within the underlapping region 2. The fastening region may include a visual guide or boundary markers to allow visual identification of the region.

The fasteners may be nails, screws, etc, which puncture or penetrate the module when installed. Accordingly, the intermediate layer may extend from at or adjacent the foot edge 5 of the module to within or beyond the fastening region 14 of the module. Alternatively, the intermediate layer may be present only along the fastening region 14 of the module.

Alternatively, if the module does not require penetrative fastenings, the intermediate layer may extend from at or adjacent the foot edge, to at or adjacent the underlapping region of the module. That is, the intermediate layer may provide for additional reinforcement and/or weather resistance throughout the exposed region of the module.

Alternatively, the module may comprise more than one intermediate layer. The two or more intermediate layers may comprise the same or different material and/or may perform the same or different functions. The layers may be present as discrete intermediate layers in different regions of the module or there may be multiple intermediate layers in one or more regions of the module. For example, there may be two intermediate layers in the fastening region, one providing a waterproofing function, the other providing self-sealing properties around fasteners. Additionally, the reinforcing property/properties of the intermediate layer may be optimized preferentially within this fastening region 14, to increase the toughness and tear-resistance of the module at this layer. Additionally, the reinforcing property/properties of the intermediate layer may also be increased within the exposed region of the module.

For example, as shown in FIG. 4C, the intermediate layer may be thicker along the fastening region, compared to within the exposed region. The intermediate layer may comprise thickened regions or other 3-dimensional qualities within the fastening region 14, which provide for a fastening region capable of retaining a fastener penetrating the fastening region or resisting tear or pull through of the module by shear force applied to the module or each of the said layers by the fastener.

Additionally, or alternatively, the reinforcing property/properties of the intermediate layer may be optimized preferentially along the direction of the length of the module and/or along the direction of the width of the module. It will be appreciated that the direction and/or regions of optimizing or increasing the reinforcing properties of the intermediate layer will depend on the structural requirements (e.g., the amount of loading, shear force, tensile force, strain, etc., along that direction or within that region) of the module when installed.

As discussed above, variations in these properties may be achieved when forming the intermediate layer, whether by extrusion or other forming processes. These variations may additionally or alternatively be achieved by deforming (e.g., stretching) the intermediate layer when it is being joined to the top and/or bottom layers, and is in a molten or semi-molten moldable state.

Accordingly, the intermediate layer, when being joined to the top and/or bottom layers, is preferably in a molten or semi-molten state, or a cold but pliable, formable or moldable condition. In this state, the intermediate layer is able to be deformed with little or no localized areas of high stress.

Additionally, in the molten or semi-molten state, the intermediate layer may form chemical bonds with compatible material(s) in the top and/or bottom layer. Alternatively, if the intermediate layer may be inserted between molten or semi-molten top and bottom layers, and may therefore form chemical bonds with these layers.

Figure 7:
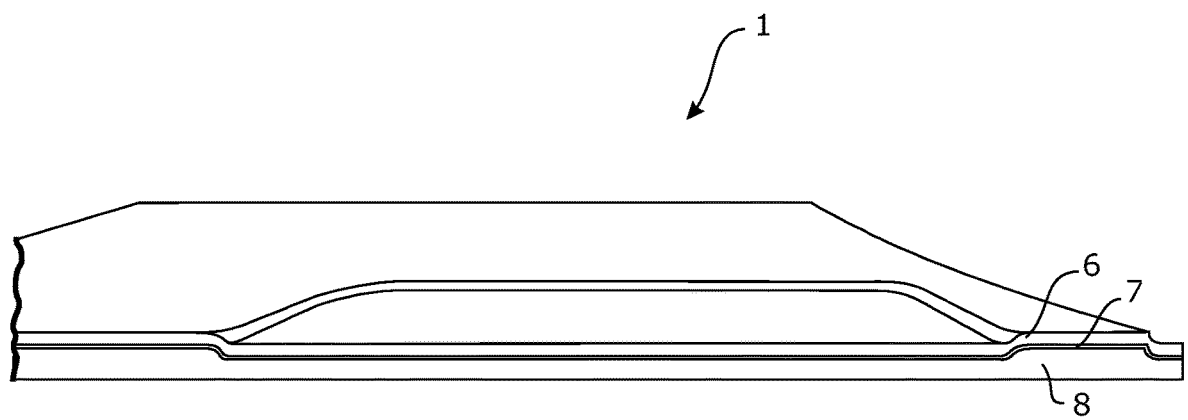
FIGS. 7 and 8 are close-up views of contoured portions of the roofing, cladding, or siding module of the present invention.
Figure 8:
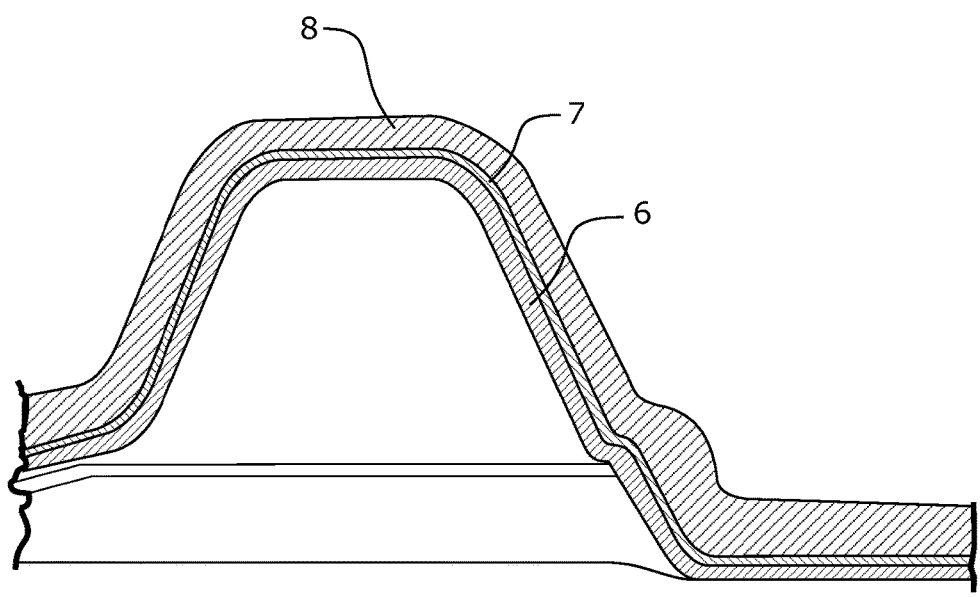

Further, the module may be shaped and/or contoured during the joining/laminating process, while the intermediate layer is in the cold but pliable or molten or semi-molten moldable state. This ensures that the intermediate layer remains substantially aligned and/or substantially consistently positioned between the top and bottom layers through the shape and/or contour. This is shown in the detailed views of FIGS. 7 and 8.

The module may be shaped and/or contoured via a casting, thermoforming, pressing or other forming process, whether continuous or discontinuous, during or after the joining/laminating process.

In another embodiment, all three layers of the module are in a molten, semi-molten, cold but pliable, formable or moldable condition when being joined together. This may further increase the strength of the chemical bond between compatible materials in each layer. This may additionally reduce the occurrence of localized high stress points in the module, whether or not the module is further shaped after joining the layers.

Accordingly, the material for each of the layers (or at least for the intermediate layer) is preferably chosen to have a melt flow index and/or heat capacity sufficiently high such that the layer(s) remain molten or semi-molten or pliable while the module is formed.

Additionally or alternatively, the layers are processed at a sufficiently high temperature such that the layers remain molten or semi-molten or pliable while the module is formed.

Preferably, the layers are each made of, or comprise, one or more polymer(s). Materials which may be used include (but are not limited to) general purpose polystyrene (GPPS), polyethylene terephthalate (PET), polyester methacrylate (PEM), high impact polystyrene (HIPS), acrylonitrile butadiene styrene (ABS), polyvinyl chloride (PVC), polyurethanes (PU), polyethylene (PE) including homopolymer, copolymer, block copolymer and terpolymer forms, polylactic acid (PLA), nylon (PA), acrylics (PMMA), high density polyethylene (HDPE), low density polyethylene (LDPE), linear low density polyethylene (LLDPE), medium density polyethylene (MDPE), cross linked polyethylene (PEX), thermoplastic elastomer (TPE), thermoplastic polyolefin (TPO), thermoplastic rubber (TPR), polypropylene (PP) including homopolymer and copolymer forms, Polybutylene terephthalate (PBT), styrene-acrylonitrile resin (SAN), ethylene tetrafluoroethylene (ETFE), vinyl, methacrylate copolymers, etc. The materials may be a blend of any or all of these, and/or may be foamed.

Any one or more of the layers of the module may comprise one or more additives, such as fillers (including but not limited to talc, calcium carbonate, mica, silica, kaolin, calcium sulphate, magnesium hydroxide, stabilizers, dolomite); colorants (including but not limited to carbon black, titanium dioxide); reinforcements (including but not limited to glass fibres, glass beads, glass flakes, natural fibres such as flax, cellulose, wood fibres, wood flour, cotton, sawdust, and inorganic or polymer fibres, scrim, knits, weave, nonwoven, aramids, ceramics); flame retardants (including but not limited to magnesium hydroxide, aluminum trihydrate); stabilizers (including but not limited to UV light stabilizers such as hindered amine light stabilizers (HALS), and thermal stabilizers such as phenolics); foaming agents (including but not limited to exothermic, endothermic or gas foaming agents and liquid foaming agents); lubricants; and/or biocides (including but not limited to particles of silver, including nano-sized silver particles).

For example, in some embodiments, one or more layers of the module may comprise one or more foaming agents (including but not limited to exothermic, endothermic or gas foaming agents and liquid foaming agents).

In particular, at least the top layer preferably has a high UV resistance. Additionally, the module is preferably configured and materials preferably chosen to withstand cyclical variations in temperature, for example, about −40 to about 100 degrees Celsius.

In one embodiment, the polymer(s) of the top and bottom layers has/have a lower degree of crystallinity compared to the polymer(s) of the intermediate layer. That is, the intermediate layer comprises a tougher, more crystalline polymer or polymer blend compared to the top and bottom layers. The top and bottom layers may comprise an amorphous polymer, or a polymer which is less crystalline compared to the intermediate layer.

For example, the intermediate layer may comprise polypropylene (PP). The top and/or bottom layers may comprise thermoplastic polyolefin (TPO), which is less crystalline or has fewer crystalline regions compared to polypropylene (PP).

In another embodiment, the polymer(s) of the top and bottom layers has/have a higher degree of crystallinity compared to the polymer(s) of the intermediate layer.

In alternative embodiments, the layers may each have any degree of crystallinity compared to each other.

In some embodiments, at least one layer or each or all of the layers comprises an amorphous polymer, or a polymer having a degree of crystallinity that is low, for example a degree of crystallinity of less than about 70, 65, 60, 55, 50, 45, 40, 35, 30, 25, 20, 15, or 10%. In some embodiments, at least one layer or each or all of the layers comprises an amorphous polymer, or a polymer having a degree of crystallinity that for the given polymer is low. Some polymers are inherently more crystalline than other polymers. For example, HDPE may have a degree of crystallinity of about 70-80%, whereas LDPE may have a degree of crystallinity of about 45-55%. Those skilled in the art will appreciate that an HDPE having a degree of crystallinity of 70% has a degree of crystallinity that is low for an HDPE, whereas for LDPE a degree of crystallinity of 20% has a degree of crystallinity that is low for an LDPE.

Additionally or alternatively to selecting different materials with different material properties, the relative crystallinity of the layers may be achieved during manufacture of each layer, for example by controlling the temperature, rate of cooling, rate of extrusion, shear forces, or other factors as known in the art.

Preferably, the top and bottom layers may substantially thermally insulate or encapsulate the intermediate layer, so that the intermediate layer remains molten or semi-molten or pliable during the forming process. This controls the amount and/or rate of shrinkage of the crystalline or semi-crystalline intermediate layer throughout the cooling process, reducing warping in the module.

In other embodiments, the top and bottom layers may also substantially transfer or provide heat to the intermediate layer, to promote or maintain its molten or semi-molten or pliable state.

In addition to, or alternatively to reinforcing the module, the intermediate layer may also provide a binder layer for binding materials in the top and/or bottom layer together to form the module.

For example, the top layer may comprise sections of non-homogenous and/or non-compatible materials in order to achieve a particular surface texture or appearance simulating another type of material. The intermediate layer may be chosen to comprise a material which is compatible with each of the materials in the top layer. The intermediate layer therefore binds to each of the discontinuous sections of the top layer, effectively acting as a binder for binding these sections together.

In order to reduce material costs, the module need not comprise three layers throughout the entire unit of module. The module may comprise a single layer or double layers throughout, or at specific regions, as described previously.

Additionally, to reduce the amount of raw material required for production, the top and/or bottom layer may be foamed. This additionally reduces the weight of the module. In the preferred embodiment, the bottom layer 8 is made of a foamed polymer, such as foamed thermoplastic polyolefin (TPO).

In some embodiments, the module comprises a layer that provides for chemical resistance and/or a barrier that prevents and/or reduces migration of solvents and/or other chemicals through the layer to adjacent layer(s) of the module, for example from the underside of the module and/or from one more layers disposed beneath the chemical resistance and/or barrier layer to layer(s) disposed above, such as a top layer of the module. In some embodiments, the chemical resistance and/or barrier layer is an intermediate layer of the module. In other embodiments, the chemical resistance and/or barrier layer is a base or bottom layer of the module.

The migration of solvents and other chemicals, such as sealants, adhesives, or other construction materials, etc., into the top layer or top layers of the module can cause surface blooming and/or degradation and/or destabilization of polymer, which in turn can cause defects in this layer or layers of the module, such as visible deformation, delamination, warping, blistering, cracking, etc. The chemical resistance and/or barrier layer thus prevents and/or reduces such defects.

The chemical resistance and/or barrier layer may be colorless or coloured, for example the same or similar color as the base colour of the top layer(s) of the module.

The chemical resistance and/or barrier layer may have a low coefficient of thermal expansion and/or a coefficient of thermal expansion similar to one or more other layers of the module, preferably adjacent layer(s), such that it does not cause the module to warp or otherwise distort on heating or cooling. Preferably, the chemical resistance and/or barrier layer has properties (for example, a Vicat softening point and/or HDT) such that it does not crack during handling, installation, or thermal expansion.

The chemical resistance and/or barrier layer comprises one or more polymers. Suitable polymers will be apparent to those skilled in the art and include but are not limited to waterborne resins, solvent borne resins, radiation curable resins, powder coatings, alkyd, epoxy, urethane, acrylamid, or phenolic resins, and the like. In some embodiments, the chemical resistance and/or barrier layer is comprises one or more UV curable acrylic. In some embodiments, the chemical resistance and/or barrier layer comprises one or more polyolefin. The one or more polymers may provide the chemical resistance and/or barrier layer with properties such as flexibility, adhesion, and ability to "wet-out" or high surface tension and high flow rate, for example to provide acceptable coverage on application to another layer of the module.

The chemical resistance and/or barrier layer may also comprise one or more additives as described herein. Examples of such additives include but are not limited to fillers, adhesion promoters, wetting agents, levelling additives, pigments, foam control agents, rheology modifier, coalescent, solvents, diluents, dispersants, matting agents, crosslinking agents, and the like.

The chemical resistance and/or barrier layer preferably extends across at least a portion, preferably the substantially the whole, of the length and width of the exposed region of the module. In some embodiments, the barrier also extends across a portion of the length and width of the underlapping region. However, to save costs, in some embodiments, the barrier layer may extend across only a portion but not the whole of the length and width of the underlapping region of the module, as this region is adapted to be substantially covered by the exposed region of an adjacent or overlapping module when installed on a building surface. In some embodiments, the chemical resistance and/or barrier layer does not extend across any of the width or length of the underlapping region of the module.

The chemical resistance and/or barrier layer may be formed by any suitable method, for example extrusion, spraying, painting, curtain coating, transfer coating, vapour deposition, plasma coating, etc. The chemical resistance and/or barrier layer may be formed on or joined or laminated to one or more other layer(s) of the module before the module is formed or may be formed on or joined or laminated to a layer of the module after the module has been formed. The method employed is preferably capable of coating of the chemical resistance and/or barrier layer on a surface having three-dimensional surface features.

In some embodiments the chemical resistance layer and/or barrier layer is formed by a method comprising applying a curable material to a layer of the module and curing the curable material, for example using UV radiation, heat, etc. In one embodiment, the curable material may be applied spraying.

In some embodiments, the curable material is applied to a layer of the module before the layer is joined or laminated to one or more other layers of the module to form the module. In other embodiments, the curable material is applied to a layer of the module and cured as a post-treatment of a module after the module has been formed. In some of such embodiments, the chemical resistance and/or barrier may form a base or bottom layer of the module.

In some embodiments, for example when the chemical resistance and/or barrier layer is an intermediate layer of the module, the chemical resistance and/or barrier layer is formed by a method comprising extrusion or co-extrusion with one or more other layers of the module. One or more additional layers may be joined or laminated to the chemical resistance and/or barrier layer. For example, in some embodiments, an adhesive layer, such as one or more continuous or discontinuous strips of adhesive (optionally which may be exposed upon removal of a release sheet) may be joined or laminated to the chemical resistance and/or barrier layer.

In some embodiments, the chemical resistance and/or barrier layer is, for example after curing, subjected to a plasma or corona treatment or other treatment that improves adhesion of the layer to one or more other layers to be joined. In some embodiments the one or more layers to be joined is an adhesive layer, such as one or more continuous or discontinuous strip of adhesive (optionally which may be exposed upon removal of a release sheet). In some embodiments, where the adhesive layer is provided with release sheet for exposing the adhesive on removal, the plasma or corona treatment or other treatment that improves adhesion creates stronger adhesion or bonding between the chemical resistance and/or barrier layer and the adhesive layer than between the adhesive layer and release sheet, thus facilitating removal of the release sheets from the adhesive layer without delamination or peeling of the adhesive layer from the chemical resistance and/or barrier layer. In some embodiment, the surface of the release sheet in contact with the adhesive comprises a surface coating that reduces surface tension, for example a Teflon coating.

The module may comprise one or more anti-scuff or protective layers on a top surface of the module, to protect at least the exposed region of the module during storage, transport and installation. The layer may be applied as an integral layer, or may be removably provided as a release sheet (to be removed after installation). The anti-scuff layer may be a layer of substantially virgin polymer, or a layer or coating comprising polymer or other suitable materials.

In some embodiments, the module may comprise one or more side laps for lapping under an adjacent module, to increase water resistance between adjacent modules. The side lap may be thinner, and/or may comprise fewer layers than other portions of the module. Side laps can provide for regions upon which adjacent modules may overlap with another module.

Further, to reduce the amount of raw material for the bottom layer, the under surface of the layer may comprise projections instead of being a solid, continuous surface.

The projections provide surfaces upon which the exposed region of the module may be adhered to the top surface of the underlapping region of an adjacent and/or overlapping module when installed. The projections provide sufficient adhesive surface area over discrete regions of the base, instead of a solid continuous surface, which would be more affected by shrinkage or thermal expansion/contraction, causing issues with adhesion. The projections further provide the required strength and rigidity of the layer, while reducing the weight of the layer.

Figure 2:
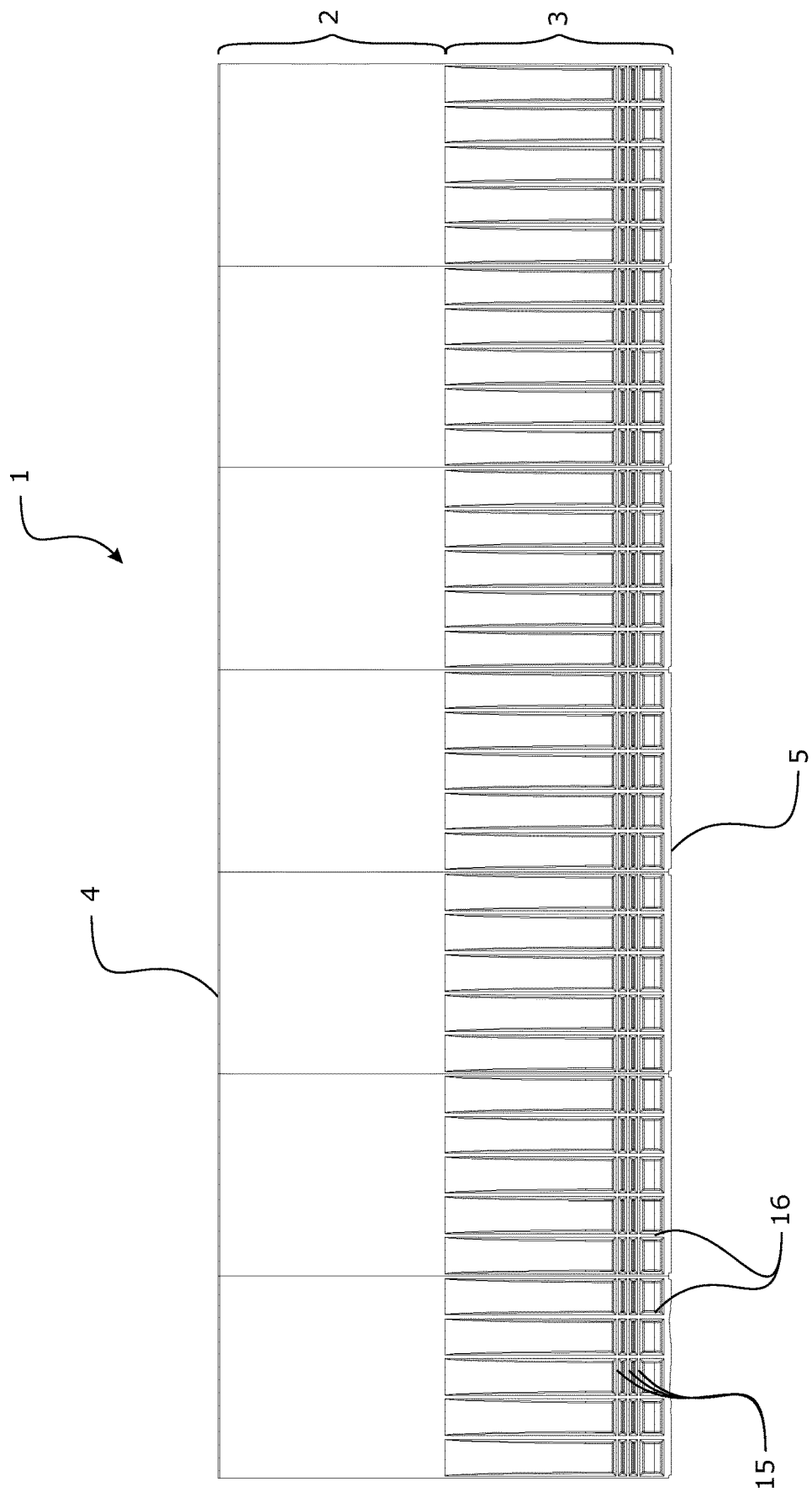
FIG. 2 is a bottom view of the roofing, cladding, or siding module of FIG. 1.
Figure 3:
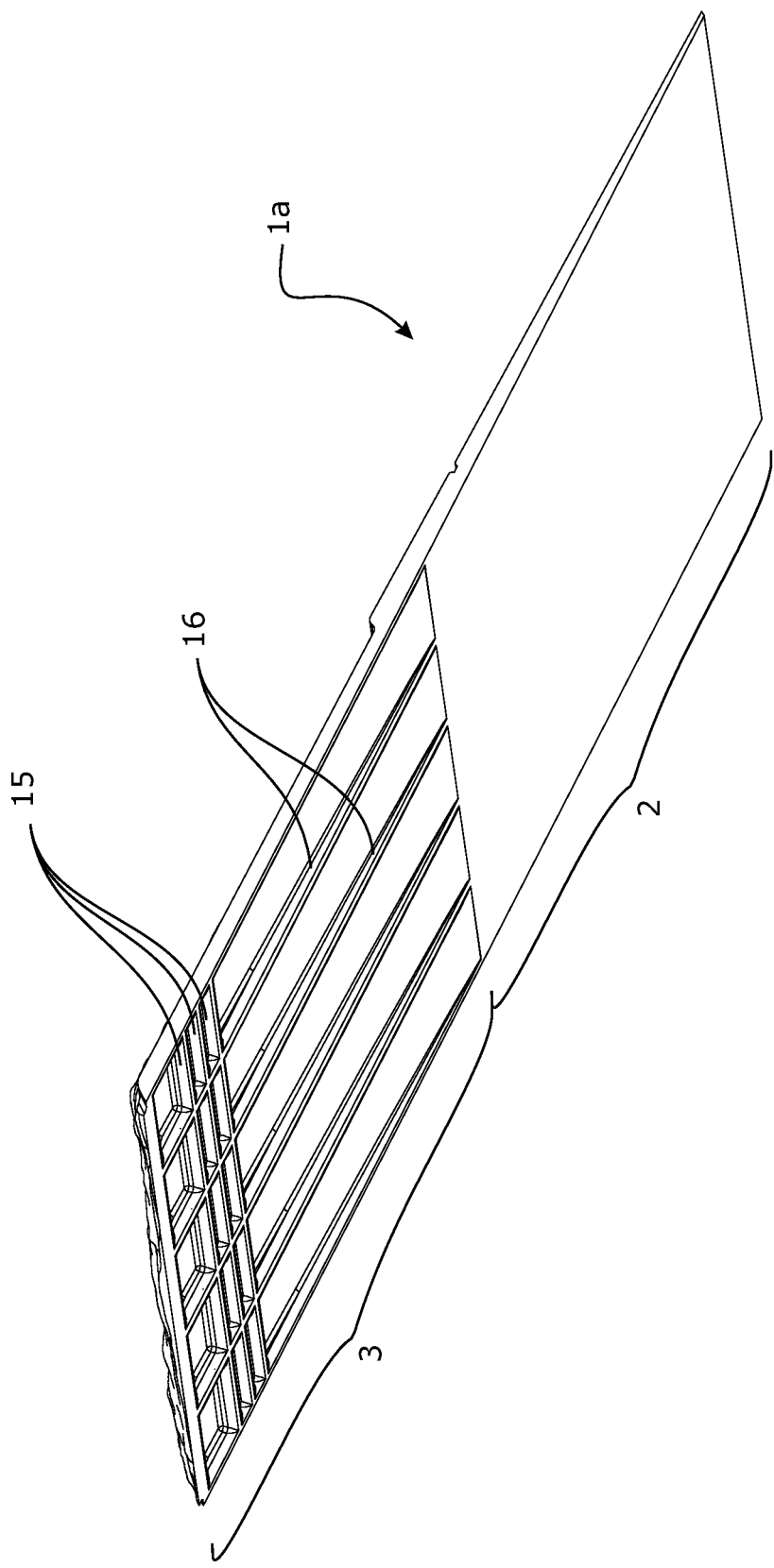
FIG. 3 is a bottom perspective view of a section of the roofing, cladding, or siding module of FIG. 1.

In one embodiment, as shown in FIGS. 2 and 3, the projections comprise one or more longitudinal ribs 15 or other formations extending along the length of the module.

Each longitudinal rib 15 may be continuous or discontinuous throughout its length, but preferably provides sufficient coverage of the module to provide sufficient adhesion surfaces. More preferably, the longitudinal rib extends through the entire length of the module, in order to provide sufficient strength along the length, and prevent warping along the length.

In one embodiment, the longitudinal ribs 15 extend substantially parallel to the foot edge 5 of the module. Alternatively, the longitudinal rib 15 may extend along a direction which is not parallel to the foot edge (e.g., the rib(s) may extend(s) diagonally across the module), but the rib preferably still extends along a substantial portion of the length of the module. Preferably, the ribs are positioned near the foot edge 5 of the module, so that this edge of the exposed region of the module be adhered to the top of the adjacent or overlapping module, and may sit flush on the top surface.

For this purpose, the module may also be formed with a convex precamber perpendicular to the length of the module, such that the exposed region is curved downwardly of the underlapping region. This pre-load pressure encourages the projections/ribs to contact firmly onto the underlapping panel when installed on the building surface.

Preferably, as illustrated, there are a plurality of longitudinal ribs 15 (e.g., three ribs), extending substantially parallel to each other and spaced approximately 1 to 100 mm (preferably 1 to 10 mm) apart from each other. The height of the, or each, longitudinal rib may be between 1 and 100 mm (preferably, between 1 and 10 mm). The or each longitudinal rib may be between 1 and 1000 mm wide (preferably between 1 and 10 mm wide, or sufficiently wide to provide surfaces for adhering the module to the top of an adjacent or overlapping module when installed.

In the preferred embodiment, the under surface of the bottom layer may further comprise a plurality of transverse ribs 16. These transverse ribs 16 may extend substantially perpendicular to the longitudinal ribs 15 and/or perpendicular to the length of the module. Alternatively, the transverse ribs may extend along any other direction, but preferably still extends along a substantial portion of the width of at least the exposed region of the module.

These transverse ribs may provide adhesion surfaces in addition to, or alternatively to the longitudinal ribs. The transverse ribs preferably strengthen at least the exposed region of the module, preventing warping or curling of the module along its width. The transverse ribs 16 therefore preferably extends from at, or adjacent, the foot edge 5 to at, or adjacent, the underlapping region of the module.

Preferably, the transverse ribs are spaced between 1 and 100 mm (preferably, 1 and 10 mm) apart from each other and extend substantially parallel to each other. The width of each transverse rib may be between 1 and 1000 mm (preferably, between 1 and 10 mm).

In one embodiment as shown more clearly in FIG. 3, the height of the transverse ribs tapers from at or adjacent the foot edge to, at, or adjacent, the underlapping region. This means that there is a decrease in spacing between the module and the building surface from the exposed region towards the underlapping region. This enables at least the exposed region of the adjacent overlapping module to be kept substantially parallel to the building surface.

The projections are preferably molded into the under surface of the exposed region of the module during the forming process, for example by one or more die faces on the second forming surface 13.

Alternatively, the projections may be pre-formed or post-formed from the same material as the under surface of the module and incorporated into the module during or after the forming process.

Alternatively, the projections may be formed from a different material compared to the under surface of the module, and may be incorporated into the module before, during or after forming the module.

Figure 14:
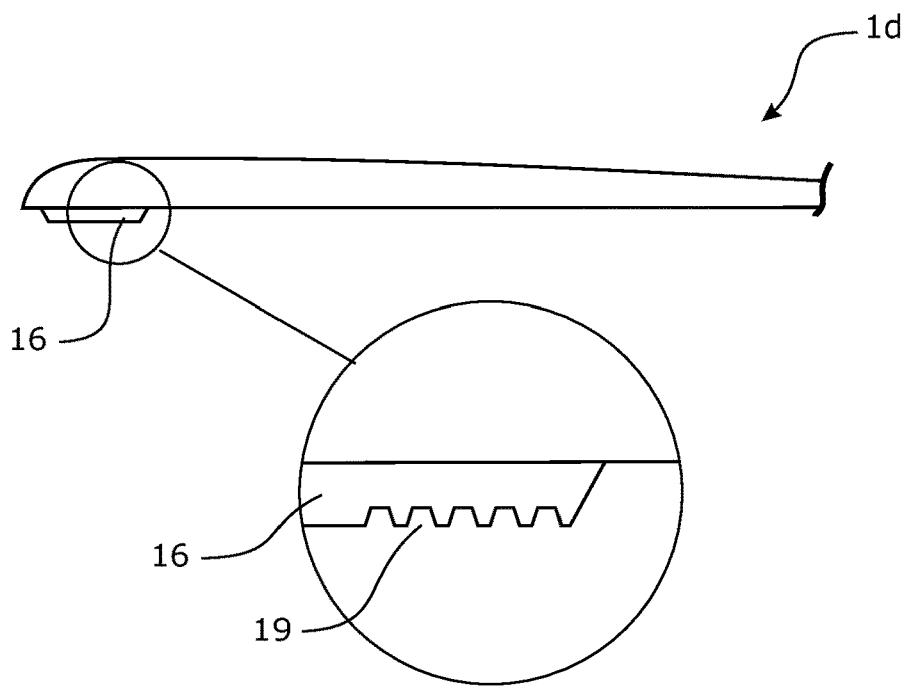
FIG. 14 is a schematic showing a detailed view of a further embodiment of the roofing, cladding, or siding module.

In one embodiment, as shown in FIG. 14, the projections may further comprise surface features 19, such as surface roughness, on one or more surfaces, preferably a bottom surface. The features increase the surface area of the surface, to increase the peel strength and/or bond strength of the projection to the upper surface of the underlapping tile, to which the projection is adhered to.

Examples of surface features include corrugations, serrations, projections, ribs, nodes, surface roughness, surface roughness, 3D replications of natural surface, water repelling features (features to assist with water repelling), etc.

The shape and configuration of the ribs may be selected to provide different attachment properties at different regions of the rib, e.g., a planar, bottom surface of the rib may provide different resistance against shear and/or peel compared to lateral faces of the rib.

Other surfaces of the module may also or alternatively comprise surface features to increase the bond strength between adhered surfaces. For example, the top surface of the underlapping region of the module may comprise surface features to increase the peel and/or bond strength between the top surface and the under surface of the overlapping module. The module may further comprise one or more continuous or discontinuous strips of adhesive 25 on the top surface of the underlapping region of the module (optionally which may be exposed upon removal of a release sheet), configured to contact the projections on the under surface of the exposed region of an adjacent or overlapping module when installed. Additionally or alternatively, adhesive may be provided on a bottom surface of the module (e.g., the bottom surface of the projections, if provided) to be adhered to a top surface of an underlapping module during installation.

Figure 16:
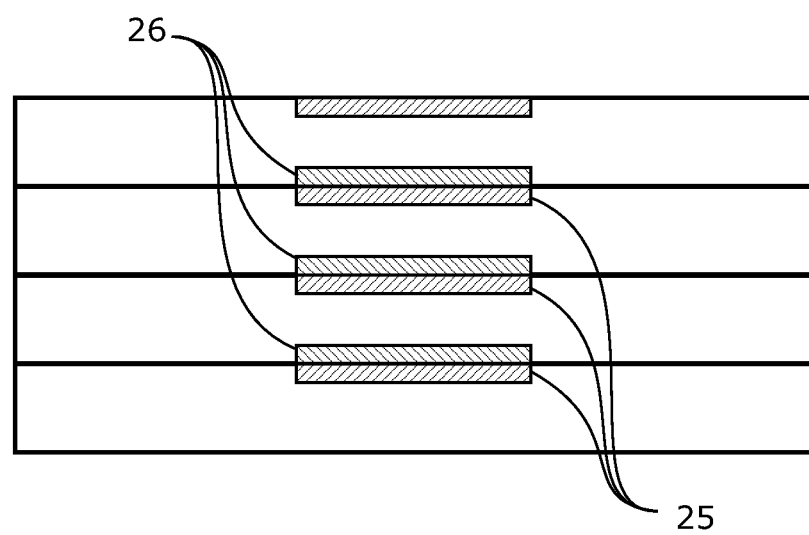
FIG. 16 shows an embodiment of the roofing, cladding, or siding modules, comprising adhesive and release sheets, arranged in a stack.

In some embodiments, for example as shown in FIG. 16, the release sheet 26 may be integrally molded or otherwise formed with or incorporated into the module. Prior to installation, the release sheet 26 may contact the adhesive region 25 of an adjacent module. During installation, the two modules may be separated to expose the adhesive on one module, and the release sheet can remain on the other module. In this way, the modules may be provided and/or transported in stacks of two or more modules.

Alternatively, adhesive may be applied to the projections/ribs and/or to the top of the underlapping region of the module on-site.

In the preferred embodiment, the module comprises a plurality of formed surfaces 9, wherein each of the formed surfaces comprises three-dimensional surface features, as shown in FIG. 1. In this embodiment, each formed surface is a molded segment along the length of the module. For reference, we have defined the length of the foot edge 5 as the length of the module, and the distance between the foot edge 5 and the head edge 4 as the width of the module.

Each formed surface 9 may resemble an individual tile, shingle, slate or shake. Alternatively, each formed surface may resemble a set of tiles, shingles, slates or shakes. Each formed surface 9 comprises an underlapping region 2 and an exposed region 3, wherein the underlapping region is adapted to be substantially covered by the exposed region of an adjacent or overlapping module when installed on a building surface.

The module 1 may therefore be installed with the row of formed surfaces 9 simulating a row of tiles, shingles, slates, shakes, etc.

Figure 6A:
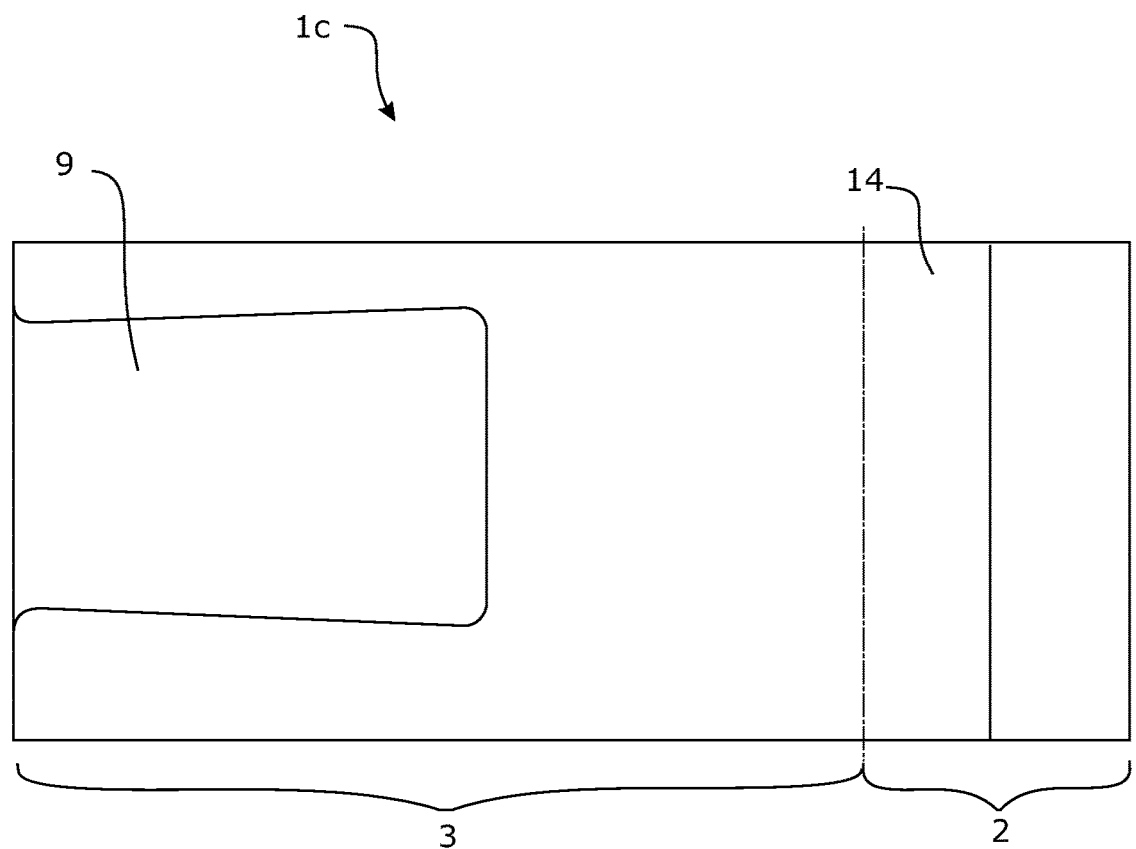
FIGS. 6a and 6b are top and partial cross-sectional views respectively of a third embodiment of the roofing, cladding, or siding module of the present invention.
Figure 6B:
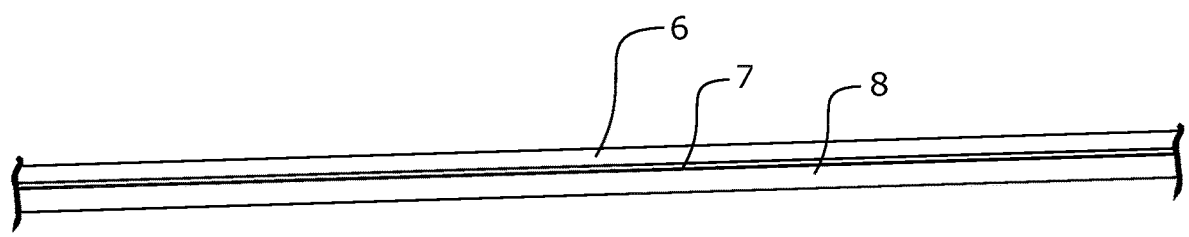

Alternatively, the module may be subsequently sectioned (or divided or partitioned) to provide a plurality of smaller module sections for installation onto the building surface. The smaller module sections may each contain a single formed surface 9 simulating an individual tile, shingle, slate, shake, etc. Alternatively, the smaller module sections may resemble a set of tiles, shingles, slates or shakes. Examples of these smaller module sections are shown in FIGS. 3 and 6. Alternatively, each smaller module section may contain a plurality of formed surfaces.

In one embodiment, each formed surface 9 is molded by an individual die or mold of a continuous forming machine. Where there are a plurality of formed surfaces 9 in the module, all the formed surfaces are preferably joined or laminated to each other without weld lines, attachments (such as gluing, etc) or injection molding points. Use of the term "joined" in this context is not intended to require that each of the formed surfaces were ever separated, i.e., the formed surfaces maybe integrally formed together in situ during the manufacturing/molding process.

The preferred method of forming a module having a plurality of formed surfaces joined together without weld lines, attachments or injection molding points is described as follows, and with reference to FIG. 9. The continuous forming machine 11 is fed a feed material able to assume and retain a form after being molded between a first forming surface 12 and a second forming surface 13. At least the first forming surface 12 comprises a plurality of die faces 21 provided in sequence, configured to mold the three-dimensional surface features onto the module. That is, each formed surface 12 along the module is molded by one die face. It should be understood that, while the drawings show the first forming surface 12 on the top and the second forming surface 13 on the bottom of the continuous forming machine, the relative positions of the two surfaces may be reversed. Accordingly, in some embodiments, the module may be molded upside down (i.e., the bottom surface is molded with the surface features, which when installed, becomes the top/exposed surface of the module).

In some embodiments, each die face is (at least slightly) different from the adjacent die face, in order to produce a module with formed surfaces 9 which appear (at least slightly) different from at least the adjacent formed surfaces. When installed, the module-clad surface may therefore more closely resemble a surface covered with individual asphalt shingles, slate, shingles, shakes, concrete tiles, stone chips, weatherboard, etc. Further, it would be desirable to produce modules, each having a different arrangement of formed surfaces, to increase the variation in appearance when a plurality of modules are installed overlapping each other. While this may be achieved by replacing or swapping individual die faces along the first forming surface 12, it would be desirable to be able to produce different modules in a batch or continuous forming process. Alternatively, the die faces may be the same as each other in order for formed surface 9 to be formed which are substantially identical or matching of each other.

Accordingly, in the preferred embodiment, the number of die faces is offset from the number of formed surfaces in each module to be formed. That is, there are more or fewer die faces compared to the number of formed surfaces in each module. Alternatively, the number of die faces may match the number of surfaces to be formed on a module or along a length of a layer—thereby contributing to the matched or substantially identical nature of the formed surface (e.g. where copper tiles or tiles which are of matching resemblance are to be provided as a part of a module).

This means that the process may continuously produce a set of modules, in which each module has a series of formed surfaces which are arranged in a non-identical manner to the series of formed surfaces on at least the previously formed module and the next module to be formed. More preferably, each module has a series of formed surfaces which are arranged in a non-identical manner to the series of formed surfaces on a plurality of previously formed modules and a plurality of module to be subsequently formed.

For example, to form the module of FIG. 1 which has seven formed surfaces 9, there are preferably at least eight die faces 21 along at least the first forming surface 12. The last die face therefore molds the first formed surface of the next module in this continuous forming process. Accordingly, this module and the next will have a different arrangement of formed surfaces.

It will be appreciated that the number of different permutations that may be obtained will depend on the number of die faces compared to formed surfaces.

Alternatively, there may be fewer die faces 21 compared to the number of formed surfaces in each module to be formed. For example, if there is one less die face compared to formed surfaces, the first and last formed surfaces along a single module will be identical. Nevertheless, each module will have a different sequence of formed surfaces compared to the previously formed and subsequently formed modules.

As discussed above, each formed surface preferably has three dimensional surface features which are different from the surface features of at least the adjacent formed surfaces. More preferably, the die faces are configured such that each of the formed surfaces within the module has three dimensional surface features which are different from the surface features of all other formed surface within the module.

Additionally, the sequence of formed surfaces in each module may be further varied by swapping a die face with another die face along the first forming surface.

Additionally or alternatively, each die face may be rotated in place to provide for a different orientation of three dimensional surface features on the formed surface to be molded, and hence a variation in the overall appearance of the formed surface.

In other embodiments, the die faces may be the same, so as to produce similar or identical formed surfaces. For example, this embodiment may be used to produce modules which resemble ceramic tiles or metallic tiles such as copper tiles. Further, in some embodiments, the die faces may not mould three-dimensional surface features into the module, but may simply serve to divide the module into formed surfaces to resemble individual tiles.

While the preceding description relates to the modules being produced as discontinuous units via the batch or continuous forming process (i.e., each feed input into the continuous forming machine produces a single length of module), an alternative method may involve producing a long length of precursor which is subsequently sectioned to obtain multiple modules. In this case, the precursor will comprise multiple repeating sequences of formed surfaces. In order to produce modules with different sequences of formed surfaces, the precursor is not sectioned at the intersections where the sequences repeat.

For example, to obtain the module of FIG. 1, the precursor may have multiple repeating sequences of eight formed surfaces. The precursor is sectioned to obtain modules containing only seven formed surfaces. This sectioning may occur during or after the molding process.

It will be appreciated that regardless of whether the modules are produced as discontinuous units or as a continuous precursor which is subsequently sectioned, in embodiments where the modules are formed to have different arrangements of formed surfaces, the important feature is that the number of die faces 21 provided in sequence on the first forming surface 12 is offset from the number of formed surfaces 9 in each module.

In some embodiments, the module may be post-treated once formed, for example by shaping, folding, coloring, corrugating, adding surface treatment(s) (e.g. biocides), perforating, laminating, coating, heating, cooling, printing, fusing, abrasing or smoothing, curing, treatment, for example plasma or corona treatment, or cutting etc.

In some embodiments the post-treatment may comprise coating or laminating the underside or bottom of the module with a chemical resistance layer or barrier layer. The coating or laminating may comprise applying a curable material to the underside or bottom of the module and curing, for example UV curing, to provide the chemical resistance and/or barrier layer.

In some embodiments, the post-treatment further comprises subjecting the chemical resistance and/or barrier layer to a treatment that improves adhesion of the layer, for example to an adhesive layer.

Accordingly, in some embodiments, the post-treatment further comprises joining or laminating an adhesive layer to the treated chemical resistance and/or barrier layer. In some embodiments, the adhesive layer is provided as one or more continuous or discontinuous strip of adhesive (optionally which may be exposed upon removal of a release sheet). In some embodiments, the adhesive layer is provided with said release sheet.

Figure 15A:
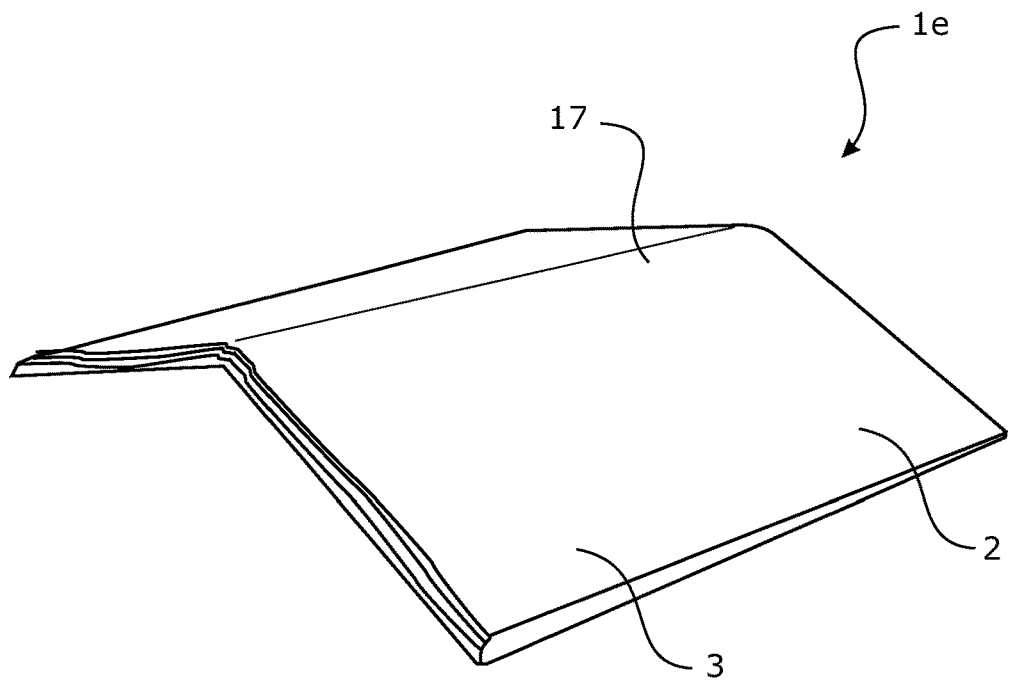
FIG. 15 shows examples of modules shaped after forming into ridge and barge tiles.
Figure 15B:
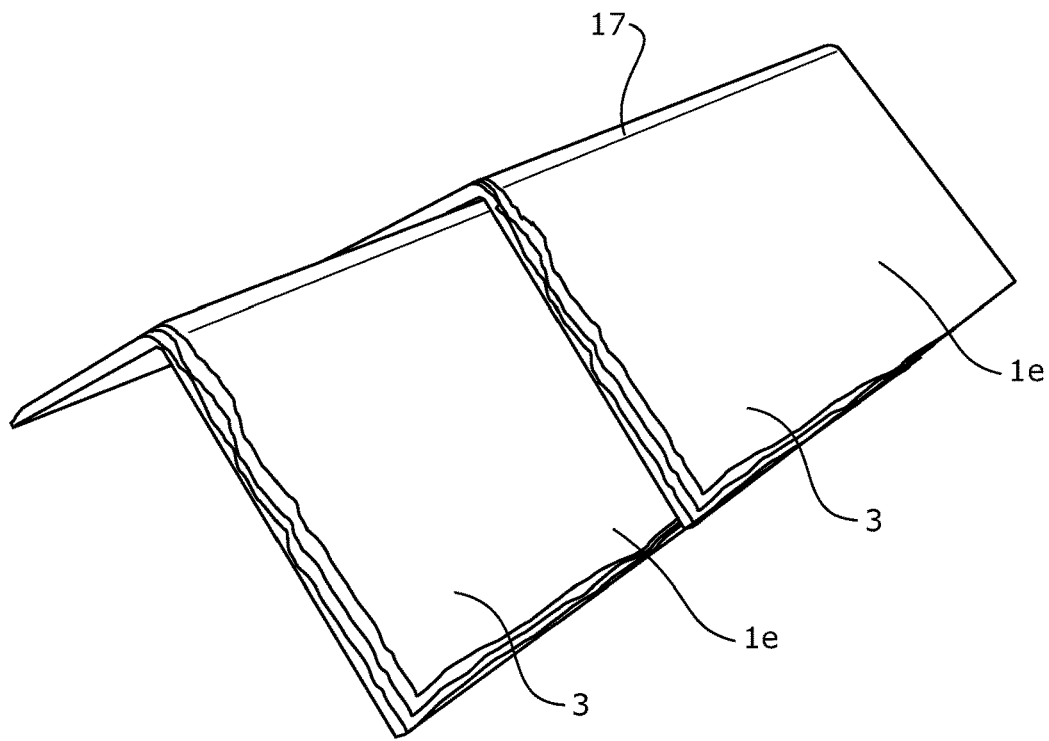
Figure 15C:
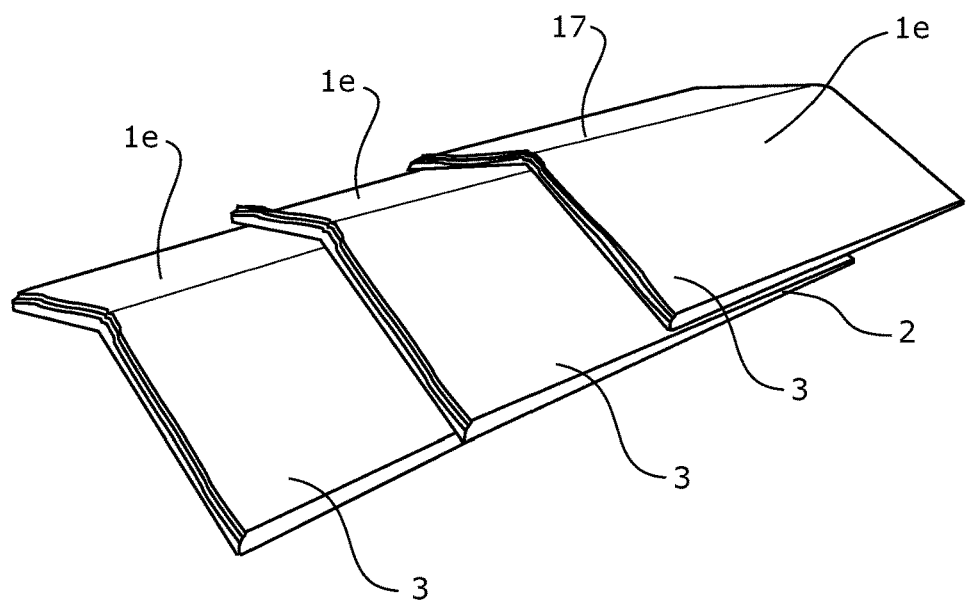

In some embodiments, the module is shaped and/or cut and/or folded, once formed, to produce a ridge tile, a hip tile, a barge tile, an apex tile, a flashing, or other shaped/angled tiles, such as corrugated tiles. Examples of folded modules are shown in FIGS. 15a, 15b and 15c. It will be appreciated that the angle of the fold depends on the application.

In some embodiments, the region to be folded or shaped may be heated or re-heated in order to be bent or folded into shape after the module has been formed. In some embodiments, the region to be folded or shaped 17 may comprise a reinforcing layer to increase the toughness and/or durability of this region.

As shown in FIGS. 15b and 15c, the folded/shaped modules may, be arranged in any suitable overlapping arrangement (over similar folded/shaped modules or other unfolded modules) for or when installing onto the building surface.

The module and/or one or more layers of the modules and/or each or all of the layers of the module preferably has a low coefficient of thermal expansion. The coloured particles preferably also have a low or similar or the same coefficient of thermal expansion.

The term "coefficient of thermal expansion" as used herein refers to the coefficient of linear expansion. Unless indicated otherwise, reference to a coefficient of thermal expansion with respect to a module or layer of a module as described herein refers to the coefficient of linear expansion with respect to the length of the module or layer of the module. It will be appreciated that the module and/or one or more layers and/or each or all of the layers of the module described herein may have anisotropic thermal expansion. For example, the coefficient of thermal expansion with respect to the length of a module may be lower than the coefficient of thermal expansion with respect to the width of the module and/or the coefficient of thermal expansion with respect to the depth of the module. The coefficient of thermal expansion of a module or layer of a module described herein or of a plurality of coloured particles may be determined by a procedure in accordance with ASTM E831 standard by thermomechanical analysis (TMA).

Unless indicated otherwise, reference to a coefficient of thermal expansion with respect to a plurality of coloured particles refers to the coefficient of linear expansion of a sampleformed by heat pressing the coloured particles into a thin sheet. For example, the thermal expansion of a plurality of coloured particles may be measured by the following method. An 8 gram sample of coloured particles is pieced on a hot stage press (Auplex, Fuzhou Prior Electric Co Ltd, model #LCB1015-3) at 200° C. and pressed between for approx. 20 seconds at 3 bar. The sample is then removed and cooled on a flat surface for 60 seconds. The sample is then analysed for thermal expansion by TMA using ASTM E831.

In some embodiments, at least one layer, such as a base or bottom layer of said module, has a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K). In some embodiments, at least one layer, such as a base or bottom layer of said module, has a coefficient of thermal expansion of less than about $30 \cdot 10^{-6}$ m/(m K).

In some embodiments, each or all of the layers of the module has a coefficient of thermal expansion of less than about than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K). In some embodiments, each or all of the layers of the module has a coefficient of thermal expansion of less than about $30 \cdot 10^{-6}$ m/(m K). In some of such embodiments, the thermal expansion and contraction of each layer of the module may be similar. In this way, the shear forces between layers and/or other structures attached to the module that may be due to thermal expansion and contraction of those other layers may be reduced.

In some of such embodiments, the absolute difference between the coefficient of thermal expansion of the layer of the module having the highest coefficient of thermal expansion and the layer of the module having the lowest coefficient of thermal expansion is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).

The term "absolute" as used herein means the mathematical absolute value, i.e. the non-negative value of a number. For example, the absolute value of 3 is 3 and the absolute value of −3 is 3.

The module may have a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K). Preferably, the module has a coefficient of thermal expansion of less than about $40 \cdot 10^{-6}$ m/(m K), for example less than about 39, 38, 37, 36, 35, 34, 33, 32, 31, or $30 \cdot 10^{-6}$ m/(m K). In some embodiments, the coefficient of thermal expansion of the module is less than about $30 \cdot 10^{-6}$ m/(m K).

The use of coloured particles having a high coefficient of thermal expansion relative to the coefficient of thermal expansion of the surface to be decorated may, depending on the amount of coloured particles brought into contact with the surface to be decorated, may produce a decorated surface having an undesirably high coefficient of thermal expansion relative to the surface to be decorated.

In some embodiments, the decorated surface has a coefficient of thermal expansion similar to that of the exposed surface to be decorated. In some embodiments, the absolute difference between the coefficient of thermal expansion of the decorated surface and the coefficient of thermal expansion of the exposed surface to be decorated is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30·10^{-6}$ m/(m K), and suitable ranges may be selected from between any two of these values or from between 0 and any one of these values, for example from about 80 to 0, 50 to 0, 30 to 0, or 20 to $0·10^{-6}$ m/(m K).

The coloured particles may be selected to a have similar thermal expansion and contraction properties to the exposed surface to be decorated, for example the exposed surface defined by a layer of a roofing, cladding, or siding module. Preferably, the coefficient of thermal expansion of the coloured particles is sufficiently low that the surface of the substrate is not adversely stressed after the coloured particles have fused and/or coalesced therewith.

In some embodiments, the absolute difference between the coefficient of thermal expansion of the one or more pluralities of particles coloured particles and coefficient of thermal expansion of the exposed surface to be decorated, such as a layer of a module, is less than about $150·10^{-6}$ m/(m K), for example less than about 140, 130, 120, 110, 100, 90, 80, 70, 60, 50, 45, 40, 35, 30, 25, 20, 15, 10, or $5·10^{-6}$ m/(m K), preferably less than 50, 40, or $30·10^{-6}$ m/(m K), preferably less than $30·10^{-6}$ m/(m K), and suitable ranges may be selected from between any two of these values or from between 0 and any one of these values, for example from about 80 to 0, 50 to 0, 30 to 0, or 20 to $0·10^{-6}$ m/(m K).

In some embodiments, the coloured particles comprise filler and/or reinforcement. In some embodiments, the coloured particles comprise filler. In some embodiments, the coloured particles comprise both filler and reinforcement.

The content of the filler and/or reinforcement in the coloured particles can vary. In some embodiments, the coloured particles comprise at least about 1%, for example at least about 2, 3, 4, 5, 10, 15, 20, 25, 30, 40, 50, 60, 70, or 80%, w/w filler and/or reinforcement based on the total weight of the particles, and useful ranges may be selected from any two of these values (for example, from about 1% to about 80% w/w filler and/or reinforcement based on the total weight of the particles, for example from about 1 to 60, 1 to 40, 5 to 80, 5 to 60, 5 to 40, 10 to 80, 10 to 60, 10 to 40, 20 to 80, 20 to 60, or 20 to 40%). In some embodiments, the coloured particles comprise at least 20, 25, 30, 35, 40, 45, 50, 55, 60, 65, 70, 75, or 80% w/w filler and/or reinforcement based on the weight of the particles, and useful ranges may be selected between any two of these values (for example from about 20 to about 80, 40 to 80, 60 to 80, or 20 to 60%, preferably from about 40 to about 60% w/w filler and/or reinforcement based on the weight of the particles).

Preferably, the coloured particles comprise at least 10, 15, 20, 25, 30, 35, 40, 45, 50, 55, 60, 65, 70, 75, or 80% w/w filler based on the total weight of the particles, and useful ranges may be selected from any two of these values (for example, from about 10% to about 80% w/w filler, for example from about 10 to 60, 10 to 40, 15 to 80, 15 to 60, 15 to 40, 20 to 80, 20 to 60, 20 to 40, 40 to 80, or 40 to 60%).

The use of such amounts of filler and/or reinforcement in the coloured particles may reduce the thermal expansion coefficient of the particles. The filler may comprise one or more of the following: talc, calcium carbonate, mica, silica (including glass), kaolin, calcium sulphate, magnesium hydroxide, stabilizers, dolomite. The reinforcement may comprise one or more of the following: glass fibres, glass beads, glass flakes, natural fibres such as flax, cellulose, wood fibres, wood flour, cotton, sawdust, and inorganic or polymer fibres, scrim, knits, weave, non-woven, aramids, ceramics, carbon fibres.

In certain embodiments, the coloured particles comprise filler and/or reinforcement and the substrate comprises a layer of a roofing, cladding, or siding module defining the exposed surface to be decorated, wherein the layer is formed of an extruded material comprising at least 40% w/w filler and/or reinforcement and one or more polymers. Preferably, the coloured particles comprise filler.

In some embodiments, the coloured particles comprising filler and/or reinforcement comprises one or more elastomers.

In some embodiments, the filler and/or reinforcement is pre-coloured (i.e. coloured before or prior to being blended, compounded, or otherwise combined with one or more polymer). In some embodiments, the coloured particles comprises pre-coloured filler and/or reinforcement, preferably pre-coloured filler. Additionally or alternatively, in some embodiments wherein one or more or each or all of the layers of the module comprise pre-coloured filler and/or reinforcement, preferably pre-coloured filler.

For example, filler, such as calcium carbonate, which is typically white, may be coloured with one or more colourants to a colour similar to, the same as, or complementary to the desired initial colour of the coloured particles or the desired colour of a layer of the module prior to forming the coloured particles or layer (e.g. by blending, compounding, or otherwise combining filler and one or more polymers).

Pre-colouring filler and/or reinforcement, in particular filler, can reduce visible effects of scuffing of or on the decorated surface, reduce the amount of colourant required in the one or more polymers to achieve a desired colour in the decorated surface (reducing costs), provide a better depth of colour in the decorated surface (a less pastel-like appearance), and/or provide more even colour to the decorated surface (due to the total composition having a similar refractive index). Pre-colouring may be carried by any suitable method known in the art.

In some embodiments at least a portion of the top surface of the module is decorated such that it resembles one of asphalt shingle, slate, shingles, shakes, concrete tiles, stone chips, weatherboard, thatch, stone, woodgrain, or metal (including but not limited to copper tiles or roofing shingles).

In one embodiment, each formed surface resembles an individual tile or shingle or slate or shake within the module. In another embodiment, each formed surface resembles a set of tiles or shingles or slates or shakes within the module.

In another embodiment, the module is subsequently sectioned (or divided or partitioned) to provide a plurality of smaller module sections for installation onto a building surface.

In another embodiment, each smaller module section resembles an individual tile or shingle or slate or shake. In another embodiment, each smaller module section resembles a set, or one or more of, said tiles or shingles or slates or shakes within the section. The length of each smaller module section can vary. In some embodiments, the length is at least 100 mm.

The method of the present invention may be used to produce a decorated surface on such substrates (for example, for coloring the product or module), preferably to resemble another type of natural or manufactured material. It should be appreciated that the method is not specific to the preferred forms of the module described in WO 2016/088026. For example, decoration may be applied to modules comprising only one layer of polymer, etc. Preferable, however, at least the top surface of the exposed portion of the module is colored.

For brevity, the following description refers to a "precursor", being the precursor to the final molded module. The precursor may therefore refer to a single layer, or to the layered precursor just prior to molding the layers together into the final product.

In one embodiment, coloured particles are added to the one or more layers, before or while the layer is formed (whether by extrusion, injection molding or other forming methods as described above). For example, in some embodiments, coloured particles are brought into contact with two or more layers that are subsequently joined, for example by lamination, to each other and/or one or more other layers of the module, such as a base or bottom layer or an intermediate layer of the module. Joining may be carried out by for example lamination (e.g. via heat welding, fusing, solvent welding, gluing, etc.) or mechanical attachment (e.g. via staple, zip lock, velcro, or other interlocking features, etc.).

In another embodiment, the colored particles are added onto the module after it has been formed/molded.

Additionally or alternatively, the colored particles may be added onto at least a portion of the top surface of a precursor. That is, the colored particles are applied before and/or during the final molding process.

Figure 10:
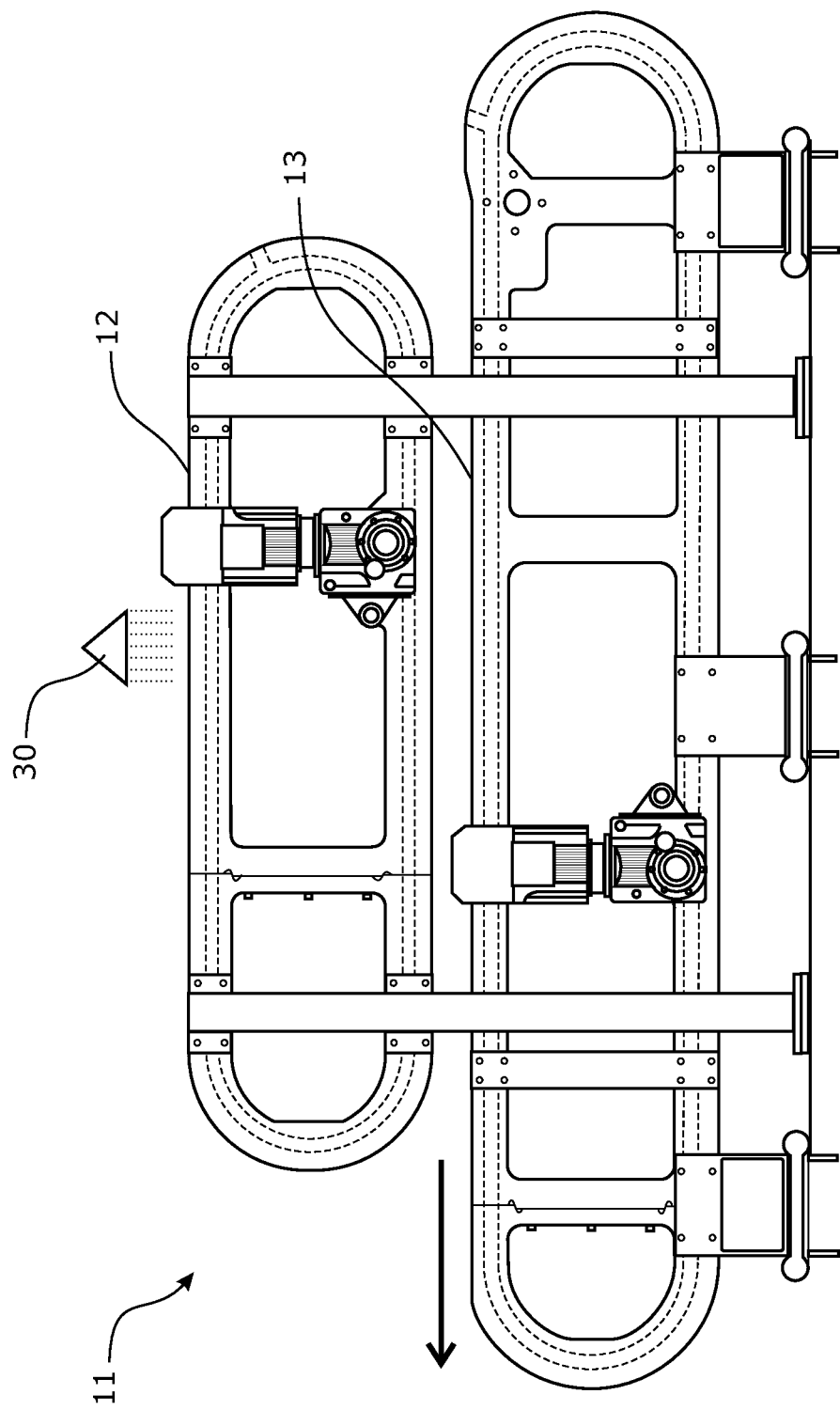
FIG. 10 shows a system for coloring a roofing, cladding, or siding module according to one preferred embodiment of the present invention.

The colored particles may comprise one or more dyes or pigments. The coloured particles may be used to add surface color and/or decoration and/or texture to the module. The colored particles may be transparent, translucent or opaque, and may comprise multiple components of different types of coloring or colored agents. The colored particles may be applied to a precursor or module that has already been colored during the forming process. One embodiment is shown in FIG. 10, in which the precursor is molded between a first forming surface 12 and a second forming surface 13. The colored particles are applied at 30 to at least a portion of one of the forming surfaces. Subsequently, the colored particles are transferred to the precursor during the molding step, when the precursor is formed between the first and second forming surfaces.

As shown schematically in FIG. 10, the colored particles may be sprayed or otherwise delivered or applied onto the first forming surface 12 and/or second forming surface 13. In some embodiments, the specific gravity of the colored particles is preferably greater than 1. The colored particles may be applied directly or indirectly to the precursor and/or the forming surface by one or more of stamping, injecting, embossing, spraying, rolling, feeding, brushing, melting, immersing, dipping, sprinkling, depositing, by drawing or suctioning the colored particles onto the precursor and/or forming surface using a vacuum system, etc. Alternatively, the first and/or second forming surface may comprise a printer head, etc., for depositing the colored particles onto the precursor during the molding step.

In addition, or alternatively, colored particles may be applied (whether directly or indirectly) to a surface of a layer or layer precursor or a surface of a die face or a surface of the formed module using a vacuum system. For example, in one embodiment coloured particles may be applied to a top surface of an upper layer to be used in forming a module, and a vacuum system may remove at least some of the applied colored particles. The removal of the colored particles may be removal from pre-defined areas of the surface upon which the colored particles have been applied.

In the embodiment where the precursor is molded in a continuous forming process between first and second forming surfaces, and the first forming surface comprises at least one die face configured to mold surface features onto at least a portion of a top surface of the module, the colored particles are preferably applied to at least a portion of the die face(s) prior to the molding step. The colored particles are subsequently stamped, injected, embossed or otherwise delivered or applied onto or into a portion of formed surface(s) during the molding step.

The application of colored particles onto the different die faces may be consistent or different. For example, the amount of colored particles applied and/or the areas on which the colored particles are applied may be different for each die face, in order to produce a module with color variations throughout the different formed surfaces, so that they more closely simulate individual tiles, shingles, etc.

In another embodiment, the colored particles may have a plurality of different melt flow indices/viscosities, so as to produce a visual effect such as a tortoiseshell coloring effect. In some embodiments, one or more components of the colored particles may be a solid that does not melt (at least in the range of temperatures that the colored particles undergo), i.e., the component(s) may not have a melt flow index as such.

In the preferred embodiment where at least a portion of the module comprises a plurality of layers, the colored particles are preferably applied to at least a portion of the upper surface of the top-most layer prior to, or during the step of joining or lamination of the layers to form the module.

In another embodiment, the precursor is extruded prior to molding, and the colored particles are applied at 35 to a portion of the upper surface of the layer as the layer emerges from the extruder. This is schematically shown in FIG. 11.

Figure 11:
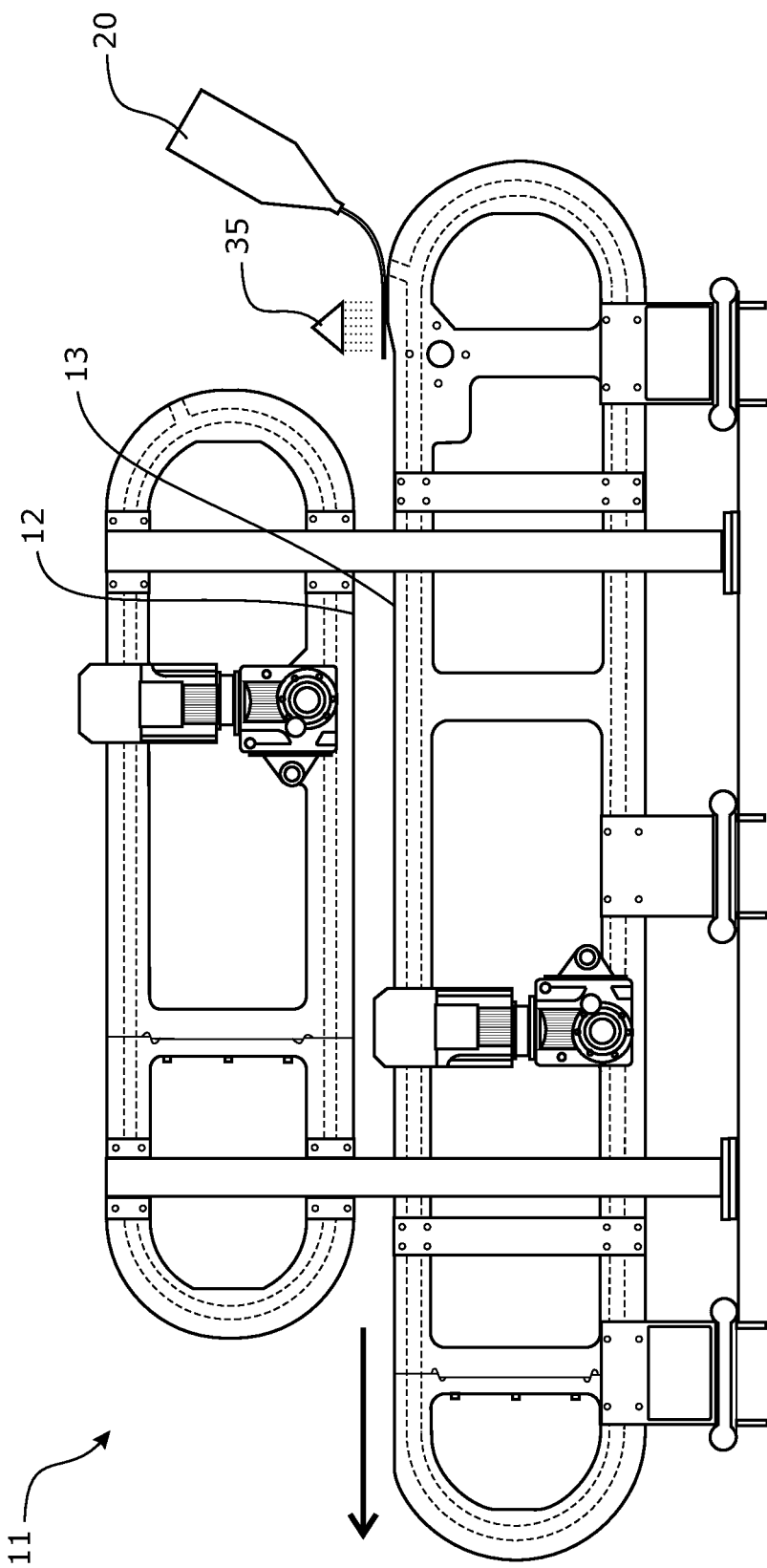
FIG. 11 shows a second embodiment of a system for coloring a roofing, cladding, or siding module.

It will be appreciated that both the coloring methods illustrated in FIGS. 10 and 11 may be employed, such that the precursor may be colored after extrusion, and once again during the molding step.

Figure 12:
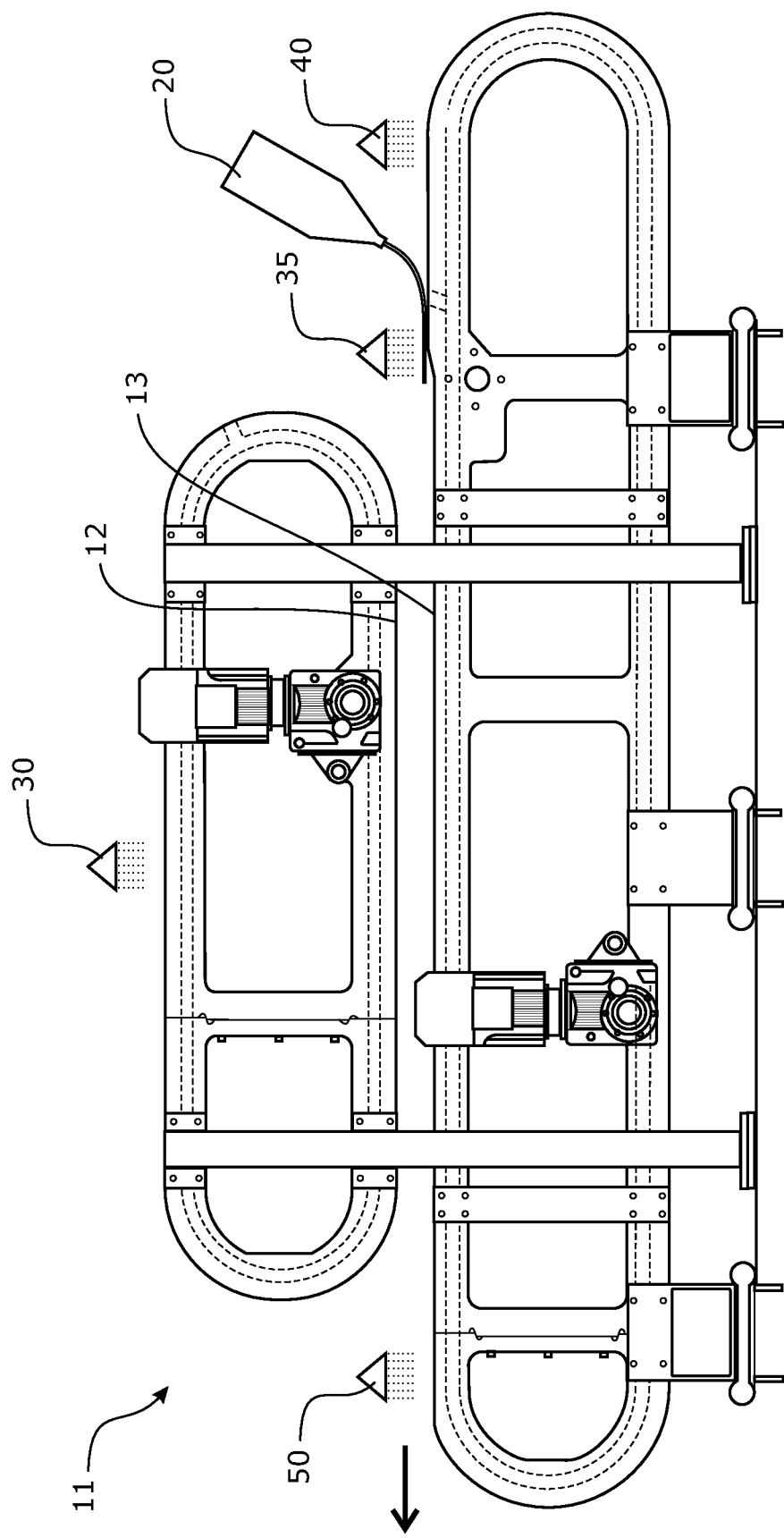
FIG. 12 shows a third embodiment of a system for coloring a roofing, cladding, or siding module.
Figure 13A:
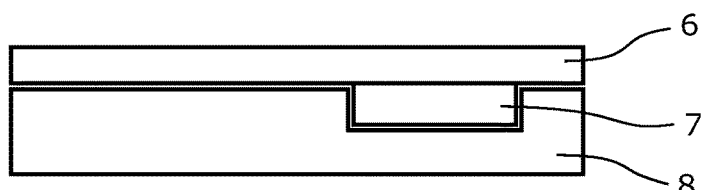
FIG. 13a-13h show various arrangements of a three-layered roofing, cladding, or siding module.
Figure 13B:
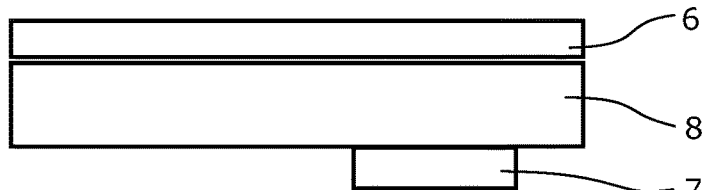
Figure 13C:
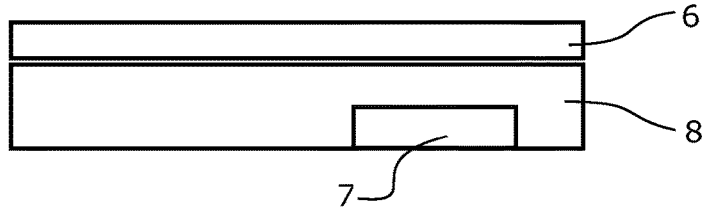
Figure 13D:
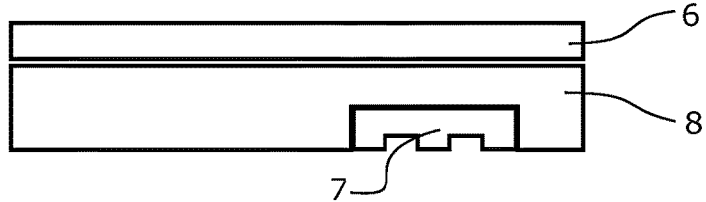
Figure 13E:
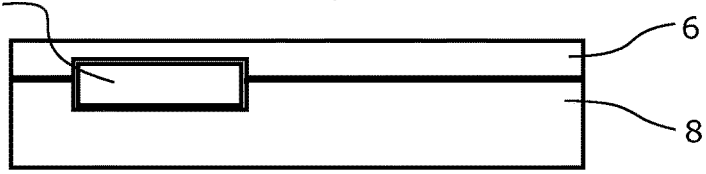
Figure 13F:
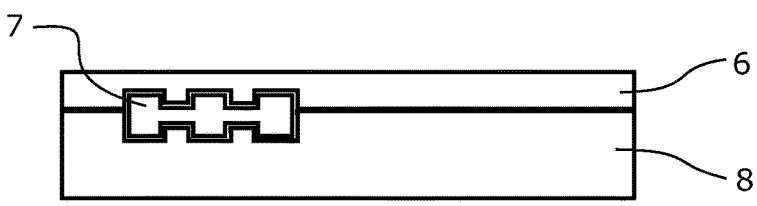
Figure 13G:
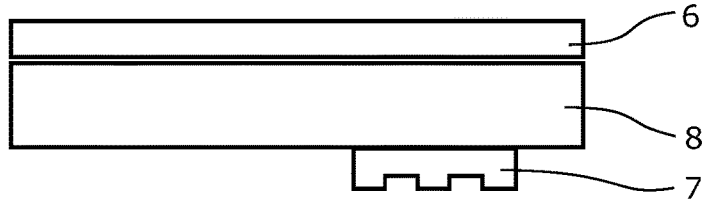
Figure 13H:
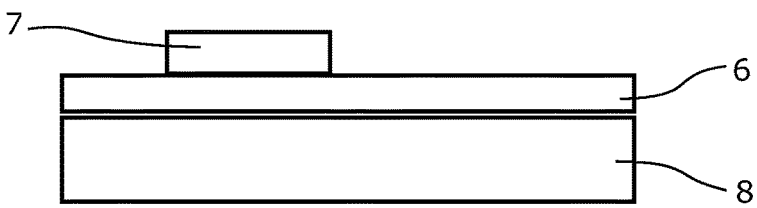

For example, FIG. 12 shows additional or alternative locations where the colored particles may be applied. The colored particles may be applied at 40, before a layer is extruded, or onto a layer which may be later formed with other extruded layers. Additionally or alternatively, the colored particles may be applied at 50 after the module has been formed.

The colored particles can be in the form of a powder and/or in a fluid capable of being dispersed upon at least the or a portion of the top surface of the exposed region, whether the application is direct or indirect to the surface, or whether a die face is used to convey the colored particles to the surface.

In one example, the colored particles may be or may comprise charged particles. The charged particles may be configured to be attracted to the die face, or directly onto the precursor. Alternatively, the charged particles may be configured to be ejected from a source of such charged particles onto the precursor.

In another embodiment, the colored particles may be or may comprise an adhesive for attaching the colored particles to the precursor.

The colored particles may be applied through a stencil and/or a mask (not shown), to selectively color one or more portions of the top surface of the precursor. Accordingly, there may be more than one application steps, in which the coloured particles of the same or a different type may be applied through the same or a different stencil, or to another portion of the top surface of the precursor.

Layering the application of colored particles like this may produce variations in color or surface patterning which better emulate the simulated material.

The present invention also relates to a coloured particle for decorating a substrate having an exposed surface to be decorated, the coloured particle having an initial colour and an exposed surface comprising one or more polymer, and wherein the coloured particle comprises filler and/or reinforcement, for example at least about 1, 2, 3, 4, 5, 10, 15, 20, 25, 30, 35, 40, 45, 50, 55, 60, 65, 70, 75, or 80% w/w filler and/or reinforcement based on the weight of the particle (any useful ranges may be selected between any two of these values) and to a plurality of such particles and to a method of producing a substrate having a decorated surface using such particles.

Such coloured particles are useful for decorating surfaces comprising one or more polymers as described herein and surfaces comprising or consisting of or consisting essentially of other materials, for example non-polymeric materials or substrates.

In some embodiments, the substrate is selected from concrete, cement, aggregate, geopolymer, metal, for example tin, aluminium, or stainless steel, timber, stone, clay, ceramic, or glass. The coloured particles may be brought into contact with the surface of the substrate as described herein. The coloured particles may mechanically adhere or bond to the exposed surface of the substrate by keying or interlocking with three-dimensional features of the exposed surface, for example, when the substrate is porous, by penetrating pores on the surface to be decorated. When the substrate is non-porous, for example aluminium, an etching agent may be used to roughen the surface and encourage the formation of a mechanical bond between the coloured particles and surface of the substrate. The surface of the substrate may be pre-heated to a temperature sufficient to allow the coloured particles being deposited to melt and/or fuse and/or coalesce with each other on the surface of the substrate. The amount of particles brought into contact with the surface of the substrate the particles may be sufficient to form a continuous polymeric layer or film on the surface of the substrate, preferably having a high peel strength characteristics. The thickness of the layer of film may, in some embodiments, range from about 10 microns to about 1 mm.

In addition to providing a decorative effect or appearance, the layer or film can also increase strength and/or provide a protective effect. For example, in some embodiments, the substrate is a tile, for example, a roofing tile. Such substrates are typically brittle and when exposed to thermal or physical forces can crack and fail breaking into pieces and compromising the integrity of the roof. In some embodiments, the layer or film provides for a roof tile that can withstand impact from damaging hail storms, whilst maintaining the integrity of both the tile and the coating. In some embodiments, the layer or film provides for a roof tile that remains weather tight even if the underlying substrate cracks, or fails, or otherwise loses structural integrity.

In other embodiments, the substrate is a substrate having an exposed surface to be decorated comprising one or more polymers as described herein, preferably a roofing, cladding, or siding product or module or a coating or a layer of a coating for a roofing, cladding, or siding product or module as described herein.

As described herein, the inclusion of suitable amounts of filler and/or reinforcement in the coloured particles may reduce the coefficient of thermal expansion of the particles. In some embodiments, the coloured particle comprising filler and/or reinforcement has a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).

The coefficient of thermal expansion of substrates such as concrete, cement, aggregate, geopolymer, metal, for example tin, aluminium, or stainless steel, timber, stone, clay, ceramic, or glass can be low (at least in comparison to synthetic polymeric substrates). In some embodiments, the absolute difference between the coefficient of thermal expansion of the particle and the coefficient of thermal expansion of the surface to be decorated of such substrates is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K). In some of such embodiments cupping, bending, distortion, and/or delamination, for example, of the layer or film formed from the coloured particles from the surface of the substrate may be reduced. The following non-limiting examples are provided to illustrate the present invention and in no way limit the scope thereof.

EXAMPLES

Example 1

Substrates having a decorated surface may be produced according to the method of the present invention using coloured particles having the characteristic set out in Table 1. As indicated in the Table, decorated surfaces having different visual appearances may be produced using coloured particles of polymers having a different MFI.

TABLE 1

Properties of coloured particles and visual appearance of decorated surface.

|  | Low MFI | Medium MFI | High MFI |
| --- | --- | --- | --- |
| MFI range | Less than 10, preferably 3 to 5 | From 10 to 30 | >30 |
| MW (molecular weight) range | High (and preferably narrow) | Medium (and preferably narrow) | Low (and preferably narrow) |
| Tg range | 90° C. or less |  | −120 to −70° C. |
| Particle size range | 0.3 to 1.5 mm, preferably 0.5 to 1 mm |  | 0.1 to 1 mm, preferably 0.25 to 1 mm |

TABLE 1-continued

Properties of coloured particles and visual appearance of decorated surface.

|  | Low MFI | Medium MFI | High MFI |
|---|---|---|---|
| Density (g/cm³) | 0.9 |  | 0.93 |
| Visual appearance of decorated surface | Discrete particles/ granulated look |  | Colour from particles runs together |
| Product that can be mimicked | Asphalt tile |  | Wooden shake or shingle/stone slate/ ceramic or clay (roofing) tile |

Example 2

Substrates having a decorated surface may be produced in accordance with the method of the present invention using the coloured particles, substrates, and conditions indicated in the Table 2-4 below.

Each table indicates the polymer material and MFI of both the coloured particles and substrate and the average particles size and shape of the coloured particles. The substrate in each case may be a polymeric substrate, such as an extruded polymer layer. Tg and HDT are also indicated.

The temperature at which the substrate is provided is indicated as the temperature of substrate. The coloured particles may be provided at ambient temperature (where the preheating of particles is indicated as none) or at a temperature within the temperature range indicated for preheating of particles. In each case, the temperature at which the substrate is provided greater than that at which the coloured particles are provided.

The hot substrate and optionally preheated coloured particles may then be brought into contact with each other and the pressure indicated applied. Heat may be imparted to the coloured particles by the hotter substrate or an external source of heat to heat the coloured particles to the target temperature and cause the coloured particles to fuse into or to or coalesce with exposed surface to be decorated.

The amount of coloured particles in grams per square meter of the surface of the substrate to be decorated is indicated as the density per meter cover.

The visual appearance of the decorated surface obtained is indicated as the resulting colour appearance and the corresponding product mimicked by that appearance also indicated.

TABLE 2

|  | Coloured particles | Substrate |
|---|---|---|
| Polymer material | TPO | TPO |
| MFI | 1 to 10 | 3 to 20 |
| Average particle size | 0.5-1.2 mm |  |
| Shape of particles | Shredded |  |
| HDT | 120° C.* | 80° C. |
| Tg | −120° C. | −80° C. |
| Conditions |  |  |
| Temperature of substrate |  | 180° C. |
| Preheating of particles | None |  |
| Target temperature | >140 |  |
| Pressure applied | >4 bar |  |
| Density per meter cover Decorated surface | 20 g/m²-300 g/m² |  |
| Result-colour appearance | Granulated |  |
| Product that can be mimicked | Asphalt tile |  |

*The method may also be carried out using coloured particles having an HDT of 70° C. to obtain granulated appearance.

TABLE 3

| Property | Coloured particles | Substrate |
|---|---|---|
| Polymer material | TPO | TPO |
| MFI | 25 to 50 | 3 to 50 |
| Average particle size | 0.3-0.5 mm |  |
| Shape of particles | Grind |  |
| HDT | 40° C. | 60° C. |
| Tg | −70° C. | −80° C. |
| Conditions |  |  |
| Temperature of substrate |  | 200° C. |
| Preheating of particles | 60-180° C. |  |
| Target temperature | 180° C. |  |
| Pressure applied | >4 bar |  |
| Density per meter cover Decorated surface | 10 g/m²-150 g/m² |  |
| Result-colour appearance | Non granulated- blended/washed out |  |
| Product that can be mimicked | Slate |  |

TABLE 4

| Property | Coloured particles | Substrate |
|---|---|---|
| Polymer material | Polycarbonate | Polycarbonate |
| MFI | 30 to 50 | 1 to 10 |
| Average particle size | 0.3-0.5 mm |  |
| Shape of particles | Grind |  |
| HDT | 130° C. | 135° C. |
| Tg | 145° C. | 149° C. |
| Conditions |  |  |
| Temperature of substrate |  | 250-270° C. |
| Preheating of particles | 100-150° C. |  |
| Target temperature | 200° C. |  |
| Pressure applied | >4 bar |  |
| Density per meter cover Decorated surface | 10 g/m²-150 g/m² |  |
| Result-colour appearance | Blended/washed out |  |
| Product that can be mimicked | Ceramic or clay (roofing) tile |  |

Example 3

A roofing, cladding, and/or siding module having a decorated may be produced by the method of the present invention as described below.

Coloured particles comprising about 50% w/w TPO and about 50% w/w filler and having high UV stability are brought into contact with the surface to be decorated in an amount of up to 400 grams/m².

The surface to be decorated is a layer comprising about 34% w/w TPO, about 49% w/w filler, and about 15% w/w glass fibre reinforcement, and having a thickness of about 400 micron, high flexibility, and high UV stability.

The decorated surface forms the top layer of the module. The module further comprises:

a second layer, disposed beneath the top layer, comprising about 88% w/w TPO and 10% w/w glass fibre reinforcement and having a thickness of about 400 micron.

a third layer, disposed beneath the second layer, being a foamed layer and comprising about 35% w/w TPO, 50% w/w filler, 15% w/w glass fibre reinforcement, and having a thickness of >2 mm, medium flexibility, and high UV stability.

The module may optionally further comprise:

a fourth layer, disposed beneath the third layer, that provides chemical resistance and/or a barrier to prevent and/or reduce the migration of chemicals from the underside of the layer into layers disposed above the layer, the layer comprising an acrylic polymer and no filler or reinforcement, having a thickness of about 30 micron, high flexibility, and high UV stability, and being radiation (UV) cured and plasma treated.

a fifth layer, disposed beneath the fourth layer, of a pressure sensitive adhesive.

a sixth layer, disposed beneath the fifth layer, as a release sheet, the release sheet comprising siliconized polypropylene and no filler or reinforcement, and having high flexibility and low or no UV stability.

The module at temperatures up to about 90° C. exhibits no noticeable bending or deformation when installed.

The foregoing description of the invention includes preferred forms thereof. Modifications may be made thereto without departing from the scope of the invention.

The following numbered paragraphs define particular aspects and embodiments of the present invention.

1. A method of producing a substrate having a decorated surface, the method comprising:
   providing one or more pluralities of coloured particles having an initial colour and an exposed surface comprising one or more polymer;
   providing a substrate having an exposed surface to be decorated comprising one or more polymers;
   bringing into contact said one or more pluralities of coloured particles and said exposed surface to be decorated; and
   exposing said coloured particles and/or said exposed surface to be decorated to a temperature and pressure sufficient to cause said coloured particles to fuse into or fuse to or coalesce with said exposed surface to be decorated, said temperature and pressure being controlled over a period of time to thereby produce a substrate having a decorated surface.

2. The method of paragraph 1, wherein the substrate is polymeric or comprises a polymeric coating or layer of a coating defining the exposed surface to be decorated.

3. The method of paragraph 1 or 2, wherein the substrate comprises a roofing, cladding, or siding product or a coating or a layer of a coating for a roofing, cladding, or siding product, preferably a polymeric roofing, cladding, or siding product, or a polymeric coating or layer of a coating for a roofing, cladding, or siding product, preferably a polymeric roofing, cladding, or siding product.

4. The method of any one of the preceding paragraphs, wherein the one or more pluralities of coloured particles are selected such that the coloured particles and/or the one or more polymers of the exposed surface of the particles have an MFI and/or such that the particles have an average particle size effective at the temperature and pressure to which the coloured particles and/or surface to be decorated are exposed to provide a desired visual appearance in and/or on the decorated surface.

5. The method of any one of the preceding paragraphs, wherein the coloured particles and/or the one or more polymers of the exposed surface of the coloured particles are miscible or compatible, preferably miscible, with the exposed surface to be decorated and/or the one or more polymers of the exposed surface to be decorated at a temperature greater than the glass transition temperature (Tg) of the coloured particles and/or the one or more polymers of the exposed surface of the particles and/or a temperature greater than the Tg of the exposed surface to be decorated and/or the one or more polymers of the exposed surface to be decorated.

6. The method of any one of the preceding paragraphs, wherein the temperature to which the coloured particles and/or surface to be decorated are exposed is greater than the Tg of the coloured particles and/or the one or more polymers of the exposed surface of the particles and/or greater than the Tg of the exposed surface to be decorated and/or the one or more polymers of the exposed surface to be decorated at said pressure to which the coloured particles and/or surface to be decorated are exposed.

7. The method of paragraph 6, wherein the temperature greater than the Tg of the coloured particles and/or the one or more polymers of the exposed surface of the coloured particles and/or greater than the Tg of the exposed surface to be decorated and/or the one or more polymers of the exposed surface to be decorated is at least about 5° C. greater than the Tg, for example at least about 10, 15, 20, 25, 30, 35, 40, 45, 50, 55, 60, 65, 70, 75, 80, 85, 90, 95, or 100° C. greater than the Tg, preferably at least 50° C. greater than the Tg (and useful ranges may be selected from any two of these values).

8. The method of any one of the preceding paragraphs, wherein the method comprises providing two or more pluralities of coloured particles and bringing into contact the exposed surface to be decorated and the two or more pluralities of coloured particles, wherein the coloured particles of each plurality of coloured particles are of a different type.

9. The method of paragraph 8, wherein the coloured particles of each plurality of coloured particles differ in composition or a physical property or characteristic.

10. The method of paragraph 8 or 9, wherein the coloured particles of each plurality of coloured particles differ in one or more of the following: initial colour; the composition of the one or more polymers of the exposed surface of the particles; the glass transition temperature (Tg) of the particles and/or the one or more polymers of the exposed surface of the particles; the heat deflection temperature (HDT) of the particles and/or the one or more polymers of the exposed surface of the particles; the melt flow index (MFI) of the particles and/or the one or more polymers of the exposed surface of the particles; average particle size; shape; ability to reflect light; stability to degradation, for example by light, heat, or microbes; and ability to provide grip or abrasion.

11. The method of any one of the preceding paragraphs, wherein the coloured particles of one or more pluralities and/or exposed surface to be decorated are at the temperature to which the particles and/or exposed surface to be decorated are to be exposed when bringing the particles and exposed surface to be decorated into contact; and/or the coloured particles of one or more pluralities and/or surface to be decorated are heated to the temperature to which the particles and/or surface to be decorated are to be exposed after bringing the coloured particles and exposed surface to be decorated into contact.

12. The method of any one of the preceding paragraphs, wherein bringing the one or more pluralities of coloured particles and exposed surface to be decorated into contact comprises: (a) applying one or more of the pluralities of coloured particles to the exposed surface to be decorated; or (b) applying one or more of the pluralities of coloured particles to a surface, and applying the exposed surface to be decorated to the coloured particles.

13. The method of any one of the preceding paragraphs, wherein the method comprises applying pressure to the coloured particles and exposed surface to be decorated after bringing the coloured particles and the exposed surface to be decorated into contact.

14. The method of any one of the preceding paragraphs, wherein the coloured particles of one or more pluralities of coloured particles have an average particle size of from about 0.05 to about 5 mm, for example 00.05 to about 5 mm, for example 0.05 to 5, 0.05 to 4.5, 0.05 to 4, 0.05 to 3.5, 0.05 to 3, 0.05 to 2.5, 0.05 to 2, 0.05 to 1.9, 0.05 to 1.8, 0.05 to 1.7, 0.05 to 1.6, 0.05 to 1.5, 0.1 to 5, 0.1 to 4, 0.1 to 3, 0.1 to 2, 0.1 to 1.9, 0.1 to 1.8, 0.1 to 1.7, 0.1 to 1.6, 0.1 to 1.5, 0.2 to 5, 0.2 to 4, 0.2 to 3, 0.2 to 2, 0.2 to 1.9, 0.2 to 1.8, 0.2 to 1.7, 0.2 to 1.6, 0.2 to 1.5, 0.3 to 5, 0.3 to 4, 0.3 to 3, 0.3 to 2, 0.3 to 1.9, 0.3 to 1.8, 0.3 to 1.7, 0.3 to 1.6, or 0.3 to 1.5 mm, preferably from about 0.3 to 1.5 mm or from 0.1 to about 0.5 mm.

15. The method of any one of the preceding paragraphs, wherein the coloured particles pluralities are of a predetermined shape (for example, substantially spherical, cylindrical, tubular, or cone-shaped); of random shape; or a mixture thereof.

16. The method of any one of the preceding paragraphs, wherein the one or more polymers of the exposed surface of the coloured particles and/or the one or more polymers of the exposed surface to be decorated are selected from thermoplastic polymers.

17. The method of any one of the preceding paragraphs, wherein the one or more polymers of the exposed surface of the coloured particles and/or the one or more polymers of the exposed surface to be decorated are selected from polystyrene (GPPS), polyethylene terephthalate (PET), polyester methacrylate (PEM), high impact polystyrene (HIPS), acrylonitrile butadiene styrene (ABS), polyvinyl chloride (PVC), polyurethanes (PU), polyethylene (PE) including homopolymer, copolymer, block copolymer and terpolymer forms, polylactic acid (PLA), nylon (PA), acrylics (PMMA), high density polyethylene (HDPE), low density polyethylene (LDPE), linear low density polyethylene (LLDPE), medium density polyethylene (MDPE), cross linked polyethylene (PEX), thermoplastic elastomer (TPE), thermoplastic polyolefin (TPO), thermoplastic rubber (TPR), polypropylene (PP), including homopolymer and copolymer forms, polybutylene terephthalate (PBT), styrene-acrylonitrile resin (SAN), ethylene tetrafluoroethylene (ETFE), vinyl, methacrylate copolymers, foamed polymer, polycarbonates, and combinations thereof.

18. The method of any one of the preceding paragraphs, wherein the one or more polymers of the exposed surface of the coloured particles are selected from a polyethylene, for example linear low density polyethylene (LLDPE), low density polyethylene (LDPE), high density polyethylene (HDPE), or a thermoplastic olefin (TPO), for example a polyethylene based TPO, or a blend of any two or more thereof.

19. The method of any one of the preceding paragraphs, wherein the one or more polymers of the exposed surface of the coloured particles are selected from HDPE, a blend of HDPE and LDPE, or a blend of HDPE and LLDPE.

20. The method of any one of the preceding paragraphs, wherein coloured particles and/or the one or more polymers of the exposed surface of the coloured particles have a heat deflection temperature (HDT) of at least about 40° C., for example at least about 45, 50, 55, 60, 65, 75, 80, 85, 90, 95, 100, 110, 120, 130, 140, 150, 175, or 200° C. (and useful ranges may be selected from any two of these values, for example from 60 to 100° C.).

21. The method of any one of the preceding paragraphs, wherein the coloured particles and/or the one or more polymers of the exposed surface of the coloured particles and/or the exposed surface to be decorated and/or the one or more polymers of the exposed surface to be decorated have a glass transition temperature (Tg) of about 200° C. or less, for example about 150, 125, 100, 75, 50, or 25° C. or less, or 0° C. or less.

22. The method of any one of the preceding paragraphs, wherein the coloured particles and/or one or more polymers on the exposed surface of the coloured particles have a melt flow index (MFI) from about 0 to about 50 (including fractional melts from 0 to 1), for example from 0 to 45, 0 to 40, 0 to 35, 0 to 30, 0 to 20, 0 to 15, 0 to 10, 0 to 5, 0 to 4, 0 to 3, 0 to 2, 0 to 1, 0 to 0.5.

23. The method of any one of the preceding paragraphs, wherein the one or more polymers of the exposed surface to be decorated are selected from a polyethylene, a thermoplastic olefin (TPO), or a combination of any two or more thereof.

24. The method of any one of the preceding paragraphs, wherein the exposed surface to be decorated and/or the one or more polymers of the exposed surface to be decorated has a heat deflection temperature (HDT) of at least about 90° C.

25. The method of any one of the preceding paragraphs, wherein:
    (a) the coloured particles and/or the one or more polymers of the exposed surface of the coloured particles have an MFI from about 0 to about 10, for example 0 to 9, 0 to 8, 0 to 7, 0 to 6, 0 to 5, 0 to 4, 0 to 3, 0 to 2, or 0 to 1; and/or
    (b) the coloured particles and/or the one or more polymers of the exposed surface of the coloured particles have a Tg of 90° C. or less, for example . . . ; and/or
    (c) the coloured particles and/or the one or more polymers of the exposed surface of the coloured particles have a HDT of 90° C. or more; and/or
    (d) the coloured particles have an average particles size from about 0.3 to 1.5 mm, for example 0.5 to 1 mm.

26. The method of paragraph 25, wherein the decorated surface resembles stone chips or asphalt shingle.

27. The method of any one of the preceding paragraphs, wherein:
   (a) the coloured particles and/or one or more polymers of the exposed surface of the coloured particles have an MFI from about 20 or more, for example 20, 25, 30, 35, 40, 50, or 60 or more; and/or
   (b) the coloured particles and/or the one or more polymers of the exposed surface of the coloured particles have a Tg of from about −120 to about −70° C.; and/or
   (c) the coloured particles and/or the one or more polymers of the exposed surface of the coloured particles have a HDT of 45° C. or more; and/or
   (d) the coloured particles have an average particles size from about 0.1 to 1 mm, for example 0.1 to 0.5 or 0.25 to 0.5 mm.
28. The method of paragraph 27, wherein the decorated surface resembles slate, wooden shingle or shake, or ceramic or clay tile.
29. The method of any one of the preceding paragraphs, wherein the amount of coloured particles brought into contact with the exposed surface to be decorated varies across the width and/or length of the exposed surface to be decorated.
30. The method of any one of the preceding paragraphs, wherein the coloured particles brought into contact with the exposed surface to be decorated are distributed across the width and/or length of the exposed surface randomly or in an ordered arrangement.
31. The method of any one of the preceding paragraphs, wherein the method comprises selectively decorating one or more predetermined areas of the exposed surface to be decorated.
32. The method of any one of the preceding paragraphs, wherein (a) the coloured particles are selectively brought into contact with one or more predetermined areas of the exposed surface to be decorated; or (b) at least a portion of the coloured particles brought into contact with the exposed surface to be decorated are selectively removed from one or more predetermined areas of the surface prior to fusion or coalescence of the particles, for example by brushing, blowing, vacuum, or adhesion to another surface, and optionally recycled.
33. The method of any one of the preceding paragraphs, wherein the amount of coloured particles brought into contact with the exposed surface to be decorated in an amount from 1 g to 2,000 g/m$^2$.
34. The method of any one of the preceding paragraphs, wherein from about 1 to about 100% of the surface area of the exposed surface to be decorated is brought into contact with coloured particles, for example from 30 to 100, 40 to 100, 50 to 100, 60 to 100, 70 to 100, 80 to 100, 90 to 100, 95 to 100, 30 to 90, 40 to 90, 50 to 90, 60 to 90, 70 to 90, 80 to 90, 30 to 80, 40 to 80, 50 to 80, 60 to 80, or 70 to 80%.
35. The method of any one of the preceding paragraphs, wherein from about 1 to 100% of the surface area of the decorated surface is coloured by colour provided by the coloured particles after causing the coloured particles to fuse into or to or coalesce with the exposed surface to be decorated, for example from 5 to 100, 10 to 100, 15 to 100, 20 to 100, 25 to 100, 30 to 100, 40 to 100, 50 to 100, 5 to 90, 10 to 90, 15 to 90, 20 to 90, 25 to 90, 30 to 90, 40 to 90, 50 to 90, 5 to 80, 10 to 80, 15 to 80, 20 to 80, 25 to 80, 30 to 80, 40 to 80, 50 to 80%.
36. The method of any one of the preceding paragraphs, wherein the decorated surface varies in colour (including variation in hue, saturation, or brightness or a variation in reflectance) across the width and/or length of the surface.
37. The method of any one of the preceding paragraphs, wherein the decorated surface comprises a plurality of visually differentiable coloured regions, which coloured regions may be the same or different in colour and/or size and/or shape, across the width and/or length of the surface.
38. The method of paragraph 36 or 37, wherein the colour across the width and/or length of the decorated surface extends from the surface into a portion of the depth of the substrate (but not the whole of the depth of the substrate).
39. The method of any one of the preceding paragraphs, wherein the surface to be decorated is colourless or uniformly or non-uniformly coloured in any colour (including blend or combinations of different colours).
40. The method of any one of the preceding paragraphs, wherein the surface to be decorated has even or uneven topography.
41. The method of any one of the preceding paragraphs, wherein the exposed surface to be decorated comprises three dimensional surface features, including surface relief, surface texturing, or surface deformations, that contribute to the appearance of the decorated surface.
42. The method of any one of the preceding paragraphs, wherein one or more pluralities of coloured particles and/or the surface to be decorated comprises one or more components susceptible to UV, thermal, and/or other environmental degradation.
43. The method of any one of the preceding paragraphs, wherein the method comprises subjecting the decorated surface to one or more additional processing steps, for example stretching or otherwise or physically deforming the surface of the substrate.
44. The method of any one of the preceding paragraphs, wherein the decorated surface has increased surface hardness, scuff resistance, and/or slip resistance compared to the exposed surface to be decorated.
45. The method of any one of the preceding paragraphs, wherein one or more pluralities of coloured particles and/or the exposed surface to be decorated comprise one or more of the following: light stabilisers, for example one or more UV protectants; thermal stabilisers; biocides; friction enhancers; surface leaching agents or inhibitors.
46. The method of any one of the preceding paragraphs, wherein the particles comprise one or more coloured polymers; the particles comprise a polymeric matrix comprising the one or more polymers within which one or more colourants (and optionally one or more other components) are dispersed; or the particles comprises one or more coatings, the outermost coating defining the exposed surface of the particles comprising the one or more polymers within which one or more colourants (and optionally one or more other components of the particles are encapsulated.
47. The method of any one of the preceding paragraphs, wherein the coloured particles comprise 1 to about 100% w/w of the one or more polymers of the exposed surface of the coloured particles based on the weight of the particles, for example from 2 to 100, 3 to 100, 4 to 100, 5 to 100, 10 to 100, 20 to 100, 30 to 100, 40 to 100, 50 to 100, 60 to 100, 70 to 100, 80 to 100, 1 to 99, 2 to 99, 3 to 99, 4 to 99, 5 to 99, 10 to 99, 20 to 99, 30 to 99, 40 to 99, 50 to 99, 60 to 99, 70 to 99, 80 to 99, 2 to 98, 3 to 98, 4 to 98, 5 to 98, or 10 to 98%.

48. The method of any one of the preceding paragraphs, wherein the coloured particles comprise from about 10 to about 98% w/w of the one or more polymers of the exposed surface of the coloured particles based on the weight of the particles, for example from 20 to 98, 30 to 98, 40 to 98, 50 to 98, 60 to 98, 70 to 98, or 80 to 98%, preferably from about 80 to 98%.

49. The method of any one of the preceding paragraphs, wherein the exposed surface to be decorated comprises from about 1 to about 100% w/w of the one or more polymers of the exposed surface to be decorated based on the weight of the material from which the exposed surface to be decorated is formed, for example from 2 to 100, 3 to 100, 4 to 100, 5 to 100, 10 to 100, 20 to 100, 30 to 100, 40 to 100, 50 to 100, 60 to 100, 70 to 100, 80 to 100, 1 to 99, 2 to 99, 3 to 99, 4 to 99, 5 to 99, 10 to 99, 20 to 99, 30 to 99, 40 to 99, 50 to 99, 60 to 99, 70 to 99, 80 to 99, 2 to 98, 3 to 98, 4 to 98, 5 to 98, or 10 to 98%.

50. The method of any one of the preceding paragraphs, wherein the exposed surface to be decorated comprises about 10 to about 98% w/w of the one or more polymers of the exposed surface to be decorated based on the weight of the material from which the exposed surface to be decorated is formed, for example 10 to 90, 10 to 80, 10 to 70, 10 to 60, 10 to 50, 20 to 98, 20 to 90, 20 to 80, 20 to 70, 20 to 60, 20 to 50, preferably 20 to 50%.

51. The method of any one of the preceding paragraphs, wherein the substrate is a polymeric substrate or a substrate comprising a polymeric coating or layer of a coating that provides the exposed surface to be decorated, wherein the polymeric substrate or polymer coating or layer comprises from about 1 to about 100% w/w of the one or more polymers based on the weight of the polymeric substrate or polymeric coating or layer, for example 2 to 100, 3 to 100, 4 to 100, 5 to 100, 10 to 100, 20 to 100, 30 to 100, 40 to 100, 50 to 100, 60 to 100, 70 to 100, 80 to 100, 1 to 99, 2 to 99, 3 to 99, 4 to 99, 5 to 99, 10 to 99, 20 to 99, 30 to 99, 40 to 99, 50 to 99, 60 to 99, 70 to 99, 80 to 99, 2 to 98, 3 to 98, 4 to 98, 5 to 98, or 10 to 98%.

52. The method of any one of the preceding paragraphs, wherein the substrate is a polymeric substrate or a substrate comprising a polymeric coating that provides the exposed surface to be decorated, wherein the polymeric substrate or polymer coating or layer comprises from about 10 to about 98% w/w of the one or more polymers based on the weight of the polymeric substrate or polymeric coating or layer, for example 10 to 90, 10 to 80, 10 to 70, 10 to 60, 10 to 50, 20 to 98, 20 to 90, 20 to 80, 20 to 70, 20 to 60, 20 to 50, preferably 20 to 50%.

53. The method of any one of the preceding paragraphs, wherein the temperature to which the coloured particles and/or surface to be decorated are exposed to cause said coloured particles to fuse into or to or coalesce with said exposed surface is at least 60° C., for example at least 65, 70, 75, 80, 85, 90, 95, 100, 110, 120, 130, 140, 150, 160, 170, 180, 190, or 200° C. or more.

54. The method of any one of the preceding paragraphs, wherein the temperature to which the coloured particles and/or surface to be decorated are exposed to cause said coloured particles to fuse into or to or coalesce with said exposed surface is at least at least 100° C., for example at least 110, 120, 130, 140, 150, 160, 170, 180, 190, or 200° C. or more.

55. The method any one of the preceding paragraphs, wherein the pressure to which the coloured particles and/or surface to be decorated are exposed to cause said coloured particles to fuse into or to or coalesce with said exposed surface is at least about 2 bar, for example at least 3 or at least 4 bar, for example from 2 to 10, 3 to 10, or 4 to 10 bar.

56. The method of any one of the preceding paragraphs, wherein the one or more polymers of the exposed surface of the coloured particles and/or the one or more polymers of the exposed surface to be decorated comprises a polycarbonate.

57. The method of any one of the preceding paragraphs, wherein the coloured particles and/or the one or more polymers of the exposed surface of the coloured particles have a heat deflection temperature (HDT) of at least about 20° C., for example at least about 25, 30, 35, 40, 45, 50, 55, 60, 65, 75, 80, 85, 90, 95, 100, 110, 120, 130, 140, 150, 175, or 200° C. (and useful ranges may be selected from any two of these values, for example from 60 to 100° C.).

58. The method of any one of the preceding paragraphs, wherein the exposed surface to be decorated and/or the one or more polymers of the exposed surface to be decorated has a heat deflection temperature (HDT) of at least about 20° C., for example at least about 30, 40, 50, 60, 70, 80, or 90° C.

59. The method of any one of the preceding paragraphs, wherein the exposed surface to be decorated and/or the one or more polymers of the exposed surface to be decorated has a heat deflection temperature (HDT) of at least about 70° C., for example at least about 75, 80, 85, or 90° C.

60. The method of any one of the preceding paragraphs, wherein the decorated surface has a heat deflection temperature (HDT) of at least about 20° C., for example at least about 30, 40, 50, 60, 70, 80, or 90° C.

61. The method of any one of the preceding paragraphs, wherein the coloured particles and/or the one or more polymers of the exposed surface of the coloured particles and/or the exposed surface to be decorated and/or the one or more polymers of the exposed surface to be decorated, preferably the coloured particles and/or the exposed surface to be decorated, have a Vicat softening point of at least about 60° C., for example at least about 61, 62, 63, 64, 65, 66, 67, 68, 69, 70, 71, 72, 73, 74, 75, 76, 77, 78, 79, 80, 81, 82, 83, 84, or 85° C. (and useful ranges may be selected from any two of these values, for example from 70 to 80° C.).

62. The method of any one of the preceding paragraphs, wherein the decorated surface has a Vicat softening point of at least about 60° C., for example at least about 61, 62, 63, 64, 65, 66, 67, 68, 69, 70, 71, 72, 73, 74, 75, 76, 77, 78, 79, 80, 81, 82, 83, 84, or 85° C. (and useful ranges may be selected from any two of these values, for example from 70 to 80° C.).

63. The method of any one of the preceding paragraphs, wherein the substrate is polymeric or comprises a polymeric coating or layer of a coating defining the exposed surface to be decorated and the method further comprises joining the polymeric substrate or coating or layer with or to one or more other polymer layers.

64. The method of any one of the preceding paragraphs, wherein the one or more polymers of the exposed surface to be decorated and/or one or more polymers of the exposed surface of the coloured particles has a modulus of elasticity of at least about 0.9 MPa, for example at least about 1 MPa.
65. The method of paragraph 64, wherein the modulus of elasticity is from about 0.9 MPa to about 16.2 MPa, for example from about 0.9 to 16, 0.9 to 15, 0.9 to 12, 0.9 to 10, 0.9 to 8, 0.9 to 6, 0.9 to 5, 0.9 to 4, 1 to 15, 1 to 12, 1 to 10, 1 to 8, 1 to 6, 1 to 5, or 1 to 4 MPa.
66. The method of any one of the preceding paragraphs, wherein the one or more polymers of the exposed surface to be decorated comprises one or more elastomers.
67. The method of any one of the preceding paragraphs, wherein the one or more polymers of the exposed surface of the coloured particles comprises one or more elastomers.
68. The method of any one of paragraphs 66 or 67, wherein the one or more elastomers are selected from thermoplastic elastomers.
69. The method of any one of the preceding paragraphs, wherein the exposed surface to be decorated based on the weight of the material from which the exposed surface to be decorated is formed and/or the coloured particles based on the weight of the particles comprises from about 10 to about 100% w/w one or more elastomers, for example from about 10 to 98, 10 to 95, 10 to 90, 10 to 80, 10 to 70, 10 to 60, 20 to 98, 20 to 95, 20 to 90, 20 to 80, 20 to 70, 20 to 60, 30 to 98, 30 to 95, 30 to 90, 30 to 80, 30 to 70, 30 to 60, 40 to 98, 40 to 95, 40 to 90, 40 to 80, 40 to 70, 40 to 605 w/w, preferably from about 20 to about 60%, or from about 40 to about 60% w/w.
70. The method of any one of the preceding paragraphs, wherein the substrate comprises a layer of a roofing, cladding, or siding module defining the exposed surface to be decorated, optionally wherein the layer is formed of an extruded material comprising filler and/or reinforcement, for example at least 1, 5, 10, 15, 20, 25, 30, 35, 40, 45, 50, 55, 60, 65, 70, 75, 80, 85, 90, or 90% w/w filler and/or reinforcement (and useful ranges may be selected from any two of these values), and one or more polymers.
71. The method of paragraph 70, wherein the substrate further comprises one or more additional layers from which the module is formed.
72. The method of any one of the preceding paragraphs, wherein the method is for producing a roofing, cladding, or siding module having a decorated surface, wherein the module comprises:
an underlapping region extending from a head edge of the module and an exposed region extending from a foot edge of the module, the length of the foot edge defining the length of the module,
wherein the underlapping region is adapted to be substantially covered by the exposed region of an adjacent or overlapping module when installed on a building surface,
wherein the module is formed of at least one layer of extruded material, wherein the layer so formed comprises:
a) filler and/or reinforcement,
b) one or more polymer(s).
73. The method of any one of the preceding paragraphs, wherein the method is for producing a roofing, cladding, or siding module having a decorated surface, wherein the module is formed of at least one layer formed of an extruded material comprising at least 40% w/w filler and/or reinforcement and one or more polymers.
74. The method of any one of the preceding paragraphs, wherein the method is for producing a roofing, cladding, or siding module having a decorated surface, wherein the module comprises:
an underlapping region extending from a head edge of the module and an exposed region extending from a foot edge of the module, the length of the foot edge defining the length of the module,
wherein the underlapping region is adapted to be substantially covered by the exposed region of an adjacent or overlapping module when installed on a building surface,
wherein the module is formed of at least one layer of extruded material, wherein the layer so formed comprises:
a) at least 40% w/w filler and/or reinforcement,
b) one or more polymer(s).
75. The method of any one of paragraphs 70 to 74, wherein the one or more polymers of the extruded material comprises one or more elastomers, for example one or more thermoplastic elastomers.
76. The method of any one of the preceding paragraphs, wherein one or more layers of the module, such as the layer defining the surface to be decorated, and/or the decorated surface has a Shore A hardness at least 60, for example at least about 65, 70, 75, 80, 85, or 90 (and useful ranges may be selected from any two of these values, for example, from about 60 to 90, 70 to 90, or 80 to 90); and a Shore D hardness of less than about 60, for example less than about 55, 50, 45, 40, 35, or 30 (and useful ranges may be selected from any two of these values, for example, from about 60 to 30, 50 to 30, or 40 to 30), any useful ranges may be selected from any Shore A and Shore D values (for example, a Shore A hardness of at least about 60 and a Shore D hardness less than about 60, or a Shore A hardness of at least 70 and a Shore D hardness less than 50). Both Shore A hardness and Shore D hardness may be determined by procedures in accordance with ASTM D2240-00.
77. The method of any one of paragraphs 70 to 76, wherein the layer comprises at least 60% w/w filler and/or reinforcement.
78. The method of any one of paragraphs 70 to 77, wherein the layer comprises about 60% to about 95% w/w filler and/or reinforcement.
79. The method of any one of paragraphs 70 to 78, wherein the layer comprises at least about 5% w/w reinforcement.
80. The method of any one of paragraphs 70 to 79, wherein the layer comprises about 5% to about 30%, for example 5% to 20%, w/w reinforcement.
81. The method of any one of paragraphs 70 to 80, wherein the reinforcement comprises or consists or consists essentially of fibres, for example one or more non-conductive natural or synthetic fibres, such as glass fibres, carbon fibres, polymer fibres, and the like.
82. The method of paragraph 81, wherein the fibres are aligned along the length of the module.
83. The method of any one of paragraphs 70 to 80, wherein the reinforcement comprises or consists or consists essentially of glass fibres.
84. The method of paragraph 83, wherein the glass fibres, prior to processing (e.g., prior to the extrusion process) are between about 0.5 to 15 mm, 0.5 to 10 mm, or 0.5 and 5 mm in length (or may be about 1-15 mm, 1-10 mm, 1-5 mm, or about 2-5 mm, or about 3-5 mm in length) and about 0.015 to about 0.018 mm in diameter.

85. The method of any one of paragraphs 70 to 84, wherein the layer comprises at least about 5% w/w glass fibres, preferably at least about 10% w/w, for example at least about 15% w/w.

86. The method of any one of paragraphs 70 to 85, wherein the layer comprises from about 5% to 20%, for example from about 10% to 20%, w/w glass fibres.

87. The method of any one of paragraphs 70 to 86, wherein the layer formed from the extruded material comprises glass fibres having an average length of at least about 100 microns, for example at least about 150, 200, 250, 300, 350, 400, 450, 500, 550, 600, 650, 700, 750, 800, 850, 900, 950, or 1,000 microns.

88. The method of any paragraph 87, wherein said layer so formed of a said extruded material is provided as a base or bottom layer of the module, and the module further comprises one or more additional upper layers provided as further layers upon said base or bottom layer.

89. The method of any one of paragraphs 70 to 88, wherein at least a portion of the module comprises a top layer (or an upper layer or a plurality of upper layers forming a said top layer), a base or bottom layer (or a lower layer or a plurality of lower layers forming a said base or bottom layer), and an intermediate layer (or a plurality of layers forming a said intermediate layer) between the top and base or bottom layers.

90. The method of any one of paragraphs 70 to 89, wherein at least one layer or each or all of the layers comprises one or more amorphous polymer, or one or more polymer having a degree of crystallinity that is low, for example a degree of crystallinity of less than about 70, 65, 60, 55, 50, 45, 40, 35, 30, 25, 20, 15, or 10%.

91. The method of any one of paragraphs 70 to 89, wherein at least one layer or each or all of the layers comprises one or more amorphous polymer, or one or more polymer having a degree of crystallinity that for the given polymer is low.

92. The method of any one of paragraphs 70 to 91, wherein the module and/or one or more layers and/or each or all of the layers of the module has anisotropic thermal expansion, the coefficient of thermal expansion with respect to the length of a module or layer being lower than the coefficient of thermal expansion with respect to the width of the module or layer and/or the coefficient of thermal expansion with respect to the depth of the module or layer.

93. The method of any one of paragraphs 70 to 92, wherein at least one layer or each or all of the layers has a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).

94. The method of any one of paragraphs 70 to 93, wherein the absolute difference between the coefficient of thermal expansion of the layer of the module having the highest coefficient of thermal expansion and the layer of the module having the lowest coefficient of thermal expansion is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).

95. The method of any one of paragraphs 70 to 94, wherein the coefficient of thermal expansion of the module is less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).

96. The method of any one of the preceding paragraphs, wherein the absolute difference between the coefficient of thermal expansion of the decorated surface and the coefficient of thermal expansion of the exposed surface to be decorated is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).

97. The method of any one of the preceding paragraphs, wherein the absolute difference between the coefficient of thermal expansion of the one or more pluralities of coloured particles and coefficient of thermal expansion of the exposed surface to be decorated, such as a layer of a module, is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).

98. The method of any one of the preceding paragraphs, wherein the coloured particles comprise filler and/or reinforcement, for example at least about 1, 2, 3, 4, 5, 10, 15, 20, 25, 30, 35, 40, 45, 50, 55, 60, 65, 70, 75, or 80% w/w filler and/or reinforcement based on the weight of the particles (any useful ranges may be selected between any two of these values).

99. The method of any one of the preceding paragraphs, wherein the coloured particles comprise at least 20, 25, 30, 35, 40, 45, 50, 55, 60, 65, 70, 75, or 80% w/w filler and/or reinforcement based on the weight of the particles (any useful ranges may be selected between any two of these values).

100. The method of any one of the preceding paragraphs, wherein the coloured particles comprise at least 10, 15, 20, 25, 30, 35, 40, 45, 50, 55, 60, 65, 70, 75, or 80% w/w filler based on the total weight of the particles, and useful ranges may be selected from any two of these values (for example, from about 10% to about 80% w/w filler, for example from about 10 to 60, 10 to 40, 15 to 80, 15 to 60, 15 to 40, 20 to 80, 20 to 60, 20 to 40, 40 to 80, or 40 to 60%).

101. The method of any one of paragraphs 70 to 100, wherein the filler comprises one or more of the following: talc, calcium carbonate, mica, silica (including glass), kaolin, calcium sulphate, magnesium hydroxide, stabilizers, dolomite.

102. The method of any one of paragraphs 70 to 101, wherein the reinforcement comprises one or more of the following: glass fibres, glass beads, glass flakes, flax, cellulose, wood fibres, wood flour, cotton, sawdust, inorganic fibres, polymer fibres, polymer scrim, polymer knit, polymer weave, aramids, ceramics, carbon fibres.

103. The method of any one of paragraphs 70 to 102, wherein the filler and/or reinforcement is pre-coloured.

104. The method of any one of the preceding paragraphs, wherein the coloured particles comprises pre-coloured filler and/or reinforcement, preferably pre-coloured filler.

105. The method of any one of paragraphs 70 to 102, wherein one or more or each or all of the layers of the module comprise pre-coloured filler and/or reinforcement, preferably pre-coloured filler.

106. The method of any one of the preceding paragraphs wherein the substrate is a polymeric coating or layer of a coating for a roofing, cladding, or siding product or module, and the method comprises joining the polymeric coating or layer with or to one or more other layers of the roofing, cladding, or siding product or module to provide the roofing, cladding, or siding product or module.

107. A substrate having a decorated surface produced by a method according to any one of the preceding paragraphs.

108. A substrate having a decorated surface comprising one or more polymers and a plurality of coloured particles having an initial colour and comprising one or more polymers fused into or to or coalesced with said surface.

109. A substrate having a decorated surface comprising a continuous or unified polymeric matrix comprising one or more polymers, said surface comprising a plurality of visually differentiable coloured regions, which coloured regions may be the same or different in colour and/or size and/or shape, across the width and/or length of the surface.

110. A roofing, cladding, or siding module, preferably a polymeric roofing, cladding, or siding module, having a decorated surface produced by a method according to any one of the preceding paragraphs.

111. A roofing, cladding, or siding module, preferably a polymeric roofing, cladding, or siding module, having a decorated surface comprising one or more polymers and a plurality of coloured particles having an initial colour and comprising one or more polymers fused into or to or coalesced with said surface.

112. A roofing, cladding, or siding module, preferably a polymeric roofing, cladding, or siding module, having a decorated surface comprising a continuous or unified polymeric matrix comprising one or more polymers, said surface comprising a plurality of visually differentiable coloured regions, which coloured regions may be the same or different in colour and/or size and/or shape, across the width and/or length of the surface.

113. The substrate or module of any one of paragraphs 107 to 112, wherein coloured regions or the coloured regions are provided by fusion and/or coalescence of one or more pluralities of coloured particles having an initial colour and an exposed surface comprising one or more polymer into or to or with a surface of the substrate to be decorated comprising one or more polymers.

114. The substrate or module of any one of paragraphs 107 to 113, wherein the substrate, module, coloured particles, decorated surface, and/or surface to be decorated is as defined in any one of the preceding paragraphs.

115. The module of any one of paragraphs 111 to 114, wherein the module comprises:
    an underlapping region extending from a head edge of the module and an exposed region extending from a foot edge of the module, the length of the foot edge defining the length of the module,
    wherein the underlapping region is adapted to be substantially covered by the exposed region of an adjacent or overlapping module when installed on a building surface,
    wherein the module is formed of at least one layer of extruded material, wherein the layer so formed comprises:
    a) filler and/or reinforcement, for example at least 1, 5, 10, 15, 20, 25, 30, 35, 40, 45, 50, 55, 60, 65, 70, 75, 80, 85, 90, or 90% w/w filler and/or reinforcement (and useful ranges may be selected from any two of these values),
    b) one or more polymer(s).

116. A roofing, cladding, or siding module, comprising:
    an underlapping region extending from a head edge of the module and an exposed region extending from a foot edge of the module, the length of the foot edge defining the length of the module,
    wherein the underlapping region is adapted to be substantially covered by the exposed region of an adjacent or overlapping module when installed on a building surface,
    wherein the module is formed of at least one layer of extruded material, wherein the layer so formed comprises:
    at least 40% w/w filler and/or reinforcement,
    one or more polymer(s).

117. The module as defined in any one of paragraphs 115 to 116, wherein said module comprises a plurality of formed surfaces molded along the length of the module.

118. The module as defined in any one of paragraphs 115 to 117, wherein the layer comprises about 40% to about 95% w/w filler and/or reinforcement.

119. The module as defined in any one of paragraphs 115 to 118, wherein the layer comprises at least about 5% w/w reinforcement.

120. The module as defined in any one of paragraphs 115 to 119, wherein the layer comprises about 5% to about 30% w/w reinforcement.

121. The module as defined in any one of paragraphs 115 to 120, wherein the layer comprises at least about 80% filler and at least about 10% reinforcement.

122. The module as defined in any one of paragraphs 115 to 121, wherein the layer comprises one or more of the following polymers:
    a) polystyrene (GPPS),
    b) polyethylene terephthalate (PET), c) polyester methacrylate (PEM),
d) high impact polystyrene (HIPS),
e) acrylonitrile butadiene styrene (ABS),
f) polyvinyl chloride (PVC),
g) polyurethanes (PU),
h) polyethylene (PE) including homopolymer, copolymer, block copolymer and terpolymer forms,
i) polylactic acid (PLA),
j) nylon (PA),
k) acrylics (PMMA),
l) high density polyethylene (HDPE),
m) low density polyethylene (LDPE),
n) linear low density polyethylene (LLDPE),
o) medium density polyethylene (MDPE),
p) cross linked polyethylene (PEX),
q) thermoplastic elastomer (TPE),
r) thermoplastic polyolefin (TPO),
s) thermoplastic rubber (TPR),
t) polypropylene (PP), including homopolymer and copolymer forms,
u) polybutylene terephthalate (PBT),
v) styrene-acrylonitrile resin (SAN),
w) ethylene tetrafluoroethylene (ETFE),
x) vinyl,
y) methacrylate copolymers,
z) foamed polymer.

123. The module as defined in any one of paragraphs 115 to 122, wherein the filler comprises one or more of the following:
a) talc,
b) calcium carbonate,
c) mica,
d) silica,
e) kaolin,
f) calcium sulphate,
g) magnesium hydroxide
h) stabilizers
i) dolomite.

124. The module as defined in any one of paragraphs 115 to 123, wherein the reinforcement comprises one or more non-conductive natural or synthetic fibres.

125. The module as defined in any one of paragraphs 115 to 124, wherein the reinforcement comprises one or more of the following:
a) glass fibres,
b) glass beads,
c) glass flakes,
d) flax,
e) cellulose,
f) wood fibres,
g) wood flour,
h) cotton,
i) sawdust,
j) inorganic fibres,
k) polymer fibres,
l) polymer scrim,
m) polymer knit,
n) polymer weave,
o) aramids,
p) ceramics.

126. The module as defined in any one of paragraphs 115 to 125, wherein the layer further comprises one or more of the following:
colorants (including but not limited to carbon black, titanium dioxide),
flame retardants (including but not limited to magnesium hydroxide, aluminum trihydrate),
stabilizers (including but not limited to UV light stabilizers such as hindered amine light stabilizers (HALS), and thermal stabilizers such as phenolics),
foaming agents (including but not limited to exothermic, endothermic or gas foaming agents),
lubricants,
biocides (including but not limited to particles of silver, including nano-sized silver particles).

127. The module as defined in any one of paragraphs 115 to 126, wherein the layer comprises about 5% to about 25% w/w reinforcement, or about 5% to about 20%.

128. The module as defined in any one of paragraphs 115 to 127, wherein the layer comprises at least about 10% w/w reinforcement.

129. The module as defined in any one of paragraphs 115 to 129, wherein at least a portion of a top surface of the exposed region comprise(s) three dimensional surface features, whether as surface relief or surface texturing.

130. The module as defined in paragraph 129, said portion comprises surface features resembling one of:
a) asphalt shingle,
b) slate,
c) shingles,
d) shakes,
e) concrete tiles,
f) stone chips,
g) weatherboard,
h) thatch,
i) stone,
j) woodgrain,
k) metal.

131. The module as defined in paragraph 129 or 130, wherein the surface features are, at least in part, due to coloring, patterning, surface cracking or polymer fracturing or other two-dimensional or three-dimensional ornamentation of said portion.

132. The module as defined in any one of paragraphs 129 to 131, wherein the surface features further comprise three-dimensional features including one or more of:
surface texturing,
surface relief,
other three-dimensional pattern or ornamentation configured or arranged to simulate a natural or manufactured material.

133. The module as defined in any one of paragraphs 115 to 132, wherein the module further comprises a plurality of formed surfaces, wherein each of the formed surfaces comprises said surface features, and wherein the formed surfaces are joined without weld lines, attachments or injection molding points.

134. The module as defined in paragraph 133, wherein each formed surface is a molded segment along the length of the module.

135. The module as defined in paragraph 133 or 134, wherein each formed surface resembles an individual tile or shingle or slate or shake within the module.

136. The module as defined in any one of paragraphs 133 to 135, wherein the module is subsequently sectioned (or divided or partitioned) to provide a plurality of smaller module sections for installation onto a building surface.

137. The module as defined in any one of paragraphs 115 to 136, wherein said layer so formed of a said extruded material is provided as a base or bottom layer of the module, and the module further comprises one or more additional upper layers provided as further layers upon said base or bottom layer.

138. The module as defined in paragraph 137, wherein said one or more upper layer(s) is formed of an extruded material, said one or more upper layer(s) comprising a different weight percentage of filler and/or reinforcement relative to the base or bottom layer.
139. The module as defined in paragraph 137 or 138, wherein each of said layers are co-extruded to form the or at least a part of said module.
140. The module as defined in any one of paragraphs 137 to 139, wherein the layers are joined together in a continuous forming process to form the or at least a part of said module.
141. The module as defined in any one of paragraphs 115 to 140, wherein the module is at least about 36 inches long or at least about 1 metre long.
142. The module as defined in any one of paragraphs 115 to 141, wherein the module is at least about 0.3 m or about 12 inches wide or at least about 0.8 m wide.
143. The module as defined in any one of paragraphs 115 to 142, wherein said at least one layer so formed, such as a base or bottom layer of said module, has a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).
144. The module as defined in any one of paragraphs 115 to 143, wherein at least a portion of the module comprises a top layer (or an upper layer or a plurality of upper layers forming a said top layer), a base or bottom layer (or a lower layer or a plurality of lower layers forming a said base or bottom layer), and an intermediate layer (or a plurality of layers forming a said intermediate layer) between the top and base or bottom layers.
145. The module as defined in any one of paragraphs 115 to 144, wherein a layer so formed extends across at least a part of the width and/or at least a part of the length of the module to provide for a variation to one or more properties to the module so formed by the at least one layer, the properties selected from one or more of:
    a) thickness,
    b) surface area
    c) tensile strength
    d) shear strength
    e) resilience
    f) elasticity
    g) flexibility
    h) toughness
    i) fire resistance
    j) water resistance
    k) continuity or uniformity
    l) impact resistance
    m) resistance to pull through
    n) fixing capability
    o) chemical resistance
    p) puncture resistance
    q) content of filler and/or reinforcement
    r) concentration of filler and/or reinforcement
    s) color
    t) microbial resistance
    u) temperature resistance
    v) light/heat absorption/reflectivity,
    w) thermal transfer,
    x) shape memory,
    y) thermal expansion,
    z) grip,
    aa) abrasion or scuff resistance,
    bb) slip resistance,
    cc) adhesion/gluing/bonding capability,
    dd) sealing ability.
146. The module as defined in any one of paragraphs 115 to 145, wherein the module comprises an intermediate layer, the intermediate layer being one or more of:
    a) a film,
    b) a sheet,
    c) a mesh,
    d) a scrim,
    e) a weave,
    f) a fibre,
    g) a fabric,
    h) a wire,
    i) a string,
    j) a web,
    k) plasma coating,
    l) adhesive.
147. The module as defined in any one of paragraphs 115 to 146, wherein the module comprises an intermediate layer, the intermediate layer being a reinforcing layer that provides for one or more of:
    a) resistance against shrinkage,
    b) resistance against warping,
    c) resistance against tearing,
    d) increased toughness,
    e) prevention against unwanted deflections of the module,
    f) weather resistance,
    g) resistance against delamination of the layers,
    h) reduced flammability,
    i) water resistance,
    j) impact resistance,
    k) resistance to pull through,
    l) fixing capability,
    m) chemical resistance,
    n) puncture resistance,
    o) sealing
    p) shape memory
    q) adhesive/gluing/bonding capability,
    r) thermal expansion (or contraction),
    s) surface texture, and
    t) binding of other materials.
148. The module as defined in paragraph 146 or 147, wherein, the intermediate layer is chemically and/or mechanically bonded, welded, fused, co-extruded and/or connected to the top layer and/or the base or bottom layer.
149. The module as defined in any one of paragraphs 146 to 148, wherein the intermediate layer comprises one or more of the following three-dimensional surface features to increase or improve the mechanical bond or connection with the top and/or base or bottom layers:
    a) surface texturing,
    b) surface roughness,
    c) projections,
    d) corrugations,
    e) reinforcements,
    f) chemical coating(s),
    g) protrusions, h) apertures,
i) perforations
j) 3D replications of natural surface, or
k) water repelling features.

150. The module as defined in any one of paragraphs 146 to 150, wherein the intermediate layer, when being joined to the top and base or bottom layers, is in a molten or semi-molten or cold but pliable state.

151. The module as defined in any one of paragraphs 146 to 150, wherein the module is shaped and/or contoured during the joining or lamination process, while the intermediate layer is in a molten or semi-molten or cold but pliable state or a formable or moldable condition.

152. The module as defined in any one of paragraphs 115 to 146, wherein at least a top layer of the module comprises sections of non-homogenous and/or non-compatible materials, and wherein an intermediate layer provides a binder layer for binding said non-homogenous and/or non-compatible sections to the intermediate layer.

153. The module as defined in any one of paragraphs 115 to 152, wherein at least a top layer (with an exposed region) of the module has a relatively high UV resistance.

154. The module as defined in any one of paragraphs 146 to 153, wherein one or more property/properties of the intermediate layer is/are optimized preferentially along the direction of the length and/or width of the module.

155. The module as defined in any one of paragraphs 115 to 154, wherein the exposed region and/or the underlapping region comprises a top layer, an intermediate layer and a base or bottom layer.

156. The module as defined in any one of paragraphs 115 to 155, wherein the module comprises an intermediate layer extending from at or adjacent the foot edge, to at or adjacent the underlapping region of the module.

157. The module as defined in any one of paragraphs 115 to 156, wherein the module comprises a fastening region adapted to receive one or more fasteners for fixing the module to the or a building surface, optionally the fastening region including a visual guide or boundary markers to allow visual identification of said fastening region.

158. The module as defined in paragraph 157, wherein the fastening region is substantially adjacent the exposed region and within the underlapping region.

159. The module as defined in paragraph 157 or 158, wherein an intermediate layer of the module is thicker or comprises thickened regions or other 3-dimensional qualities within the fastening region of the module, optionally the thicker or thickened or other 3-dimensional qualities of the intermediate layer provide for a fastening region capable of retaining a fastener penetrating or pulling through the fastening region or resisting tear of the module by shear force applied to the module or each of the said layers by the fastener.

160. The module as defined in any one of paragraphs 115 to 159, wherein the module comprises one or more of:
 a. discrete intermediate layers in different regions of the module,
 b. different intermediate layers in different regions of the module,
 c. multiple intermediate layers in one or more regions of the module.

161. The module as defined in any one of paragraphs 115 to 160, wherein the module comprises a layer that provides for chemical resistance and/or a barrier that prevents and/or reduces migration of solvents and/or other chemicals through the layer to adjacent layer(s) of the module, for example from the underside of the module and/or from one more layers disposed beneath the chemical resistance and/or barrier layer to layer(s) disposed above, such as a top layer of the module.

162. The module as defined in paragraph 161, wherein the chemical resistance and/or barrier layer is an intermediate layer of the module.

163. The module as defined paragraph 161 or 162, wherein the chemical resistance and/or barrier layer is a base or bottom layer of the module.

164. The module as defined in any one of paragraphs 161 to 163, wherein the chemical resistance and/or barrier layer extends across at least a portion, preferably substantially the whole, of the length and width of the exposed region of the module.

165. The module as defined in any one of paragraphs 161 to 164, wherein the chemical resistance and/or barrier layer additionally extends across a portion, but preferably not the whole, of the length and width of the underlapping region of the module.

166. The module as defined in any one of paragraphs 161 to 164, wherein the chemical resistance and/or barrier layer does not extend across the underlapping region of the module.

167. The module as defined in any one of paragraphs 161 to 166, wherein the chemical resistance and/or barrier layer may be formed on or joined or laminated to one or more other layer(s) of the module before the module is formed or may be formed on or joined or laminated to a layer of the module after the module has been formed.

168. The module as defined in any one of paragraphs 161 to 167, wherein the chemical resistance layer or barrier layer is formed by a method comprising applying a curable material to a layer of the module, for example before the layer is joined or laminated to one or more other layers of the module or as a post-treatment of a layer of the module after the module has been formed, and curing the curable material, for example using UV radiation, heat, etc.

169. The module as defined in any one of paragraphs 161 to 167, wherein the chemical resistance and/or barrier layer is formed by a method comprising extrusion or co-extrusion with one or more other layers of the module.

170. The module as defined in any one of paragraphs 161 to 169, wherein the chemical resistance layer and/or barrier layer may be subjected to a treatment, for example a plasma or corona treatment or other treatment, that improves adhesion of the layer, for example to an adhesive layer, such as one or more continuous or discontinuous strip of adhesive (optionally which may be exposed upon removal of a release sheet).

171. The module as defined in any one of paragraphs 161 to 170, wherein one or more additional layers may be joined or laminated to the chemical resistance and/or barrier layer, for example an adhesive layer, such as one or more continuous or discontinuous strip of adhesive (optionally which may be exposed upon removal of a release sheet).

172. The module as defined in any one of paragraphs 115 to 171, wherein the module is post-treated after being formed, optionally comprising one or more of:
shaping,
folding, coloring,
corrugating,
adding surface treatment(s),
perforating,
laminating,
coating,
heating,
cooling,
printing (for example stamping, marking, embossing, coloring, etc.),
fusing (for example, to another module, layer, adhesive, or other element, etc),
abrasing or smoothing (for example, sand or bead blasting),
curing (for example, radiation, including UV, curing),
treatment (for example, to improve adhesion of other materials, for example plasma or corona treatment), or
cutting.

173. The module as defined in paragraph 172, wherein the post-treatment may comprise coating or laminating the underside or bottom of the module with a chemical resistance layer or barrier layer.

174. The module as defined in paragraph 173, wherein the coating or laminating with a chemical resistance and/or barrier layer comprises applying a curable material to the underside or bottom of the module and curing, for example UV curing.

175. The module as defined in any one of paragraphs 172 to 174, wherein the post-treatment further comprises subjecting the chemical resistance and/or barrier layer to a treatment, for example a plasma or corona treatment or other treatment, that improves adhesion of the layer, for example to an adhesive layer, such as one or more continuous or discontinuous strip of adhesive (optionally which may be exposed upon removal of a release sheet), that may subsequently be applied.

176. The module as defined in any one of paragraphs 172 to 175, wherein the post-treatment further comprises joining or laminating an adhesive layer, such as one or more continuous or discontinuous strip of adhesive (optionally which may be exposed upon removal of a release sheet), to the treated chemical resistance and/or barrier layer.

177. The module as defined in any one of paragraphs 115 to 176, wherein an under surface of at least the exposed region of the module surface (e.g. an under surface being a surface of the module to be placed substantially adjacent to or facing of the building surface upon which the module is to be fastened) comprises a plurality of projections.

178. The module as defined in paragraph 177, wherein the projections provide surfaces for one or more of:
adhering the exposed region of the module to the top surface of the underlapping region of an adjacent or overlapping module when installed,
providing reinforcement for the module.

179. The module as defined in any one of paragraphs 115 to 178, wherein at least the or a portion of a top surface of the exposed region is colored or treated in a manner so as to yield a visually observable color, by applying colored particles onto at least a portion of the top surface of the top layer, either before or after one or more layers are joined together.

180. The module as defined in paragraph 179, wherein the module is formed by molding, and at least a portion of a top surface of the module is a colored and/or decorated and/or textured by applying colored particles onto at least a portion of the top surface of a precursor of the module, wherein the colored particles are applied before and/or during the molding process.

181. The module as defined in paragraph 180, wherein the precursor is molded between a first forming surface and a second forming surface to form the module, and the colored particles are applied to at least a portion of the first forming surface, wherein the colored particles are transferred to said portion of the precursor during the molding step.

182. The module as defined in paragraph 180 or 181, wherein the colored particles are applied directly or indirectly to the precursor and/or the forming surface by one or more of:
a) stamping,
b) injecting,
c) embossing,
d) spraying,
e) rolling,
f) feeding,
g) brushing,
h) melting,
i) immersing,
j) dipping,
k) sprinkling,
l) depositing,
m) by drawing or suctioning the colored particles onto the precursor and/or forming surface using a vacuum system.

183. The module as defined in any one of paragraphs 179 to 182, wherein the colored particles are in the form of a powder and/or in a fluid capable of being dispersed upon at least the or a portion of the top surface of the exposed region, whether the application is direct or indirect to the surface or whether a die face is used to convey the colored particles to the surface.

184. The module as defined in any one of paragraphs 179 to 183, wherein at least a portion of a top surface of the module is a colored and/or decorated and/or textured by applying colored particles onto at least a portion of the top surface of the module after the module has been formed by a molding/joining/laminating process.

185. The module as defined in any one of paragraphs 115 to 184, wherein the layer so formed comprises at least 60% w/w filler and/or reinforcement.

186. A roofing, cladding, or siding module, comprising:
an underlapping region extending from a head edge of the module and an exposed region extending from a foot edge of the module, the length of the foot edge defining the length of the module,
wherein the underlapping region is adapted to be substantially covered by the exposed region of an adjacent or overlapping module when installed on a building surface, and
wherein at least a portion of the module comprises a top layer (or an upper layer or a plurality of upper layers forming a said top layer), a bottom layer (or a lower layer or a plurality of lower layers forming a said bottom layer), and an intermediate layer (or a plurality of layers forming a said intermediate layer) between the top and bottom layers,
and wherein at least one or more of said top layer or said intermediate layer or said base or bottom layer comprises a foamed polymer.

187. The module of any one of paragraphs 115 to 186, wherein the filler and/or reinforcement is pre-coloured.

188. The module of any one of paragraphs 115 to 187, wherein the coloured particles comprises pre-coloured filler and/or reinforcement, preferably pre-coloured filler.
189. The module of any one of paragraphs 115 to 188, wherein one or more or each or all of the layers of the module comprise pre-coloured filler and/or reinforcement, preferably pre-coloured filler.
190. The module as defined in any one of paragraphs 111 to 189, wherein the module is a roofing, cladding, or siding product or module as defined in any one of the paragraphs 3-106.
191. The module as defined in any one of paragraphs 111 to 190, wherein the module has a decorated surface as defined in any one of the paragraphs 1-106.
192. An assembly for installation on a building surface comprising a plurality of the modules as defined in any one of paragraphs 110 to 191.
193. A building surface or a building comprising a plurality of the modules as defined in any one of paragraphs 110 to 191.
194. A coloured particle for decorating a substrate having an exposed surface to be decorated, the coloured particle having an initial colour and an exposed surface comprising one or more polymer, and wherein the coloured particle comprises filler and/or reinforcement, for example at least about 1, 2, 3, 4, 5, 10, 15, 20, 25, 30, 35, 40, 45, 50, 55, 60, 65, 70, 75, or 80% w/w filler and/or reinforcement based on the weight of the particle (any useful ranges may be selected between any two of these values).
195. The coloured particle of any one of paragraph 194, wherein the substrate is selected from concrete, cement, aggregate, geopolymer, metal, for example tin, aluminium, or stainless steel, timber, stone, clay, ceramic, or glass.
196. The coloured particle of paragraph 194 or 195, wherein the coloured particle provides for adhesion or bonding to the exposed surface of the substrate, for example mechanical adhesion or bonding by keying or interlocking with three-dimensional features of the exposed surface.
197. The coloured particle of any one of paragraphs 194 to 196, wherein the substrate is a substrate having an exposed surface to be decorated comprising one or more polymers, optionally as defined in any one of paragraphs 1 to 106.
198. The coloured particle of any one of paragraphs 194 to 197 wherein the substrate comprises a roofing, cladding, or siding product or a coating or a layer of a coating for a roofing, cladding, or siding product.
199. The coloured particle of any one of paragraphs 194 to 198, wherein the particle has a coefficient of thermal expansion of less than about $180 \cdot 10^{-6}$ m/(m K), for example less than about 170, 160, 150, 140, 130, 120, 110, 100, 90, 80, 70, 60, 50, 45, 40, 35, 30, 25, 20, 15, or $10 \cdot 10^{-6}$ m/(m K), preferably less than $40 \cdot 10^{-6}$ m/(m K), preferably less than $30 \cdot 10^{-6}$ m/(m K), and suitable ranges may be selected from any two of these values for example from about 180 to about 10, 180 to 20, 150 to 10, 150 to 20, 150 to 30, 80 to 10, 80 to 20, 80 to 30, 50 to 10, 50 to 20, 50 to 30, 40 to 10, or 40 to $20 \cdot 10^{-6}$ m/(m K).
200. The coloured particle of any one of paragraphs 194 to 199, wherein the absolute difference between the coefficient of thermal expansion of the particle and the coefficient of thermal expansion of the surface to be decorated is less than about $150 \cdot 10^{-6}$ m/(m K), for example less than about 140, 130, 120, 110, 100, 90, 80, 70, 60, 50, 45, 40, 35, 30, 25, 20, 15, 10, or $5 \cdot 10^{-6}$ m/(m K), preferably less than 50, 40, or $30 \cdot 10^{-6}$ m/(m K), preferably less than $30 \cdot 10^{-6}$ m/(m K), and suitable ranges may be selected from between any two of these values or from between 0 and any one of these values, for example from about 80 to 0, 50 to 0, 30 to 0, or 20 to $0 \cdot 10^{-6}$ m/(m K).
201. The coloured particle of any one of paragraphs 194 to 200, wherein the particle is for use in a method according to any one of paragraphs 1 to 106.
202. The coloured particle of any one of paragraphs 194 to 201, wherein the coloured particle is as defined in any one of paragraphs 1 to 106.
203. A plurality of coloured particles according to any one of paragraphs 194 to 202.
204. A method of producing a substrate having a decorated surface, the method comprising:
   providing one or more pluralities of coloured particles as defined in any one of paragraphs 194 to 202;
   providing a substrate having an exposed surface to be decorated as defined in any one of paragraphs 1 to 106;
   bringing into contact said one or more pluralities of coloured particles and said exposed surface to be decorated; and
   exposing said coloured particles and/or said exposed surface to be decorated to a temperature and pressure sufficient to cause said coloured particles to adhere or bond to the exposed surface to be decorated, said temperature and pressure being controlled over a period of time to thereby produce a substrate having a decorated surface.
205. The method of paragraph 204, wherein the particles mechanically adhere or bond to the exposed surface of the substrate by keying or interlocking with three-dimensional features of the exposed surface.
206. The method of paragraph 204 or 205, wherein the surface of the substrate provided at or heated to a temperature sufficient to allow the coloured particles being deposited to melt and/or fuse and/or coalesce with each other on the surface of the substrate.
207. The method of any one of paragraphs 204 to 206, wherein the amount of particles brought into contact with the surface of the substrate the particles is sufficient to form a continuous polymeric layer or film on the surface of the substrate.
208. A substrate having a decorated surface produced by a method according to any one of paragraphs 1 to 106 or 204 to 207.
209. A substrate having a decorated surface comprising a plurality of coloured particles as defined in any one of paragraphs 194 to 202 having an initial colour and comprising one or more polymers adhered or bonded to an exposed surface to be decorated of the substrate.
210. The substrate of any one of paragraphs 208 or 209, wherein the particles mechanically adhere or bond to the exposed surface of the substrate by keying or interlocking with three-dimensional features of the exposed surface.
211. The substrate of any one of paragraphs 208 to 210, wherein the substrate comprises coloured particles melted and/or fused and/or coalesced with each other on the surface of the substrate.
212. The substrate of any one of paragraphs 208 to 211, wherein the substrate comprises coloured particles melted and/or fused and/or coalesced with each other on the surface of the substrate so as to form a continuous polymeric layer or film on the surface of the substrate.
213. The substrate of any one of paragraphs 208 to 212, wherein the substrate is selected from concrete, cement, aggregate, geopolymer, metal, for example tin, aluminium, or stainless steel, timber, stone, clay, ceramic, or glass.
214. The substrate of any one of paragraphs 208 to 213, wherein the coloured particles adhere or bond to the exposed surface of the substrate by mechanical adhesion or bonding, for example by keying or interlocking with three-dimensional features of the exposed surface.
215. The substrate of any one of paragraphs 208 to 214, wherein the substrate comprises a roofing, cladding, or siding product or module or a coating or a layer of a coating for a roofing, cladding, or siding product or module.
216. The substrate of any one of paragraphs 208 to 215 wherein the substrate comprises a roofing, cladding, or siding module.
217. The method according to any one of paragraphs 1 to 106 or 204 to 207, wherein the method is for producing a module according to any one of paragraphs 115 to 191.
218. A roofing, cladding, or siding module according to any one of paragraphs 115 to 191 produced by a method according to any one of paragraphs 1 to 106 or 204 to 207.

The invention claimed is:

1. A method of producing a substrate having a decorated surface, the method comprising:
providing one or more pluralities of coloured particles having an initial colour and an exposed surface comprising one or more polymers, wherein the coloured particles of the one or more pluralities of coloured particles have a melt flow index (MFI) of up to about 50;
providing a substrate having an exposed surface to be decorated comprising one or more polymers, wherein the substrate is a precursor of a module to be molded;
molding the precursor between a first forming surface and a second forming surface to form the module;
wherein the first forming surface comprises at least one die face configured to mold three dimensional surface features onto at least a portion of a top surface of the module;
wherein the one or more pluralities of coloured particles are applied to at least a portion of the at least one die face prior to the molding step; bringing into contact the one or more pluralities of coloured particles and the exposed surface to be decorated during the molding step; and
exposing the coloured particles and/or the exposed surface to be decorated to a temperature and a pressure sufficient to cause the coloured particles to fuse into or fuse to or coalesce with the exposed surface to be decorated, the temperature and the pressure being controlled over a period of time to thereby produce a molded module having a decorated surface.

2. The method of claim 1, wherein the module to be molded is a roofing, cladding, or siding module to be molded and wherein the molded module having a decorated surface is a molded roofing, cladding, or siding module having a decorated surface.

3. The method of claim 1, wherein (a) the coloured particles and/or the one or more polymers of the exposed surface of the coloured particles are miscible or compatible with the exposed surface to be decorated and/or the one or more polymers of the exposed surface to be decorated at a temperature greater than a glass transition temperature (Tg) of the coloured particles and/or the one or more polymers of the exposed surface of the coloured particles and/or a temperature greater than the Tg of the exposed surface to be decorated and/or the one or more polymers of the exposed surface to be decorated; and/or (b) the temperature to which the coloured particles and/or surface to be decorated are exposed is greater than the Tg of the coloured particles and/or the one or more polymers of the exposed surface of the coloured particles and/or greater than the Tg of the exposed surface to be decorated and/or the one or more polymers of the exposed surface to be decorated at the pressure to which the coloured particles and/or surface to be decorated are exposed.

4. The method of claim 1, wherein the method comprises providing two or more pluralities of coloured particles and bringing into contact the exposed surface to be decorated and the two or more pluralities of coloured particles, wherein the coloured particles of each plurality of coloured particles differ in composition or a physical property or characteristic.

5. The method of claim 4, wherein the coloured particles of each plurality of coloured particles differ in one or more of the following: initial colour; the composition of the one or more polymers of the exposed surface of the coloured particles; the glass transition temperature (Tg) of the coloured particles and/or the one or more polymers of the exposed surface of the coloured particles; a heat deflection temperature (HDT) of the coloured particles and/or the one or more polymers of the exposed surface of the coloured particles; a melt flow index (MFI) of the coloured particles; average particle size; shape; ability to reflect light; stability to degradation; and ability to provide grip or abrasion.

6. The method of claim 1, wherein the method comprises applying the pressure to the coloured particles and exposed surface to be decorated after bringing the coloured particles and the exposed surface to be decorated into contact.

7. The method of claim 1, wherein the coloured particles of one or more pluralities of coloured particles have an average particle size of from about 0.05 to about 5 mm.

8. The method of claim 1, wherein the coloured particles are of a predetermined shape.

9. The method of claim 1, wherein the one or more polymers of the exposed surface of the coloured particles and/or the one or more polymers of the exposed surface to be decorated are selected from thermoplastic polymers.

10. The method of claim 1, wherein the one or more polymers of the exposed surface of the coloured particles and/or the one or more polymers of the exposed surface to be decorated are selected from polystyrene (GPPS), polyethylene terephthalate (PET), polyester methacrylate (PEM), high impact polystyrene (HIPS), acrylonitrile butadiene styrene (ABS), polyvinyl chloride (PVC), polyurethanes (PU), polyethylene (PE) including homopolymer, copolymer, block copolymer and terpolymer forms, polylactic acid (PLA), nylon (PA), acrylics (PMMA), high density polyethylene (HDPE), low density polyethylene (LDPE), linear low density polyethylene (LLDPE), medium density polyethylene (MDPE), cross linked polyethylene (PEX), thermoplastic elastomer (TPE), thermoplastic polyolefin (TPO), thermoplastic rubber (TPR), polypropylene (PP), including homopolymer and copolymer forms, polybutylene terephthalate (PBT), styrene-acrylonitrile resin (SAN), ethylene tetrafluoroethylene (ETFE), vinyl, methacrylate copolymers, foamed polymer, polycarbonates, and combinations thereof.

11. The method of claim 1, wherein (a) the coloured particles and/or the one or more polymers of the exposed surface of the coloured particles and/or the exposed surface to be decorated and/or the one or more polymers of the exposed surface to be decorated have a glass transition temperature (Tg) of about 200° C. or less.

12. The method of claim 1, wherein:
(a) the coloured particles have a melt flow index (MFI) of up to about 10; and/or
(b) the coloured particles and/or the one or more polymers of the exposed surface of the coloured particles have a Tg of 90° C. or less; and/or
(c) the coloured particles and/or the one or more polymers of the exposed surface of the coloured particles have a HDT of 90° C. or more; and/or
(d) the coloured particles have an average particles size from about 0.3 to 1.5 mm; and
wherein the decorated surface resembles stone chips or asphalt shingle.

13. The method of claim 1, wherein:
(a) the coloured particles have a melt flow index (MFI) from about 20 or more; and/or
(b) the coloured particles and/or the one or more polymers of the exposed surface of the coloured particles have a Tg of from about −120 to about −70° C.; and/or
(c) the coloured particles and/or the one or more polymers of the exposed surface of the coloured particles have a HDT of 45° C. or more; and/or
(d) the coloured particles have an average particles size from about 0.1 to 1 mm; and
wherein the decorated surface resembles slate, wooden shingle or shake, or ceramic or clay tile.

14. The method of claim 1, wherein an amount of coloured particles brought into contact with the exposed surface to be decorated varies across a width and/or a length of the exposed surface to be decorated.

15. The method of claim 1, wherein the method comprises selectively decorating one or more predetermined areas of the exposed surface to be decorated, optionally wherein (a) the coloured particles are selectively brought into contact with one or more predetermined areas of the exposed surface to be decorated.

16. The method of claim 1, wherein (a) an amount of coloured particles brought into contact with the exposed surface to be decorated in an amount from 1 g to 2,000 g/m²; and/or (b) wherein from about 30 to about 90% of a surface area of the exposed surface to be decorated is brought into contact with coloured particles; and/or (c) wherein from about 20 to 90% of the surface area of the decorated surface is coloured by colour provided by the coloured particles after causing the coloured particles to fuse into or to or coalesce with the exposed surface to be decorated; and/or (d) wherein the surface to be decorated is colourless or uniformly or non-uniformly coloured in any colour (including blend or combinations of different colours).

17. The method of claim 1, wherein (a) the decorated surface varies in colour (including variation in hue, saturation, or brightness or a variation in reflectance) across a width and/or a length of the surface; and/or (b) the decorated surface comprises a plurality of visually differentiable coloured regions, which coloured regions may be the same or different in colour and/or size and/or shape, across the width and/or the length of the surface.

18. The method of claim 17, wherein the colour across the width and/or the length of the decorated surface extends from the surface into a portion of a depth of the substrate but not the whole of the depth of the substrate.

19. The method of claim 1, wherein (a) one or more pluralities of coloured particles and/or the surface to be decorated comprises one or more components susceptible to UV, thermal, and/or other environmental degradation; and/or (b) one or more pluralities of coloured particles and/or the exposed surface to be decorated comprise one or more of the following: light stabilisers; thermal stabilisers; biocides; friction enhancers; surface leaching agents or inhibitors.

20. The method of claim 1, wherein the decorated surface has increased surface hardness, scuff resistance, and/or slip resistance compared to the exposed surface to be decorated.

21. The method of claim 1, wherein (a) the coloured particles comprise 5 to about 100% w/w of the one or more polymers of the exposed surface of the coloured particles based on a weight of the coloured particles; and/or (b) wherein the exposed surface to be decorated comprises from about 5 to about 100% w/w of the one or more polymers of the exposed surface to be decorated based on the weight of a material from which the exposed surface to be decorated is formed; and/or (c) wherein the substrate is a polymeric substrate or a substrate comprising a polymeric coating or layer of a coating that provides the exposed surface to be decorated, wherein the polymeric substrate or polymer coating or layer comprises from about 5 to about 100% w/w of the one or more polymers based on the weight of the polymeric substrate or polymeric coating or layer.

22. The method of claim 1, wherein (a) the temperature to which the coloured particles and/or surface to be decorated are exposed to cause the coloured particles to fuse into or to or coalesce with the exposed surface is at least 60° C.; and/or (b) the pressure to which the coloured particles and/or surface to be decorated are exposed to cause the coloured particles to fuse into or to or coalesce with the exposed surface is at least about 2 bar.

23. The method of claim 1, wherein (a) the coloured particles and/or the one or more polymers of the exposed surface of the coloured particles have a heat deflection temperature (HDT) of at least about 20° C.; and/or (b) wherein the exposed surface to be decorated and/or the one or more polymers of the exposed surface to be decorated has a heat deflection temperature (HDT) of at least about 20° C.

24. The method of claim 1, wherein (a) the coloured particles and/or the one or more polymers of the exposed surface of the coloured particles and/or the exposed surface to be decorated and/or the one or more polymers of the exposed surface to be decorated have a Vicat softening point of at least about 60° C.; and/or (b) wherein the decorated surface has a Vicat softening point of at least about 60° C.

25. The method of claim 1, wherein (a) the substrate comprises a layer of a roofing, cladding, or siding module defining the exposed surface to be decorated, optionally wherein the layer is formed of an extruded material comprising filler and/or reinforcement, and one or more polymers; and/or (b) the coloured particles comprise filler and/or reinforcement; and/or (c) the coloured particles comprise at least 10, 15, 20, 25, 30, 35, 40, 45, 50, 55, 60, 65, 70, 75, or 80% w/w filler based on a weight of the coloured particles.

26. The method of claim 1, wherein the method is for producing a roofing, cladding, or siding module having a decorated surface, wherein the module comprises:

an underlapping region extending from a head edge of the module and an exposed region extending from a foot edge of the module, a length of the foot edge defining a length of the module, wherein the underlapping region is adapted to be substantially covered by the exposed region of an adjacent or overlapping module when installed on a building surface, wherein the module is formed of at least one layer of an extruded material, wherein the layer so formed comprises:

a) filler and/or reinforcement, and
b) one or more polymers.

27. The method of claim 26, wherein the reinforcement comprises or consists or consists essentially of fibres, and wherein the fibres are aligned along the length of the module; and optionally wherein the reinforcement comprises or consists or consists essentially of glass fibres.

28. The method of claim 25, wherein the module and/or one or more layers and/or each or all of the one or more layers of the module has anisotropic thermal expansion, a coefficient of thermal expansion with respect to a length of a module or layer being lower than a coefficient of thermal expansion with respect to the width of the module or layer and/or a coefficient of thermal expansion with respect to a depth of the module or layer.

29. The method of claim 26, wherein an absolute difference between a coefficient of thermal expansion of the layer of the module having a highest coefficient of thermal expansion and the layer of the module having a lowest coefficient of thermal expansion and/or the absolute difference between a coefficient of thermal expansion of the decorated surface and a coefficient of thermal expansion of the exposed surface to be decorated and/or the absolute difference between a coefficient of thermal expansion of the one or more pluralities of coloured particles and the coefficient of thermal expansion of the exposed surface to be decorated is less than about $150 \cdot 10^{-6}$ m/(m K).

30. The method of claim 25, wherein the filler comprises one or more of the following: talc, calcium carbonate, mica, silica (including glass), kaolin, calcium sulphate, magnesium hydroxide, stabilizers, dolomite; and/or wherein the reinforcement comprises one or more of the following: glass fibres, glass beads, glass flakes, flax, cellulose, wood fibres, wood flour, cotton, sawdust, inorganic fibres, polymer fibres, polymer scrim, polymer knit, polymer weave, aramids, ceramics, carbon fibres.

31. The method of claim 1, wherein the substrate is a polymeric coating or layer of a coating for a roofing, cladding, or siding product or module, and the method comprises joining the polymeric coating or layer with or to one or more other layers of the roofing, cladding, or siding product or module to provide the roofing, cladding, or siding product or module.

* * * * *